(12) United States Patent
Prevost et al.

(10) Patent No.: US 11,035,407 B2
(45) Date of Patent: Jun. 15, 2021

(54) MATERIAL TREATMENTS FOR DIAMOND-ON-DIAMOND REACTIVE MATERIAL BEARING ENGAGEMENTS

(71) Applicants: Gregory Prevost, Spring, TX (US); Michael V. Williams, Conroe, TX (US); David P. Miess, Spring, TX (US)

(72) Inventors: Gregory Prevost, Spring, TX (US); Michael V. Williams, Conroe, TX (US); David P. Miess, Spring, TX (US)

(73) Assignee: XR Downhole, LLC, Houston, TX (US)

( * ) Notice: Subject to any disclaimer, the term of this patent is extended or adjusted under 35 U.S.C. 154(b) by 0 days.

(21) Appl. No.: 16/425,758

(22) Filed: May 29, 2019

(65) Prior Publication Data

US 2020/0056659 A1  Feb. 20, 2020

Related U.S. Application Data

(63) Continuation-in-part of application No. 16/049,617, filed on Jul. 30, 2018, now Pat. No. 10,760,615, and a continuation-in-part of application No. 16/049,588, filed on Jul. 30, 2018, now Pat. No. 10,465,775, and a continuation-in-part of application No. 16/049,608, filed on Jul. 30, 2018, now Pat. No. 10,738,821.

(51) Int. Cl.
*F16C 33/04* (2006.01)
*F16H 53/06* (2006.01)

(52) U.S. Cl.
CPC .......... *F16C 33/043* (2013.01); *F16H 53/06* (2013.01); *F16C 2202/04* (2013.01); *F16C 2206/04* (2013.01); *F16C 2223/08* (2013.01); *F16C 2223/10* (2013.01); *F16C 2223/60* (2013.01)

(58) Field of Classification Search
CPC .......... F16C 17/02; F16C 17/04; F16C 17/10; F16C 17/105; F16C 33/043; F16C 2206/04; F16C 2380/26
See application file for complete search history.

(56) References Cited

U.S. PATENT DOCUMENTS

| | | | |
|---|---|---|---|
| 1,798,604 A | 3/1931 | Hoke |
| 1,963,956 A | 6/1934 | James |
| 2,259,023 A | 10/1941 | Clark |
| 2,299,978 A | 10/1942 | Hall |
| 2,407,586 A | 9/1946 | Summers |

(Continued)

FOREIGN PATENT DOCUMENTS

| | | |
|---|---|---|
| CA | 2891268 A1 | 11/2016 |
| JP | 06174051 A | 6/1994 |

(Continued)

OTHER PUBLICATIONS

Element six, The Element Six CVD Diamond Handbook, Accessed on Nov. 1, 2019, 28 pages.

(Continued)

*Primary Examiner* — James Pilkington
(74) *Attorney, Agent, or Firm* — Michael S. McCoy; Amatong McCoy LLC

(57) ABSTRACT

An apparatus is provided that includes a diamond bearing surface positioned in sliding engagement with an opposing bearing surface of a diamond reactive material. The opposing bearing surface is hardened via a material treatment.

40 Claims, 29 Drawing Sheets

(56) References Cited

U.S. PATENT DOCUMENTS

| | | |
|---|---|---|
| 2,567,735 A | 9/1951 | Scott |
| 2,693,396 A | 11/1954 | Gondek |
| 2,758,181 A | 8/1956 | Crouch |
| 2,788,677 A | 4/1957 | Hayek |
| 2,877,662 A | 3/1959 | Eduard |
| 2,897,016 A | 7/1959 | Baker |
| 2,947,609 A | 8/1960 | Strong |
| 2,947,610 A | 8/1960 | Hall et al. |
| 3,559,802 A | 2/1971 | Eidus |
| 3,582,161 A | 6/1971 | Hudson |
| 3,603,652 A | 9/1971 | Youden |
| 3,650,714 A | 3/1972 | Farkas |
| 3,697,141 A | 10/1972 | Garrett |
| 3,707,107 A | 12/1972 | Bieri |
| 3,741,252 A | 6/1973 | Williams |
| 3,745,623 A | 7/1973 | Wentorf et al. |
| 3,752,541 A | 8/1973 | Mcvey |
| 3,866,987 A | 2/1975 | Garner |
| 3,869,947 A | 3/1975 | Vandenkieboom |
| 3,920,290 A | 11/1975 | Evarts |
| 4,085,634 A | 4/1978 | Sattler |
| 4,182,537 A | 1/1980 | Oster |
| 4,225,322 A | 9/1980 | Knemeyer |
| 4,238,137 A | 12/1980 | Furchak et al. |
| 4,285,550 A | 8/1981 | Blackburn et al. |
| 4,364,136 A | 12/1982 | Hattan |
| 4,398,772 A | 8/1983 | Odell |
| 4,410,054 A | 10/1983 | Nagel et al. |
| 4,410,284 A | 10/1983 | Herrick |
| 4,428,627 A | 1/1984 | Teramachi |
| 4,432,682 A | 2/1984 | McKewan |
| 4,468,138 A | 8/1984 | Nagel |
| 4,554,208 A | 11/1985 | MacIver et al. |
| 4,560,014 A | 12/1985 | Geczy |
| 4,620,601 A | 11/1986 | Nagel |
| RE32,380 E | 3/1987 | Wentorf, Jr. et al. |
| 4,662,348 A | 5/1987 | Hall et al. |
| 4,679,639 A | 7/1987 | Barr et al. |
| 4,689,847 A | 9/1987 | Huber |
| 4,720,199 A | 1/1988 | Geczy et al. |
| 4,729,440 A | 3/1988 | Hall |
| 4,732,490 A | 3/1988 | Masciarelli |
| 4,764,036 A | 8/1988 | McPherson |
| 4,796,670 A | 1/1989 | Russell et al. |
| 4,797,011 A | 1/1989 | Saeki et al. |
| 4,858,688 A | 8/1989 | Edwards et al. |
| 4,906,528 A | 3/1990 | Cerceau et al. |
| 4,958,692 A | 9/1990 | Anderson |
| 5,011,514 A | 4/1991 | Cho et al. |
| 5,011,515 A | 4/1991 | Frushour |
| 5,030,276 A | 7/1991 | Sung et al. |
| 5,037,212 A | 8/1991 | Justman et al. |
| 5,066,145 A | 11/1991 | Sibley et al. |
| 5,067,826 A | 11/1991 | Lemelson |
| 5,092,687 A | 3/1992 | Hall |
| 5,112,146 A | 5/1992 | Stangeland |
| 5,123,772 A | 6/1992 | Anderson |
| 5,151,107 A | 9/1992 | Cho et al. |
| 5,176,483 A | 1/1993 | Baumann et al. |
| 5,193,363 A | 3/1993 | Petty |
| 5,205,188 A | 4/1993 | Repenning et al. |
| 5,253,939 A | 10/1993 | Hall |
| 5,271,749 A | 12/1993 | Rai et al. |
| 5,351,770 A | 10/1994 | Cawthorne et al. |
| 5,358,041 A | 10/1994 | O'Hair |
| 5,358,337 A | 10/1994 | Codatto |
| 5,375,679 A | 12/1994 | Biehl |
| 5,385,715 A | 1/1995 | Fish |
| 5,447,208 A | 9/1995 | Lund et al. |
| 5,462,362 A | 10/1995 | Yuhta et al. |
| 5,464,086 A | 11/1995 | Coelln |
| 5,522,467 A | 6/1996 | Stevens et al. |
| 5,533,604 A | 7/1996 | Brierton |
| 5,538,346 A | 7/1996 | Frias et al. |
| 5,540,314 A | 7/1996 | Coelln |
| 5,560,716 A | 10/1996 | Tank et al. |
| 5,618,114 A | 4/1997 | Katahira |
| 5,645,617 A | 7/1997 | Frushour |
| 5,653,300 A | 8/1997 | Lund et al. |
| 5,715,898 A | 2/1998 | Anderson |
| 5,833,019 A | 11/1998 | Gynz-Rekowski |
| 5,855,996 A | 1/1999 | Corrigan et al. |
| 5,948,541 A | 9/1999 | Inspektor |
| 6,045,029 A | 4/2000 | Scott |
| 6,109,790 A | 8/2000 | Gynz-Rekowski et al. |
| 6,120,185 A | 9/2000 | Masciarelli, Jr. |
| 6,129,195 A | 10/2000 | Matheny |
| 6,152,223 A | 11/2000 | Abdo et al. |
| 6,164,109 A | 12/2000 | Bartosch |
| 6,209,185 B1 | 4/2001 | Scott |
| 6,279,716 B1 | 8/2001 | Kayatani et al. |
| 6,378,633 B1 | 4/2002 | Moore et al. |
| 6,409,388 B1 | 6/2002 | Lin |
| 6,457,865 B1 | 10/2002 | Masciarelli, Jr. |
| 6,488,103 B1 | 12/2002 | Dennis et al. |
| 6,488,715 B1 | 12/2002 | Pope et al. |
| 6,516,934 B2 | 2/2003 | Masciarelli, Jr. |
| 6,652,201 B2 | 11/2003 | Kunimori et al. |
| 6,655,845 B1 | 12/2003 | Pope et al. |
| 6,737,377 B1 | 5/2004 | Sumiya et al. |
| 6,764,219 B2 | 7/2004 | Doll et al. |
| 6,808,019 B1 | 10/2004 | Mabry |
| 6,814,775 B2 | 11/2004 | Scurlock et al. |
| 6,951,578 B1 | 10/2005 | Belnap et al. |
| 7,007,787 B2 | 3/2006 | Pallini et al. |
| 7,198,043 B1 | 4/2007 | Zhang |
| 7,234,541 B2 | 6/2007 | Scott et al. |
| 7,441,610 B2 | 10/2008 | Belnap et al. |
| 7,475,744 B2 | 1/2009 | Pope |
| 7,552,782 B1 | 6/2009 | Sexton et al. |
| 7,703,982 B2 | 4/2010 | Cooley |
| 7,737,377 B1 | 6/2010 | Dodal et al. |
| 7,845,436 B2 | 12/2010 | Cooley et al. |
| 7,861,805 B2 | 1/2011 | Dick et al. |
| 8,069,933 B2 | 12/2011 | Sexton et al. |
| 8,109,247 B2 | 2/2012 | Wakade et al. |
| 8,119,240 B2 | 2/2012 | Cooper |
| 8,163,232 B2 | 4/2012 | Fang et al. |
| 8,277,124 B2 | 10/2012 | Sexton et al. |
| 8,277,722 B2 | 10/2012 | DiGiovanni |
| 8,365,846 B2 | 2/2013 | Dourfaye et al. |
| 8,480,304 B1 | 7/2013 | Cooley et al. |
| 8,485,284 B2 | 7/2013 | Sithebe |
| 8,613,554 B2 | 12/2013 | Tessier et al. |
| 8,627,904 B2 | 1/2014 | Voronin |
| 8,678,657 B1 | 3/2014 | Knuteson et al. |
| 8,701,797 B2 | 4/2014 | Baudoin |
| 8,734,550 B1 | 5/2014 | Sani |
| 8,757,299 B2 | 6/2014 | DiGiovanni et al. |
| 8,763,727 B1 | 7/2014 | Cooley et al. |
| 8,764,295 B2 | 7/2014 | Dadson et al. |
| 8,881,849 B2 | 11/2014 | Shen et al. |
| 8,939,652 B2 | 1/2015 | Peterson et al. |
| 8,974,559 B2 | 3/2015 | Frushour |
| 9,004,198 B2 | 4/2015 | Kulkarni |
| 9,010,418 B2 | 4/2015 | Pereyra et al. |
| 9,045,941 B2 | 6/2015 | Chustz |
| 9,103,172 B1 | 8/2015 | Bertagnolli et al. |
| 9,127,713 B1 | 9/2015 | Lu |
| 9,145,743 B2 | 9/2015 | Shen et al. |
| 9,222,515 B2 | 12/2015 | Chang |
| 9,273,381 B2 * | 3/2016 | Qian ............... B22F 7/062 |
| 9,353,788 B1 | 5/2016 | Tulett et al. |
| 9,366,085 B2 | 6/2016 | Panahi |
| 9,404,310 B1 | 8/2016 | Sani et al. |
| 9,410,573 B1 | 8/2016 | Lu |
| 9,429,188 B2 | 8/2016 | Peterson et al. |
| 9,488,221 B2 | 11/2016 | Gonzalez |
| 9,562,562 B2 | 2/2017 | Peterson |
| 9,643,293 B1 | 5/2017 | Miess et al. |
| 9,702,401 B2 | 7/2017 | Gonzalez |
| 9,732,791 B1 | 8/2017 | Gonzalez |
| 9,776,917 B2 | 10/2017 | Tessitore et al. |
| 9,790,749 B2 | 10/2017 | Chen |

(56) References Cited

U.S. PATENT DOCUMENTS

| | | | |
|---|---|---|---|
| 9,790,818 B2 | 10/2017 | Berruet et al. | |
| 9,803,432 B2 | 10/2017 | Wood et al. | |
| 9,822,523 B1 | 11/2017 | Miess | |
| 9,840,875 B2 | 12/2017 | Harvey et al. | |
| 9,869,135 B1 | 1/2018 | Martin | |
| 10,113,362 B2 | 10/2018 | Ritchie et al. | |
| 10,294,986 B2 | 5/2019 | Gonzalez | |
| 10,307,891 B2 | 6/2019 | Daniels et al. | |
| 10,408,086 B1 | 9/2019 | Meier | |
| 10,465,775 B1* | 11/2019 | Miess | F16H 53/06 |
| 10,683,895 B2 | 6/2020 | Hall et al. | |
| 10,738,821 B2* | 8/2020 | Miess | F16C 17/02 |
| 10,807,913 B1 | 10/2020 | Hawks et al. | |
| 2002/0020526 A1 | 2/2002 | Male et al. | |
| 2003/0019106 A1 | 1/2003 | Pope et al. | |
| 2003/0075363 A1 | 4/2003 | Lin et al. | |
| 2003/0159834 A1 | 8/2003 | Kirk et al. | |
| 2004/0031625 A1 | 2/2004 | Lin et al. | |
| 2004/0219362 A1 | 11/2004 | Wort et al. | |
| 2004/0223676 A1 | 11/2004 | Pope et al. | |
| 2006/0060392 A1 | 3/2006 | Eyre | |
| 2006/0165973 A1 | 7/2006 | Dumm et al. | |
| 2007/0046119 A1 | 3/2007 | Cooley | |
| 2008/0217063 A1 | 9/2008 | Moore et al. | |
| 2008/0253706 A1 | 10/2008 | Bischof et al. | |
| 2009/0020046 A1 | 1/2009 | Marcelli | |
| 2009/0087563 A1 | 4/2009 | Voegele et al. | |
| 2010/0037864 A1 | 2/2010 | Dutt et al. | |
| 2010/0276200 A1 | 11/2010 | Schwefe et al. | |
| 2010/0307069 A1 | 12/2010 | Bertagnolli et al. | |
| 2011/0203791 A1 | 8/2011 | Jin et al. | |
| 2011/0220415 A1 | 9/2011 | Jin et al. | |
| 2011/0297454 A1 | 12/2011 | Shen et al. | |
| 2012/0037425 A1 | 2/2012 | Sexton et al. | |
| 2012/0057814 A1 | 3/2012 | Dadson et al. | |
| 2012/0225253 A1 | 9/2012 | DiGiovanni et al. | |
| 2012/0281938 A1 | 11/2012 | Peterson et al. | |
| 2013/0000442 A1 | 1/2013 | Wiesner et al. | |
| 2013/0004106 A1 | 1/2013 | Wenzel | |
| 2013/0146367 A1 | 6/2013 | Zhang et al. | |
| 2013/0170778 A1 | 7/2013 | Higginbotham et al. | |
| 2014/0037232 A1 | 2/2014 | Marchand et al. | |
| 2014/0254967 A1 | 9/2014 | Gonzalez | |
| 2014/0355914 A1 | 12/2014 | Cooley et al. | |
| 2015/0027713 A1 | 1/2015 | Penisson | |
| 2015/0132539 A1 | 5/2015 | Bailey et al. | |
| 2016/0153243 A1 | 6/2016 | Hinz et al. | |
| 2016/0312535 A1 | 10/2016 | Ritchie et al. | |
| 2017/0030393 A1 | 2/2017 | Phua et al. | |
| 2017/0138224 A1 | 5/2017 | Henry et al. | |
| 2017/0234071 A1 | 8/2017 | Spatz et al. | |
| 2017/0261031 A1 | 9/2017 | Gonzalez et al. | |
| 2018/0087134 A1 | 3/2018 | Chang et al. | |
| 2018/0209476 A1 | 7/2018 | Gonzalez | |
| 2018/0216661 A1 | 8/2018 | Gonzalez | |
| 2018/0264614 A1 | 9/2018 | Winkelmann et al. | |
| 2019/0063495 A1 | 2/2019 | Peterson et al. | |
| 2019/0136628 A1 | 5/2019 | Savage et al. | |
| 2019/0170186 A1 | 6/2019 | Gonzalez et al. | |
| 2020/0031586 A1 | 1/2020 | Miess et al. | |
| 2020/0032841 A1 | 1/2020 | Miess et al. | |
| 2020/0032846 A1* | 1/2020 | Miess | F16C 33/08 |
| 2020/0063503 A1 | 2/2020 | Reese et al. | |
| 2020/0182290 A1 | 6/2020 | Doehring et al. | |

FOREIGN PATENT DOCUMENTS

| | | |
|---|---|---|
| WO | 2004001238 A2 | 12/2003 |
| WO | 2006028327 A1 | 3/2006 |
| WO | 2017105883 A1 | 6/2017 |
| WO | 2018041578 A1 | 3/2018 |
| WO | 2018226380 A1 | 12/2018 |
| WO | 2019096851 A1 | 5/2019 |

OTHER PUBLICATIONS

Grossman, David, What the World Needs Now is Superhard Carbon, Popular Mechanics, https://www.popularmechanics.com/science/environment/a28970718/superhard-materials/,Sep. 10, 2019, 7 pages, Hearst Magazine Media, Inc.

Machinery's Handbook, 2016, Industrial Press, Inc., 30th edition, pp. 843 and 1055 (6 pages total).

Superhard Material, Wikipedia, https://en.wikipedia.org/wiki/Superhard_material, Retrieved from https://en.wikipedia.org/w/index.php?title=Superhard_material&oldid=928571597, Nov. 30, 2019, 14 pages.

Surface Finish, Wikipedia, https://en.wikipedia.org/wiki/Surface_finish,Retrieved from https://en.wikipedia.org/w/index.php?title=Surface_finish&oldid=919232937, Oct. 2, 2019, 3 pages.

Zeidan, Fouad Y.; Paquette, Donald J., Application of High Speed and High Performance Fluid Film Bearings in Rotating Machinery, 1994, pp. 209-234.

Bovenkerk, Dr. H. P.; Bundy, Dr. F. P.; Hall, Dr. H. T.; Strong, Dr. H. M.; Wentorf, Jun., Dr. R. H.; Preparation of Diamond, Nature, Oct. 10, 1959, pp. 1094-1098, vol. 184.

Chen, Y.; Nguyen, T; Zhang, L.C.; Polishing of polycrystalline diamond by the technique of dynamic friction—Part 5: Quantitative analysis of material removal, International Journal of Machine Tools & Manufacture, 2009, pp. 515-520, vol. 49, Elsevier.

Chen, Y.; Zhang, L.C.; Arsecularatne, J.A.; Montross, C.; Polishing of polycrystalline diamond by the technique of dynamic friction, part 1: Prediction of the interface temperature rise, International Journal of Machine Tools & Manufacture, 2006, pp. 580-587, vol. 46, Elsevier.

Chen, Y.; Zhang, L.C.; Arsecularatne, J.A.; Polishing of polycrystalline diamond by the technique of dynamic friction. Part 2: Material removal mechanism, International Journal of Machine Tools & Manufacture, 2007, pp. 1615-1624, vol. 47, Elsevier.

Chen, Y.; Zhang, L.C.; Arsecularatne, J.A.; Zarudi, I., Polishing of polycrystalline diamond by the technique of dynamic friction, part 3: Mechanism exploration through debris analysis, International Journal of Machine Tools & Manufacture, 2007, pp. 2282-2289, vol. 47, Elsevier.

Chen, Y.; Zhang, L.C.; Polishing of polycrystalline diamond by the technique of dynamic friction, part 4: Establishing the polishing map, International Journal of Machine Tools & Manufacture, 2009, pp. 309-314, vol. 49, Elsevier.

Dobrzhinetskaya, Larissa F.; Green, II, Harry W.; Diamond Synthesis from Graphite in the Presence of Water and SiO2: Implications for Diamond Formation in Quartzites from Kazakhstan, International Geology Review, 2007, pp. 389-400, vol. 49.

Hudson Bearings Air Cargo Ball Transfers brochure, 8 Pages, Columbus, Ohio.

Hudson Bearings Air Cargo Ball Transfers Installation and Maintenance Protocols, pp. 1-5.

International Search Report and Written Opinion dated Oct. 21, 2019 (issued in PCT Application No. PCT/US2019/043746) [14 pages].

International Search Report and Written Opinion dated Oct. 22, 2019 (issued in PCT Application No. PCT/US2019/043744) [11 pages].

International Search Report and Written Opinion dated Oct. 25, 2019 (issued in PCT Application No. PCT/US2019/044682) [20 pages].

International Search Report and Written Opinion dated Oct. 29, 2019 (issued in PCT Application No. PCT/US2019/043741) [15 pages].

International Search Report and Written Opinion dated Sep. 9, 2019 (issued in PCT Application No. PCT/US2019/043732) [10 pages].

Liao, Y.; Marks, L.; In situ single asperity wear at the nanometre scale, International Materials Reviews, 2016, pp. 1-17, Taylor & Francis.

Machinery's Handbook 30th Edition, Copyright Page and Coefficients of Friction Page, 2016, p. 158 (2 Pages total), Industrial Press, Inc., South Norwalk, U.S.A.

(56) References Cited

OTHER PUBLICATIONS

McCarthy, J. Michael; Cam and Follower Systems, PowerPoint Presentation, Jul. 25, 2009, pp. 1-14, UCIrvine The Henry Samueli School of Engineering.
McGill Cam Follower Bearings brochure, 2005, p. 1-19, Back Page, Brochure MCCF-05, Form #8991 (20 Pages total).
Motion & Control NSK Cam Followers (Stud Type Track Rollers) Roller Followers (Yoke Type Track Rollers) catalog, 1991, Cover Page, pp. 1-18, Back Page, Cat. No. E1421 2004 C-11, Japan.
Product Catalogue, Asahi Diamond Industrial Australia Pty. Ltd., Cover Page, Blank Page, 2 Notes Pages, Table of Contents, pp. 1-49 (54 Pages total).
RBC Aerospace Bearings Rolling Element Bearings catalog, 2008, Cover Page, First Page, pp. 1-149, Back Page (152 Pages total).
RGPBalls Ball Transfer Units catalog, pp. 1-26, 2 Back Pages (28 Pages total).
Sandvik Coromant Hard part turning with CBN catalog, 2012, pp. 1-42, 2 Back Pages (44 Pages total).
Sexton, Timothy N.; Cooley, Craig H.; Diamond Bearing Technology for Deep and Geothermal Drilling, PowerPoint Presentation, 2010, 16 Pages.
SKF Ball transfer units catalog, Dec. 2006, Cover Page, Table of Contents, pp. 1-36, 2 Back Pages (40 Pages total), Publication 940-711.
Sowers, Jason Michael, Examination of the Material Removal Rate in Lapping Polycrystalline Diamond Compacts, A Thesis, Aug. 2011, 2 Cover Pages, pp. iii-xiv, pp. 1-87 (101 Pages total).
Sun, Liling; Wu, Qi; Dai, Daoyang; Zhang, Jun; Qin, Zhicheng; Wang, Wenkui; Non-metallic catalysts for diamond synthesis under high pressure and high temperature, Science in China (Series A), Aug. 1999, pp. 834-841, vol. 42 No. 8, China.
United States Defensive Publication No. T102,901, published Apr. 5, 1983, in U.S. Appl. No. 298,271 [2 Pages].
USSynthetic Bearings and Waukesha Bearings brochure for Diamond Tilting Pad Thrust Bearings, 2015, 2 Pages.
USSynthetic Bearings brochure, 12 Pages, Orem, Utah.
Zhigadlo, N. D., Spontaneous growth of diamond from MnNi solvent-catalyst using opposed anvil-type high-pressure apparatus, pp. 1-12, Laboratory for Solid State Physics, Switzerland.
Zou, Lai; Huang, Yun; Zhou, Ming; Xiao, Guijian; Thermochemical Wear of Single Crystal Diamond Catalyzed by Ferrous Materials at Elevated Temperature, Crystals, 2017, pp. 1-10, vol. 7.
Anodizing, Wikipedia, https://en.wikipedia.org/wiki/Anodizing, Retrieved from https://en.wikipedia.org/w/index.php?title=Anodizing&oldid=893852932, Apr. 24, 2019, 9 Pages.
Burnishing (metal), Wikipedia, https://en.wikipedia.org/wiki/Burnishing_(metal), Retrieved from https://en.wikipedia.org/w/index.php?title=Burnishing_(metal)&oldid=886844724, Mar. 8, 2019, 4 Pages.
Case-hardening, Wikipedia, https://en.wikipedia.org/wiki/Case-hardening, Retrieved from https://en.wikipedia.org/w/index.php?title=Case-hardening&oldid=874552759, Dec. 20, 2018, 6 Pages.
Chemical Vapor Deposition, Wikipedia, https://en.wikipedia.org/wiki/Chemical_vapor_deposition, Retrieved from https://en.wikipedia.org/w/index.php?title=Chemical_vapor_deposition&oldid=883391805, Feb. 15, 2019, 11 Pages.
Chrome Plating, Wikipedia, https://en.wikipedia.org/wiki/Chrome_plating, Retrieved from https://en.wikipedia.org/w/index.php?title=Chrome_plating&oldid=887832693, Mar. 15, 2019, 5 Pages.
Cladding (metalworking), Wikipedia, https://en.wikipedia.org/wiki/Cladding_(metalworking), Retrieved from https://en.wikipedia.org/W/index.php?title=Cladding_(metalworking)&oldid=887733489, Mar. 14, 2019, 4 Pages.
Cold Working, Wikipedia, https://en.wikipedia.org/wiki/Cold_working, Retrieved from https://en.wikipedia.org/w/index.php?title=Cold_working&oldid=891035149, Apr. 5, 2019, 3 Pages.
Cryogenic, Deep Freezing, Houston Heat Treat, https://www.houstonheattreat.com/cryogenic-deep-freezing, Accessed on May 9, 2019, 2 Pages.
Heat Treating, Wikipedia, https://en.wikipedia.org/wiki/Heat_treating, Retrieved from https://en.wikipedia.org/w/index.php?title=Heat_treating&oldid=890678976, Apr. 2, 2019, 13 Pages.
Laser Peening, Wikipedia, https://en.wikipedia.org/wiki/Laser_peening, Retrieved from https://en.wikipedia.org/w/index.php?title=Laser_peening&oldid=880211596, Jan. 26, 2019, 10 Pages.
Phosphate Conversion Coating, Wikipedia, https://en.wikipedia.org/wiki/Phosphate_conversion_coating, Retrieved from https://en.wikipedia.org/w/index.php?title=Phosphate_conversion_coating&oldid=884507310, Feb. 22, 2019, 3 Pages.
Phosphating, Zinkpower, https://www.zinkpower.com/en/phosphating.html#gref, Accessed on May 9, 2019, 1 Page.
Physical Vapor Deposition, Wikipedia, https://en.wikipedia.org/wiki/Physical_vapor_deposition, Retrieved from https://en.wikipedia.org/w/index.php?title=Physical_vapor_deposition&oldid=894334082, Apr. 27, 2019, 4 Pages.
Plasma-enhanced Chemical Vapor Deposition, Wikipedia, https://en.wikipedia.org/wiki/Plasma-enhanced_chemical_vapor_deposition, Retrieved from hilps://en.wikipedia.org/w/index.php?title=Plasma-enhanced_chemical_vapor_deposition&oldid=869076591, Nov. 16, 2018, 4 Pages.
Shot Peening, Wikipedia, https://en.wikipedia.org/wiki/Shot_peening, Retrieved from https://en.wikipedia.org/w/index.php?title=Shot_peening&oldid=880436753, Jan. 27, 2019, 6 Pages.
Sub Zero Treatment, Houston Heat Treat, https://www.houstonheattreat.com/sub-zero-treatment, Accessed on May 9, 2019, 3 Pages.
Through Hardening, Paulo, https://www.paulo.com/services/heat-treating/through-hardening/, Accessed on May 9, 2019, 10 Pages.
Work Hardening, Wikipedia, https://en.wikipedia.org/wiki/Work_hardening, Retrieved from https://en.wikipedia.org/w/index.php?title=Work_hardening&oldid=886326852, Mar. 5, 2019, 8 Pages.
Linear Rolling Bearings ME EN 7960—Precision Machine Design Topic 8, Presentation, Accessed on Jan. 26, 2020, 23 Pages, University of Utah.
Linear-motion Bearing, Wikipedia, https://en.wikipedia.org/w/index.php?title=Linear-motion_bearing&oldid=933640111, Jan. 2, 2020, 4 Pages.
International Search Report and Written Opinion dated Aug. 3, 2020 (issued in PCT Application No. PCT/US20/21549) [11 pages].
International Search Report and Written Opinion dated Aug. 4, 2020 (issued in PCT Application No. PCT/US2020/034437) [10 pages].
International Search Report and Written Opinion dated Sep. 2, 2020 (issued in PCT Application No. PCT/US20/37048) [8 pages].
International Search Report and Written Opinion dated Sep. 8, 2020 (issued in PCT Application No. PCT/US20/35316) [9 pages].
International Search Report and Written Opinion dated Sep. 9, 2020 (issued in PCT Application No. PCT/US20/32196) [13 pages].
International Search Report and Written Opinion dated Jan. 15, 2021 (issued in PCT Application No. PCT/US2020/049382) [18 pages].

* cited by examiner

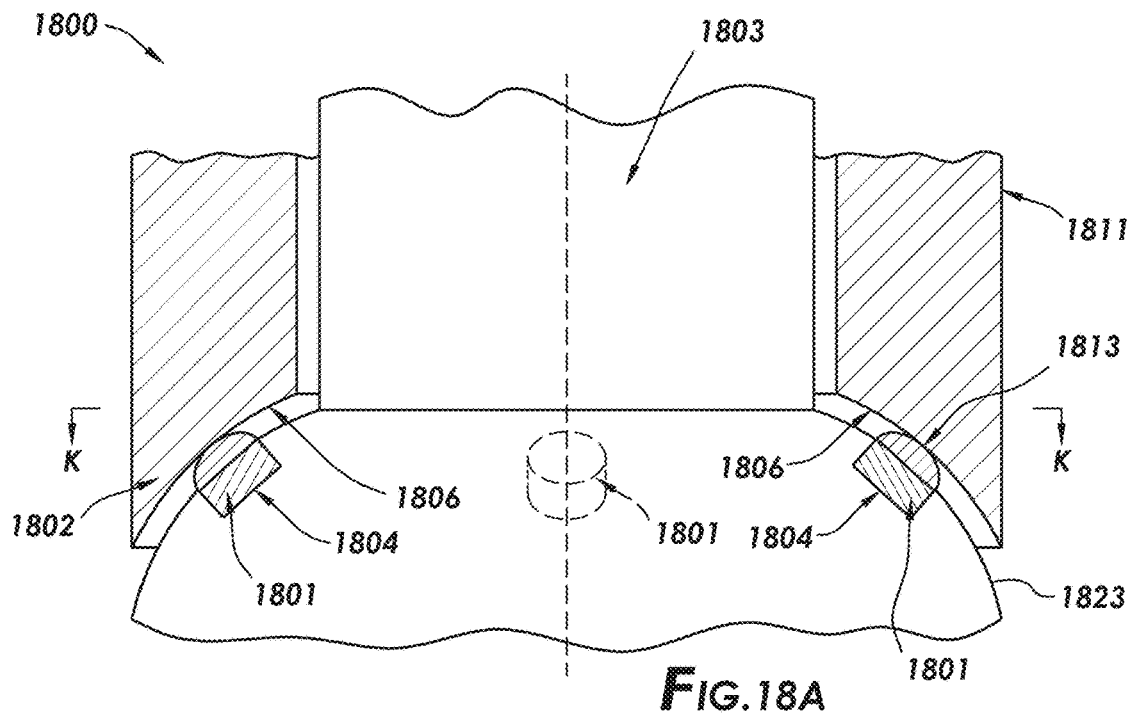
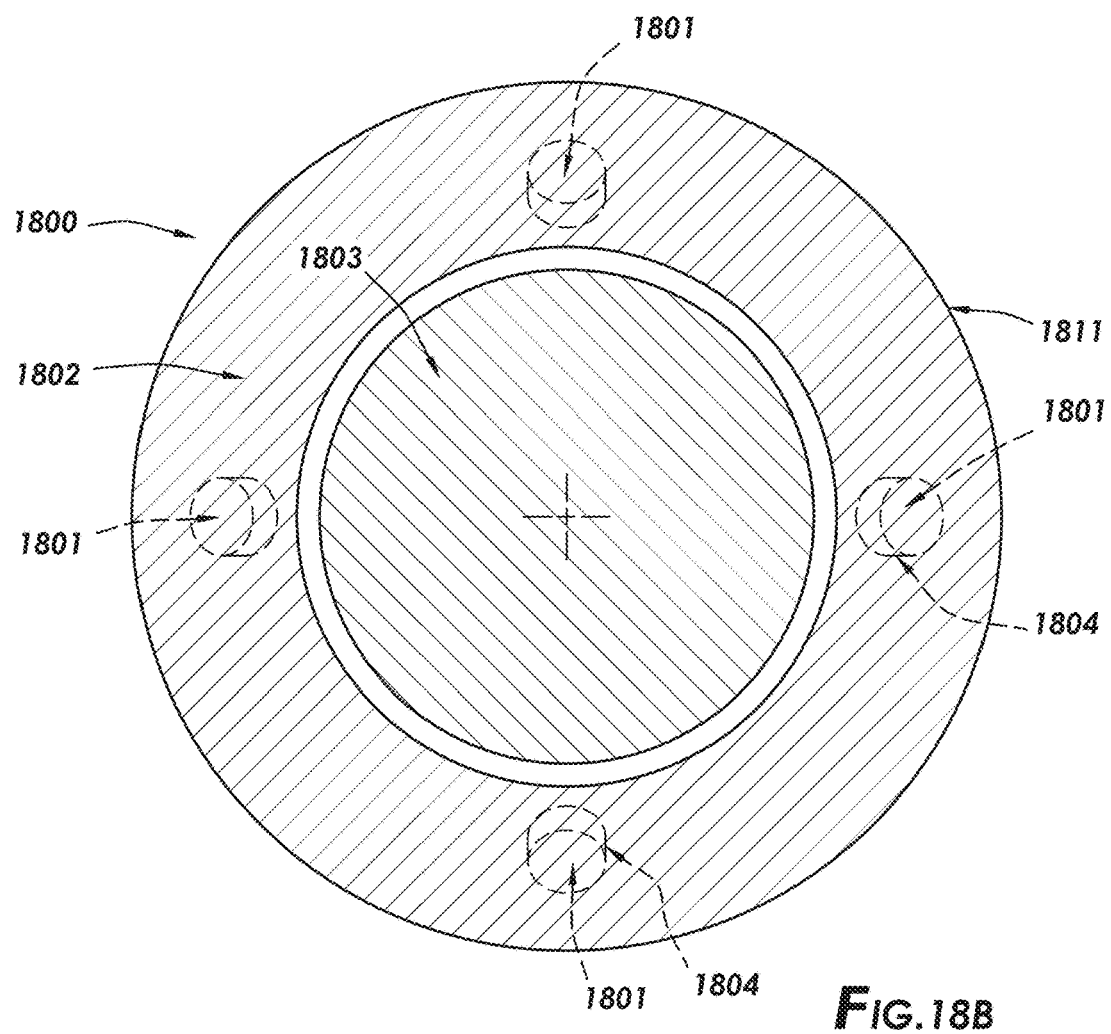

MATERIAL TREATMENTS FOR DIAMOND-ON-DIAMOND REACTIVE MATERIAL BEARING ENGAGEMENTS

CROSS-REFERENCE TO RELATED APPLICATIONS

The present application is a Continuation in Part (CIP) of U.S. patent application Ser. No. 16/049,588, which issued as U.S. Pat. No. 10,465,775 on Nov. 5, 2019, entitled "Cam Follower with Polycrystalline Diamond Engagement Element", filed on Jul. 30, 2018, the entirety of which is incorporated herein by reference. The present application is also a Continuation in Part (CIP) of U.S. patent application Ser. No. 16/049,608, which issued as U.S. Pat. No. 10,738,821 on Aug. 11, 2020, entitled "Polycrystalline Diamond Radial Bearing", filed on Jul. 30, 2018, the entirety of which is incorporated herein by reference. The present application is also a Continuation in Part (CIP) of U.S. patent application Ser. No. 16/049,61, which issued as U.S. Pat. No. 10,760,615 on Sep. 1, 2020, entitled "Polycrystalline Diamond Thrust Bearing and Element Thereof", filed on Jul. 30, 2018, the entirety of which is incorporated herein by reference.

FIELD

The present disclosure relates to material treatments, including surface treatments, for use on apparatus having diamond-on-diamond reactive material (e.g., diamond-on-steel) bearing engagements, including in cam followers, radial bearings, thrust bearings, and systems including the same, as well as methods of making and using the same.

BACKGROUND

Many components include multiple surfaces that are in moving engagement relative to one another. Some exemplary components that include such surfaces are bearings, including cam followers, radial bearings, and thrust bearings.

Cam followers are used to translate the motion imparted from a cam to another component. For instance, the rotating motion of a cylindrical cam can be translated into linear motion by a cam follower. Cam followers are employed in engagement with cams in a vast number of mechanisms including internal combustion engines, valves, pumps, compressors, machine tools, fabric processing equipment, downhole rotary steerable systems, downhole agitators, and drilling machines such as the drilling machine disclosed in U.S. patent application Ser. No. 15/430,254 (the '254 application), among other mechanisms. The '254 application, entitled "Drilling Machine", filed on Feb. 10, 2017, is incorporated herein in by reference in its entirety.

Cam followers are categorized into two primary groups, including roller cam followers and non-roller cam followers. For roller cam followers, yoke mount or stud mount rolling members are employed. These rolling members are of the bushing type, or employ ball, roller, or needle bearings or a combination thereof. Non-roller cam followers are classified as knife edge, flat-face, or curved shoe, which is sometimes called mushroom. Table 1, below, sets forth various cam followers, including associated drawbacks.

TABLE 1

| Roller | Drawbacks (roller) | Fixed | Drawbacks (fixed) |
|---|---|---|---|
| Bushing | Friction lower than Fixed followers but higher than other roller types | Knife Edge | High contact stress and rapid wear |
| Roller Bearings/Needle Bearings | Many small moving parts - In some applications require seals and lubrication | Flat Face | Higher friction forces due to sliding contact |
| Ball or Ball and Roller Bearings | Many small moving parts - In some applications require seals and lubrication | Curved Shoe or Mushroom | Higher friction forces due to sliding contact |

Thermally stable polycrystalline diamond (TSP), either supported or unsupported by tungsten carbide, and polycrystalline diamond compact (PDC or PCD) are sometimes used in tools, such as diamond tipped tools. Polycrystalline diamond, including thermally stable polycrystalline diamond and polycrystalline diamond compact, has been considered as contraindicated for use in the machining of ferrous metals, and other metals, metal alloys, composites, hardfacings, coatings, or platings that contain more than trace amounts of diamond catalyst or solvent elements including cobalt, nickel, ruthenium, rhodium, palladium, chromium, manganese, copper, titanium, or tantalum. Further, this prior contraindication of the use of polycrystalline diamond extends to so called "superalloys", including iron-based, cobalt-based and nickel-based superalloys containing more than trace amounts of diamond catalyst or solvent elements. The surface speeds typically used in machining of such materials typically ranges from about 0.2 m/s to about 5 m/s. Although these surface speeds are not particularly high, the load and attendant temperature generated, such as at a cutting tip, often exceeds the graphitization temperature of diamond (i.e., about 700° C.), which can, in the presence of diamond catalyst or solvent elements, lead to rapid wear and failure of components, such as diamond tipped tools. Without being bound by theory, the specific failure mechanism is believed to result from the chemical interaction of the carbon bearing diamond with the carbon attracting material that is being machined. An exemplary reference concerning the contraindication of polycrystalline diamond for diamond catalyst or solvent containing metal or alloy machining is U.S. Pat. No. 3,745,623, which is incorporated herein by reference in its entirety. The contraindication of polycrystalline diamond for machining diamond catalyst or solvent containing materials has long caused the avoidance of the use of polycrystalline diamond in all contacting applications with such materials.

Copper and titanium were not typically listed in the early General Electric documentation on diamond synthesis but have been added later. Relevant references include "Diamond Synthesis from Graphite in the Presence of Water and $SiO_2$"; Dobrzhinetskaya and Green, II International Geology Review Vol. 49, 2007 and "Non-metallic catalysts for diamond synthesis under high pressure and high temperature", Sun et al, Science in China August 1999.

Additional significant references that inform the background of the technology of this application are from the International Journal of Machine Tools & Manufacture 46 and 47 titled "Polishing of polycrystalline diamond by the technique of dynamic friction, part 1: Prediction of the interface temperature rise" and "Part 2, Material removal mechanism" 2005 and 2006. These references report on the dynamic friction polishing of PDC faces utilizing dry sliding contact under load with a carbon attractive steel disk. Key findings in these references indicate that polishing rate is more sensitive to sliding rate than load and that the rate of thermo-chemical reaction between the steel disk and the diamond surface reduces significantly as the surface finish of the diamond surface improves. The authors also reference prior conclusions that the thermo-chemical reaction between the steel disk and the PDC face does not occur at sliding speeds below 10.5 m/s at a pressure of 27 MPa. These references are incorporated herein by reference, as if set out in full.

Radial bearings are used in tools, machines, and components to bear load. Polycrystalline diamond radial bearings have been developed that have polycrystalline diamond bearing surfaces that mate with non-ferrous superhard materials or, much more commonly, with tightly-matched complementary polycrystalline diamond surfaces. An exemplary reference concerning polycrystalline diamond radial bearings, either in contact with superhard materials or with matching polycrystalline diamond, is U.S. Pat. No. 4,764,036, to McPherson and assigned to Smith International Inc., the entirety of which is incorporated herein by reference. As would be understood by one skilled in the art, hardness may be determined using the Brinell scale, such as in accordance with ASTM E10-14.

So called high-performance polycrystalline diamond bearings are designed particularly for harsh environments, such as downhole drilling and pumping environments or wind turbine energy units, and utilize sliding, mated, overlapping polycrystalline diamond elements. This requires a large number of polycrystalline diamond elements, each shaped with an exacting outer profile. For example, rotor mounted polycrystalline diamond elements are shaped with a convex outer profile substantially matched to an outer diameter of the rotor. Stator polycrystalline diamond elements are shaped with a concave outer profile substantially matched to an inner diameter of the stator. This shaping of the polycrystalline diamond elements requires exacting precision and is expensive, requiring, for example, cutting with electrical discharge machining (EDM), lasers, or diamond grinding. The polycrystalline diamond elements must then be mounted in precise locations, at precise alignments and at precisely prescribed heights or exposures to ensure mated sliding engagement. The goal in such components is full-face contact of the polycrystalline diamond elements as bearing areas. Thus, the processes used to prepare such polycrystalline diamond elements are expensive and time consuming, with significant opportunities for variance resulting in scrapped parts. Failures in alignment and/or exposure are likely to produce so called "edge clashing" as the polycrystalline diamond elements rotate against each other producing fractured elements and ultimately resulting in bearing failure.

Less expensive radial bearings utilizing polycrystalline diamond have been proposed where a nearly full circumferential array of contoured polycrystalline diamond elements is mounted on a rotor with superhard material mounted on the stator. Although this approach requires fewer polycrystalline diamond elements than the previously described approaches, it still requires contouring of the rotor mounted elements. In addition, such so called superhard materials tend to be more brittle and prone to impact damage than the diamond reactive materials disclosed herein.

Thrust bearings are used in tools, machines, and components to, at least predominately, bear axial load. Over time, as polycrystalline diamond bearings were developed, bearing makers either matched the polycrystalline diamond bearing surfaces with non-ferrous, so called superhard materials or, much more commonly, with tightly facing complementary polycrystalline diamond surfaces. FIG. 20 depicts a partial cutaway view of thrust bearing 2000, having a polycrystalline diamond to polycrystalline diamond interface. Exemplary references concerning polycrystalline diamond thrust bearings are U.S. Pat. No. 4,468,138 to Nagel; U.S. Pat. No. 4,560,014 to Geczy; U.S. Pat. No. 9,702,401 to Gonzalez; and U.S. Defensive Publication T102,90 to Offenbacher, the entireties of each of which are incorporated herein by reference.

High performance polycrystalline diamond thrust bearings designed particularly for harsh environments, such as downhole drilling and pumping, or wind turbine energy units, typically utilize sliding, mated, overlapping polycrystalline diamond elements. This requires a large number of polycrystalline diamond elements, each in exacting flat engagement with an opposing set of polycrystalline diamond elements. The polycrystalline diamond elements must be mounted at exactly prescribed heights or exposures to insure mated sliding engagement. The goal in the prior art is full face contact of the polycrystalline diamond elements on both faces as bearing areas. Failures in alignment and/or exposure are likely to produce point loading, uneven load sharing or "edge clashing" as the polycrystalline diamond elements rotate against each other producing fractured elements and, ultimately, bearing failure. Polycrystalline diamond is more brittle and prone to impact damage than diamond reactive material (defined herein below).

Table 2, below, sets for a summary of coefficients of friction for various materials, including polished polycrystalline diamond, in both a dry, static state and a lubricated, static state, where the "first material" is the material that is moved relative to the "second material" to determine the CoF of the first material.

TABLE 2*

| First Material | Second Material | Dry Static | Lubricated Static |
|---|---|---|---|
| Hard Steel | Hard Steel | 0.78 | 0.05-0.11 |
| Tungsten Carbide | Tungsten Carbide | 0.2-0.25 | 0.12 |
| Diamond | Metal | 0.1-0.15 | 0.1 |
| Diamond | Diamond | 0.1 | 0.05-0.1 |
| Polished PDC | Polished PDC | Estimated 0.08-1 | Estimated 0.05-0.08 |
| Polished PDC | Hard Steel | Estimated 0.08-0.12 | Estimated 0.08-0.1 |

*References include Machinery's Handbook; Sexton TN, Cooley CH. Polycrystalline diamond thrust bearings for down-hole oil and gas drilling tools. Wear 2009; 267: 1041-5.

It should be emphasized that the above numerical values are based on dry running in air. Clearly, if running in a liquid cooled, lubricated environment, higher speeds and loads can be attained without commencing the thermo-chemical reaction. Also, of note is the lower thermo-chemical response of a polycrystalline diamond face that has been polished.

BRIEF SUMMARY

One embodiment of the present disclosure includes a method of bearing load in an apparatus. The method includes engaging a bearing surface with an opposing bearing surface. The bearing surface includes polished polycrystalline diamond. The opposing bearing surface includes a diamond reactive material. The diamond reactive material is hardened.

Another embodiment of the present disclosure includes an apparatus. The apparatus includes a bearing surface that includes polished polycrystalline diamond. The apparatus includes an opposing bearing surface that includes a diamond reactive material. The diamond reactive material is hardened. The bearing surface and the opposing bearing surface are movably engaged.

Some aspects of the present disclosure include a cam assembly, including a cam and a cam follower, as well as to apparatus, systems, and machines including the same. The cam includes an opposing diamond reactive engagement surface. The cam follower includes a polycrystalline diamond element. The polycrystalline diamond element includes an engagement surface that is engaged with the opposing engagement surface of the cam.

Additional aspects of the present disclosure include methods of use of such cam followers, cam assemblies, and apparatus, systems, and machines including the same. The methods include providing a cam follower that includes a polycrystalline diamond element, including an engagement surface thereon. The methods include engaging the engagement surface with an opposing diamond reactive engagement surface of a cam.

Some aspects of the present disclosure include a radial bearing assembly that includes polycrystalline diamond elements. Each polycrystalline diamond element includes an engagement surface that is in sliding engagement with an opposing engagement surface. The opposing engagement surface is formed of or includes at least some diamond reactive material.

Other aspects of the present disclosure include a method of interfacing engagement between components, including between rotors and stators. The method includes providing a radial bearing assembly that includes polycrystalline diamond elements, with each polycrystalline diamond element having an engagement surface. The method includes interfacing engagement between a rotor and a stator with the polycrystalline diamond elements, such that the engagement surfaces are in sliding engagement with an opposing engagement surface that includes at least some diamond reactive material.

Further aspects of the present disclosure include a method of designing a radial bearing assembly for a rotor and stator. The radial bearing assembly includes polycrystalline diamond elements, with each polycrystalline diamond element including an engagement surface in sliding engagement with an opposing engagement surface that is formed of or contains at least some diamond reactive material. The method includes determining if the maximum sliding speed of the rotor and stator is less than a preset limit (e.g. 10.5 m/s). If the maximum sliding speed is less than the preset limit, the method includes selecting a configuration of the radial bearing assembly within the stator and rotor. The method includes calculating a maximum contact pressure per polycrystalline diamond element based on a selected number of polycrystalline diamond elements in the selected configuration of the radial bearing assembly within the stator and rotor and based on anticipated load. The calculated maximum contact pressure is optionally multiplied by a safety factor. The method includes determining if the calculated maximum contact pressure, optionally multiplied by the safety factor, is below a preset maximum allowable pressure. If the calculated maximum contact pressure is determined to be below the preset maximum allowable pressure, the method includes deploying at least a minimum number of the polycrystalline diamond elements on the selected configuration of the radial bearing assembly within the stator and rotor. If the number of the polycrystalline diamond elements fit on the selected configuration of the radial bearing assembly within the stator and rotor, the method includes making the assembly of the radial bearing assembly, rotor, and stator.

Some aspects of the present disclosure include a thrust bearing assembly. The thrust bearing assembly includes a thrust face having a polycrystalline diamond element. The polycrystalline diamond element has an engagement surface thereon. The thrust bearing assembly includes an opposing thrust face formed of or including at least some diamond reactive material. The thrust face is coupled with the opposing thrust face such that the engagement surface is in contact with the opposing thrust face.

Other aspects of the present disclosure include a method of bearing axial load. The method includes coupling a thrust face with an opposing thrust face. The thrust face includes a polycrystalline diamond element coupled therewith. The polycrystalline diamond element has an engagement surface thereon. The opposing thrust face is formed of or including at least some diamond reactive material. The thrust face is coupled with the opposing thrust face such that the engagement surface is in contact with the opposing thrust face.

Another aspect of the present disclosure includes a thrust bearing assembly that includes a thrust ring defining a thrust face. A polycrystalline diamond element is coupled with the thrust face and defines an engagement surface. The thrust bearing assembly also includes an opposing thrust ring defining an opposing thrust face. The opposing thrust ring is formed of or including at least some diamond reactive material. The engagement surface is in contact with the opposing thrust face.

BRIEF DESCRIPTION OF THE DRAWINGS

So that the manner in which the features and advantages of the systems, apparatus, and/or methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 18A is a partial side view of a rotor and stator radial bearing assembly of an embodiment of the technology of this application.

FIG. 18B is a cross-sectional view of the assembly of FIG. 18A taken along line K-K.

Figure 1:
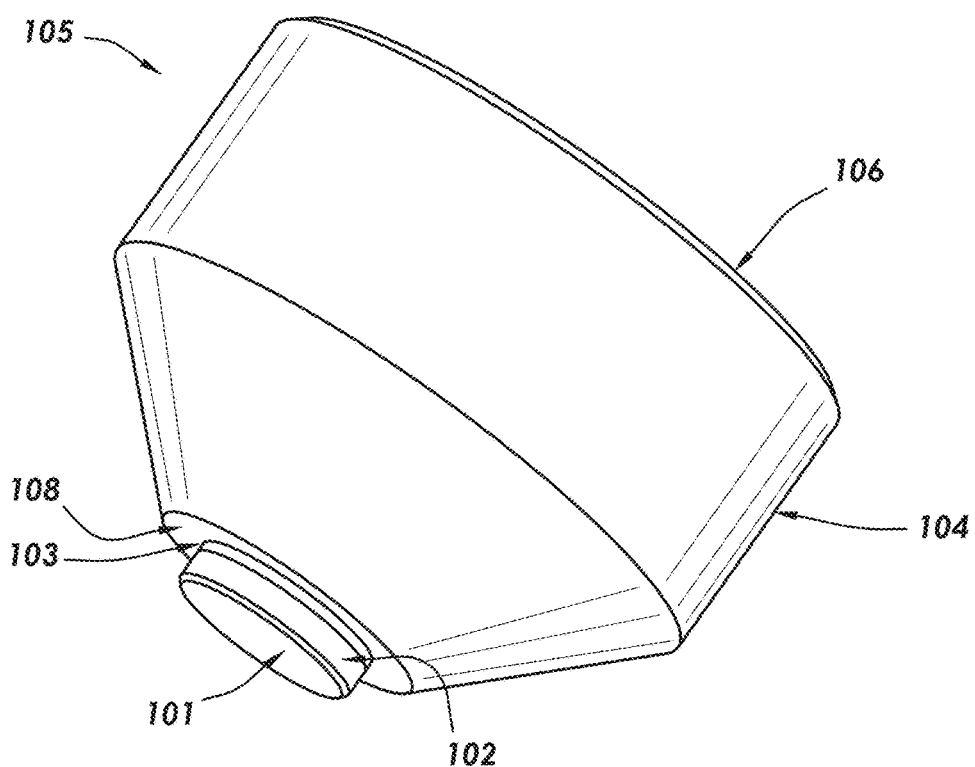
FIG. 1 is an isometric view of a cam follower in accordance with certain aspects of the present disclosure.

Systems, apparatus, and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

Certain embodiments of the present disclosure include apparatus having multiple surfaces in moving engagement with one another (e.g., diamond-on-steel engagements), including bearing surfaces, such as cam followers, radial bearings, thrust bearings, and systems including the same, as well as methods of making, assembling, and using the same. Some embodiments of the present disclosure provide for material treated (e.g., surface treated) apparatus, methods of treating materials, and methods of making, assembling, and using the same.

Definitions, Examples, and Standards

Lapped and Polished—As used herein, a surface is defined as "highly lapped" if the surface has a surface finish of 20 µin (about 0.51 microns) or about 20 µin (about 0.51 microns), such as a surface finish ranging from about 18 (about 0.46 microns) to about 22 µin (about 0.56 microns). As used herein, a surface is defined as "polished" if the surface has a surface finish of less than about 10 µin (about 0.25 microns), or of from about 2 (about 0.05 microns) to about 10 µin (about 0.25 microns). As used herein, a surface is defined as "highly polished" if the surface has a surface finish of less than about 2 µin (about 0.05 microns), or from about 0.5 µin (about 0.01 microns) to less than about 2 µin (about 0.05 microns). As would be understood by one skilled in the art, surface finish may be measured with a profilometer or with Atomic Force Microscopy. Polycrystalline diamond that has been polished to a surface finish of 0.5 µin (about 0.01 microns) has a coefficient of friction that is about half of standard lapped polycrystalline diamond with a surface finish of 20-40 µin. U.S. Pat. Nos. 5,447,208 and 5,653,300 to Lund et al., the entireties of which are incorporated herein by reference, provide disclosure relevant to polishing of polycrystalline diamond.

Diamond Reactive Material—As used herein, a "diamond reactive material" is a material that contains more than trace amounts of diamond catalyst or diamond solvent. As used herein, a diamond reactive material that contains more than "trace amounts" of diamond catalyst or diamond solvent contains at least 2 percent by weight (wt. %) diamond solvent or diamond catalyst. In some aspects, the diamond reactive materials disclosed herein contain from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond catalyst or diamond solvent. As used herein, a "diamond catalyst" is a chemical element, compound, or material capable of catalyzing graphitization of polycrystalline diamond, such as under load and at a temperature at or exceeding the graphitization temperature of diamond (i.e., about 700° C.). As used herein, a "diamond solvent" is a chemical element, compound, or material capable of solubilizing polycrystalline diamond, such as under load and at a temperature at or exceeding the graphitization temperature of diamond. Thus, diamond reactive materials include materials that, under load and at a temperature at or exceeding the graphitization temperature of diamond, can lead to wear, sometimes rapid wear, and failure of components formed of polycrystalline diamond, such as diamond tipped tools. Diamond reactive materials include, but are not limited to, metals, metal alloys, and composite materials that contain more than trace amounts of diamond catalyst or solvent elements. In some aspects, the diamond reactive materials are in the form of hard facings, coatings, or platings. For example, and without limitation, the diamond reactive material may be ferrous, cobalt, nickel, ruthenium, rhodium, palladium, chromium, manganese, copper, titanium, tantalum, aluminum, or alloys thereof. In some embodiments, the diamond reactive material is a steel or cast iron. In some aspects, the diamond reactive material is a superalloy including, but not limited to, iron-based, cobalt-based and nickel-based superalloys. In certain aspects, the diamond reactive material is not and/or does not include (i.e., specifically excludes) so called "superhard materials."

Superhard Materials—As would be understood by one skilled in the art, "superhard materials" are a category of materials defined by the hardness of the material, which may be determined in accordance with the Brinell, Rockwell, Knoop and/or Vickers scales. For example, superhard materials include materials with a hardness value exceeding 40 gigapascals (GPa) when measured by the Vickers hardness test. As used herein, superhard materials include materials that are at least as hard as tungsten carbide tiles and/or cemented tungsten carbide, such as is determined in accordance with one of these hardness scales, such as the Brinell scale. One skilled in the art would understand that a Brinell scale test may be performed, for example, in accordance with ASTM E10-14; the Vickers hardness test may be performed, for example, in accordance with ASTM E384; the Rockwell hardness test may be performed, for example, in accordance with ASTM E18; and the Knoop hardness test may be performed, for example, in accordance with ASTM E384. The "superhard materials" disclosed herein include, but are not limited to, tungsten carbide (e.g., tile or cemented), infiltrated tungsten carbide matrix, silicon carbide, silicon nitride, cubic boron nitride, and polycrystalline diamond. Thus, in some aspects, the "diamond reactive material" is partially or entirely composed of material(s) (e.g., metal, metal alloy, composite) that is softer (less hard) than superhard materials, such as less hard than tungsten carbide (e.g., tile or cemented), as determined in accordance with one of these hardness tests, such as the Brinell scale. As would be understood by one skilled in the art, hardness may be determined using the Brinell scale, such as in accordance with ASTM E10-14. As would be understood by one skilled in the art, a "superalloy" is a high-strength alloy that can withstand high temperatures.

Engagement Surface—As used herein, "engagement surface" refers to the surface of a material (e.g., polycrystalline diamond or diamond reactive materials) that is positioned and arranged within an assembly (e.g., within a bearing assembly) such that, in operation of the assembly, the engagement surface interfaces contact between two components of the assembly (e.g., between a stator and a rotor or a thrust face and opposing thrust face or a cam and cam follower). The "engagement surface" may also be referred to herein as the "bearing surface", "thrust bearing surface", "axial bearing surface", "thrust face", "opposing engagement surface", or other surface, depending on the particular application.

Polycrystalline Diamond—In some embodiments, the polycrystalline diamond elements disclosed herein may have diameters as small as 3 mm (about ⅛") or as large as 75 mm (about 3"), for example, depending on the application and the configuration and diameter of the engaged cam. Some of the polycrystalline diamond elements disclosed herein will have diameters of from 8 mm (about 5/16") to 25 mm (about 1"). One skilled in the art would understand that the polycrystalline diamond elements are not limited to these particular dimensions and may vary in size and shape depending on the particular application. In some aspects, the polycrystalline diamond elements are non-leached, leached, leached and backfilled, coated via chemical vapor deposition (CVD), or processed in various ways as known in the art. In certain applications, the polycrystalline diamond elements disclosed herein have increased cobalt content transitions layers between the outer polycrystalline diamond surface and a supporting tungsten carbide slug. In some applications, the polycrystalline diamond elements disclosed herein may be unsupported by tungsten carbide and may be substantially "standalone", discrete polycrystalline diamond bodies that are directly mounted (e.g., onto a cam follower body or a bearing component). In embodiments where the polycrystalline diamond elements are planar face or domed polycrystalline diamond elements, the polycrystalline diamond elements may be mounted in a manner to allow the polycrystalline diamond elements to rotate about its own axis. Reference is made to U.S. Pat. No. 8,881,849, to Shen et. al., as a non-limiting example of methods to provide for a polycrystalline diamond element that spins about its own axis while in facial contact with a diamond reactive material.

The polycrystalline diamond elements disclosed herein are, in some embodiments, not shaped to conform precisely to the opposing engagement surface. In certain embodiments, the sliding interface contact area of the engagement surface of the polycrystalline diamond element is less than 80%, or less than 75%, or less than 70%, or less than 60% of the total surface area of the polycrystalline diamond element. As used herein, the "contact area" of the engagement surface refers to the surface area of the engagement surface that is in contact with the opposing engagement surface.

Although the polycrystalline diamond elements are most commonly available in cylindrical shapes, it is understood that the technology of the application may be practiced with polycrystalline diamond elements that are square, rectangular, oval, any of the shapes described herein with reference to the Figures, or any other appropriate shape known in the art.

In some aspects, the polycrystalline diamond elements are subjected to edge radius treatment. Edge radius treatment of polycrystalline diamond elements are well known in the art. In some embodiments of the technology of this application that employ planar or concave polycrystalline diamond elements, it is preferred to employ edge radius treatment of such polycrystalline diamond elements. One purpose of employing an edge radius treatment is to reduce or avoid potential for outer edge cutting or scribing at the outer limits of the linear engagement area of a given polycrystalline diamond elements with the opposing engagement surface (e.g., a curved surface).

Hardened and Non-Hardened Materials and Surfaces—
As used herein, a "hardened material" is a material that has been subjected to hardening, resulting in an increase in the hardness of the material at least at the surface of the material, where the hardness in determined in accordance with the Brinell, Rockwell, Knoop and/or Vickers scales. That is, the material has a first hardness prior to subjection to the hardening, and the material has a second hardness after subjection to the hardening, where the second hardness is harder than the first hardness. The increase in hardness may be throughout the entirety of the material, or may be an increase in hardness of only portions of the material, such as at one or more surfaces of the material. As described in more detail elsewhere herein, various process may be used to increase the hardness of a material, either uniformly throughout the material or discretely at the surface of the material. Some exemplary process, which are described in more detail below, include cold working and work hardening processes, such as burnishing and shot peening; and heat-treating processes, such as through hardening, case hardening, and subzero, cryogenic, deep freezing treatments.

As used herein, a "non-hardened material" is a material that has not been subjected to hardening, such that no increase in the hardness of the material occurs.

Plated, Non-Plated, Coated, and Non-Coated Surfaces—
As used herein, "plated surfaces" and "coated surfaces" are surfaces that have been subjected to plating or coating, respectively, resulting in the presence of plating or a coating layer on the surface. As described in more detail elsewhere herein, various process may be used to apply plating or coating layers to a surface. Some exemplary process, which are described in more detail below, include electroplating and electroless plating, including chromium plating; phosphating; vapor deposition, including physical vapor deposition (PVD) and chemical vapor deposition (CVD); and anodizing.

As used herein, "non-plated surfaces" and "non-coated surfaces" are surfaces that have not been subjected to plating or coating, respectively, such that the surface lacks a plating or coating, respectively.

Cladding—As used herein, a "cladded surface" is a surface that has been subjected to cladding, resulting in the presence of cladding on the surface. As described in more detail elsewhere herein, various process may be used to apply cladding to a surface. Some exemplary processes, which are described in more detail below, include roll bonding, laser cladding, and explosive welding.

As used herein, "non-cladded surface" is a surface that has not been subjected to cladding, such that the surface lacks cladding thereon.

Cam Follower

Certain aspects of the present disclosure include cam followers and cam assemblies, as well as to apparatus and systems including the same, and to methods of use thereof. The cam follower may be a fixed cam follower. In some such aspects, the fixed cam follower has a lower coefficient of friction than existing fixed-type cam followers.

The cam follower disclosed herein may have a higher load capacity than existing roller-type cam followers. Thus, in some aspects, the cam follower disclosed herein is more robust and longer lasting than existing roller-type followers.

A cam follower in accordance with certain aspects of the present disclosure is described with reference to FIG. 1. Cam follower 105 includes cam follower body 104. Cam follower body 104 may be composed of any of variety of materials known to those skilled in the art. Cam follower body 104 has first end 106 and second end 108. One skilled in the art would understand that cam follower body 104 is not limited to the particular shape, as shown in FIG. 1, and may be any of a variety of other suitable shapes, depending upon the particular application and use.

At second end 108, cam follower body 104 is coupled to or integral with polycrystalline diamond element 102, which is composed of polycrystalline diamond. In some aspects, polycrystalline diamond element 102 is composed of thermally stable polycrystalline diamond, either supported or unsupported by tungsten carbide, or polycrystalline diamond compact.

Polycrystalline diamond element 102 is attached to cam follower body 104 via attachment 103. Polycrystalline diamond element 102 may be attached to cam follower body 104 via any of a variety of attachment methods including, but not limited to, gluing, brazing, LS bonding, press fitting, or another attachment means or method known in the art.

Polycrystalline diamond element 102 includes engagement surface 101. Engagement surface 101 may be a polycrystalline diamond layer. Engagement surface 101 may be a planar surface, as is shown in FIG. 1. In other aspects, engagement surface 101 is not a planar surface. In some aspects, engagement surface 101 is a surface of polycrystalline diamond element 102 having been lapped or polished, optionally highly lapped or highly polished. Although highly polished polycrystalline diamond elements are preferred in at least some applications, the scope of this disclosure is not limited to highly polished polycrystalline diamond elements and includes polycrystalline diamond elements that are highly lapped or polished. In some aspects, engagement surface 101 has a surface finish ranging from 0.5 μin (about 0.01 microns) to 40 μin (about 1.02 microns), or from 2 μin (about 0.05 microns) to 30 μin (about 0.76 microns), or from 5 μin (about 0.13 microns) to 20 μin (about 0.51 microns), or from 8 μin (about 0.2 microns) to 15 μin (about 0.38 microns), or any range therebetween.

While polycrystalline diamond element 102 is shown as being shaped, generally, as disc positioned on second end 108 of cam follower body 104, one skilled in the art would understand that polycrystalline diamond element 102 can be any of a variety of shapes and can be arranged on cam follower body 104 in other configurations, depending on the particular application and use thereof.

Cam Follower—Assembly

Certain aspects of the present disclosure include cam assemblies, which include cam followers engaged with cams (camming components), as well as to apparatus and systems including the same, and to methods of use thereof. Cam assemblies in accordance with certain aspects of the present disclosure are described with reference to FIGS. 2A-6. In FIGS. 2A-6, like reference numerals refer to like elements. For example, an exemplary cam follower is identified with reference numeral "105" in FIG. 1 and is identified with reference numerals "205" in FIGS. 2A and 2B.

Figure 2A:
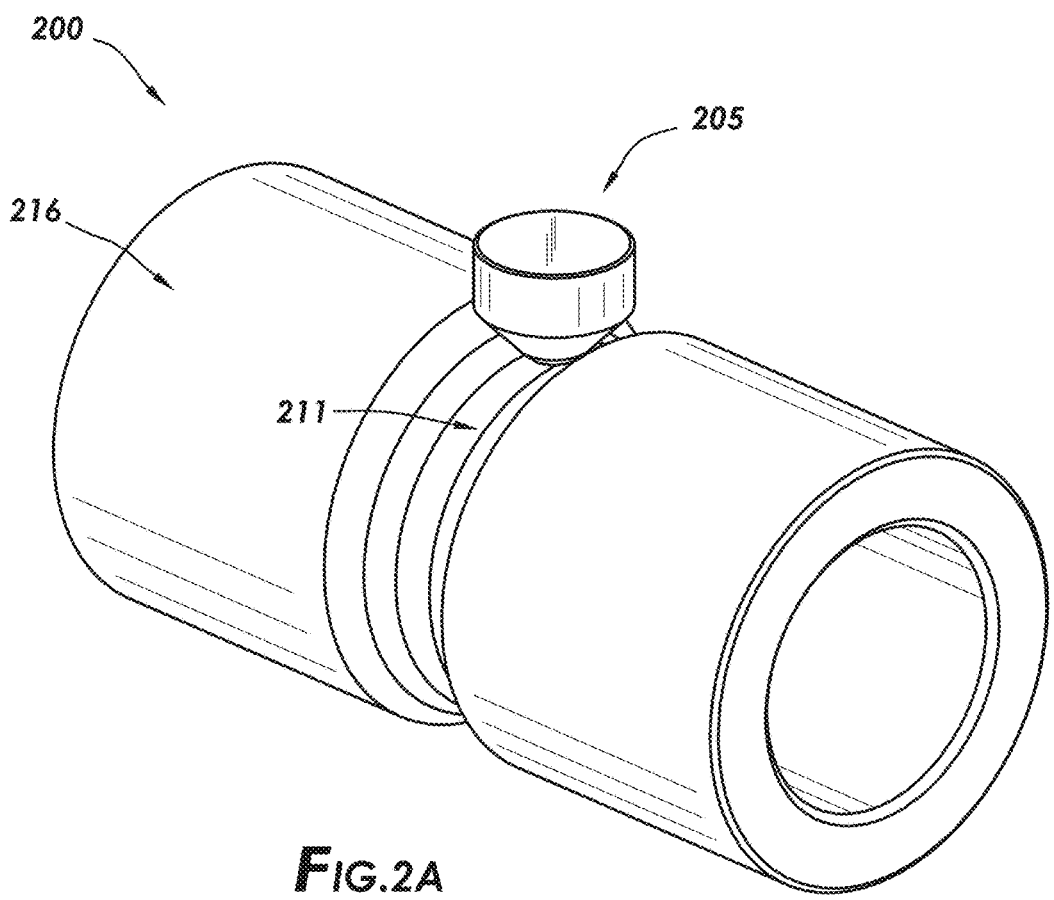
FIG. 2A is an isometric view of a cam assembly including a cam follower in sliding engagement with a camming rotor in accordance with certain aspects of the present disclosure.
Figure 2B:
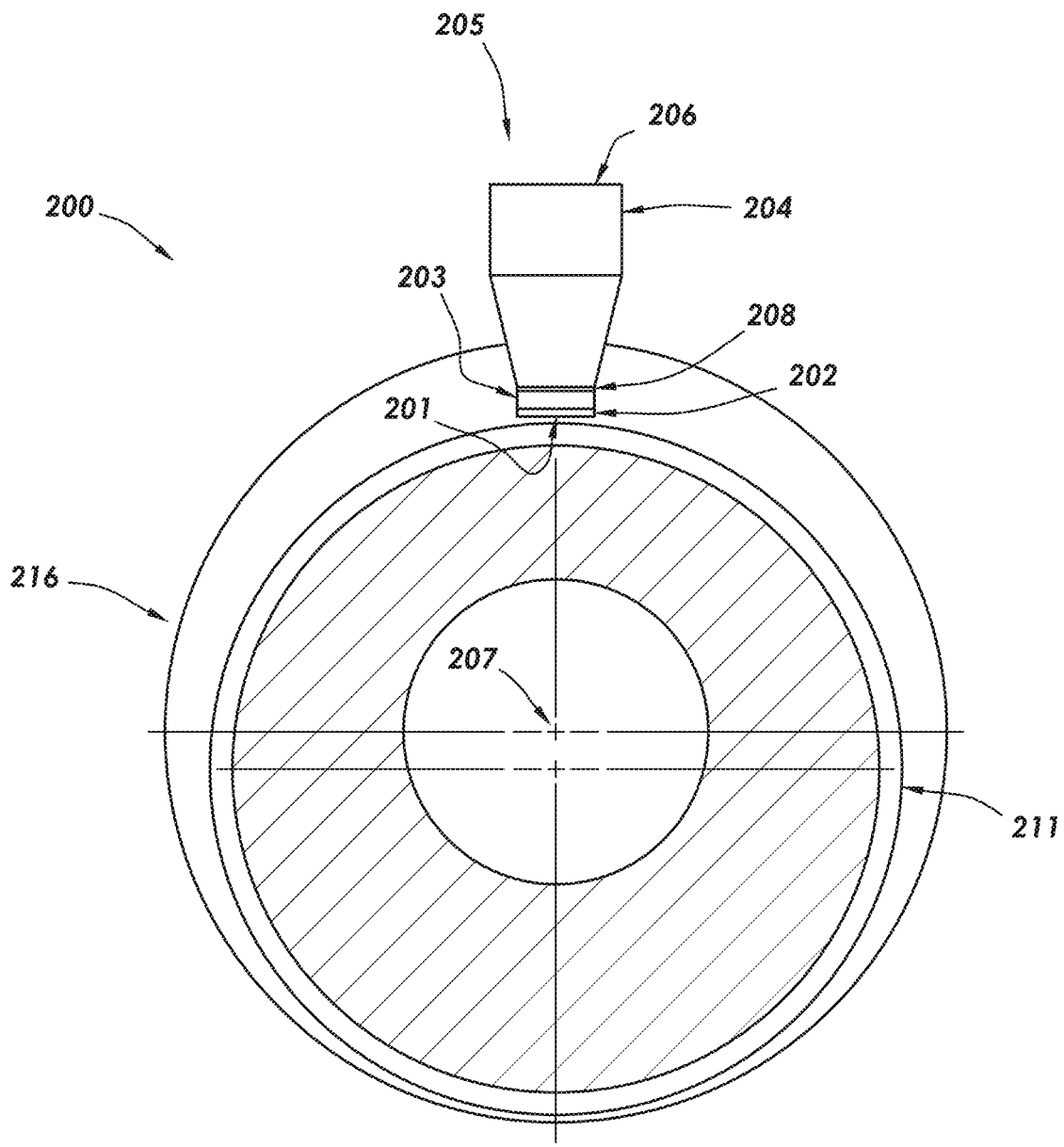
FIG. 2B is a cross-sectional view of the cam assembly of FIG. 2A.

FIG. 2A is an isometric view of cam assembly 200, and FIG. 2B is a cross-sectional view of cam assembly 200. With reference to FIGS. 2A and 2B, cam assembly 200 includes cam follower 205. As with cam follower 105, cam follower 205 includes cam follower body 204, having first end 206 and second end 208, with polycrystalline diamond element 202 coupled, via attachment 203, to cam follower body 204 at second end 208. Engagement surface 201 of cam follower 205 is in sliding engagement with opposing engagement surface 211 of cam 216, here shown as a camming rotor. While cam 216 is depicted in FIG. 2A as a camming rotor, one skilled in the art would understand that the cams disclosed herein may be any of a variety of sliding or rotating components.

In some aspects, when engaged with opposing engagement surface 211, the planar surface defined by engagement surface 201 may be at an angle relative to the surface defined by opposing engagement surface 211, such that less than an entirety of engagement surface 201 is engaged with opposing engagement surface 211. Engagement surface 201 is exemplary of a planar face polycrystalline diamond element, in accordance with one aspect of the present disclosure.

Cam rotational centerline is shown at 207 is shown in FIG. 2B. As cam 216 rotates about rotational centerline 207, opposing engagement surface 211 slidingly moves across engagement surface 201, while engaged therewith. Opposing engagement surface 211, and optionally the entirety of cam 106, may be composed of a diamond reactive material.

In some aspects the opposing engagement surface includes or is composed of at least 2 wt. % of diamond reactive material, or from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond reactive material.

Figure 3:
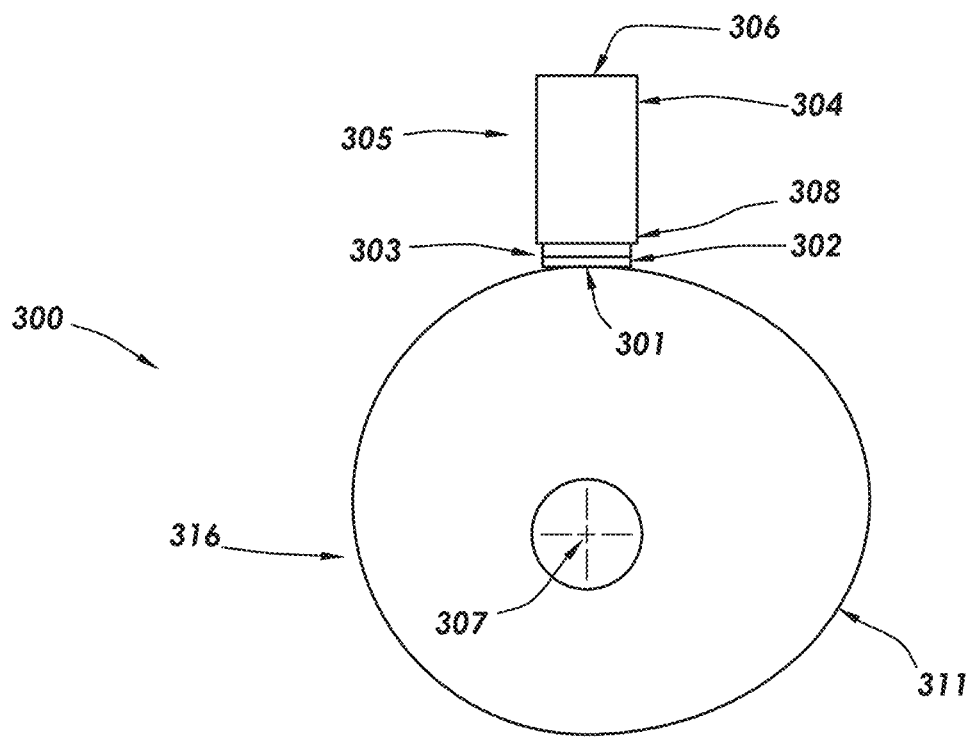
FIG. 3 is a cross-sectional view of a cam assembly including a cam follower having a planar polycrystalline diamond element in sliding engagement with a cam in accordance with certain aspects of the present disclosure.

FIG. 3 is a cross-sectional view of cam assembly 300, including an exemplary planar polycrystalline diamond cam follower 305, in accordance within one aspect of the present disclosure. Cam follower 305 is in sliding engagement with diamond reactive material of exemplary cam 316, in accordance within one aspect of the present disclosure. As cam 316 rotates about center of rotation 307, opposing engagement surface 311 slidingly moves on engagement surface 301.

Figure 4:
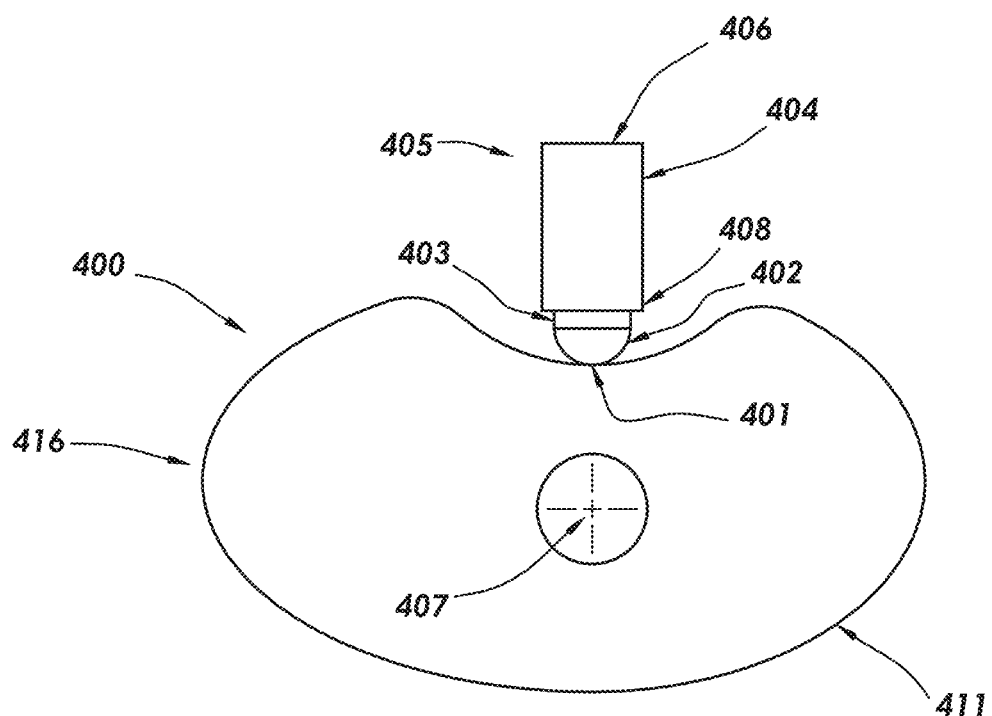
FIG. 4 is a cross-sectional view of a cam assembly including a cam follower having a dome-shaped polycrystalline diamond element in sliding engagement with a cam in accordance with certain aspects of the present disclosure.

FIG. 4 is a cross-sectional view of cam assembly 400, including cam follower 405 having a dome-shaped polycrystalline diamond element 402 with engagement surface 401 in sliding engagement with opposing engagement surface 411 of cam 416, while cam 416 rotates about center of rotation 407.

Cam Follower—Polycrystalline Diamond Element

Figure 5:
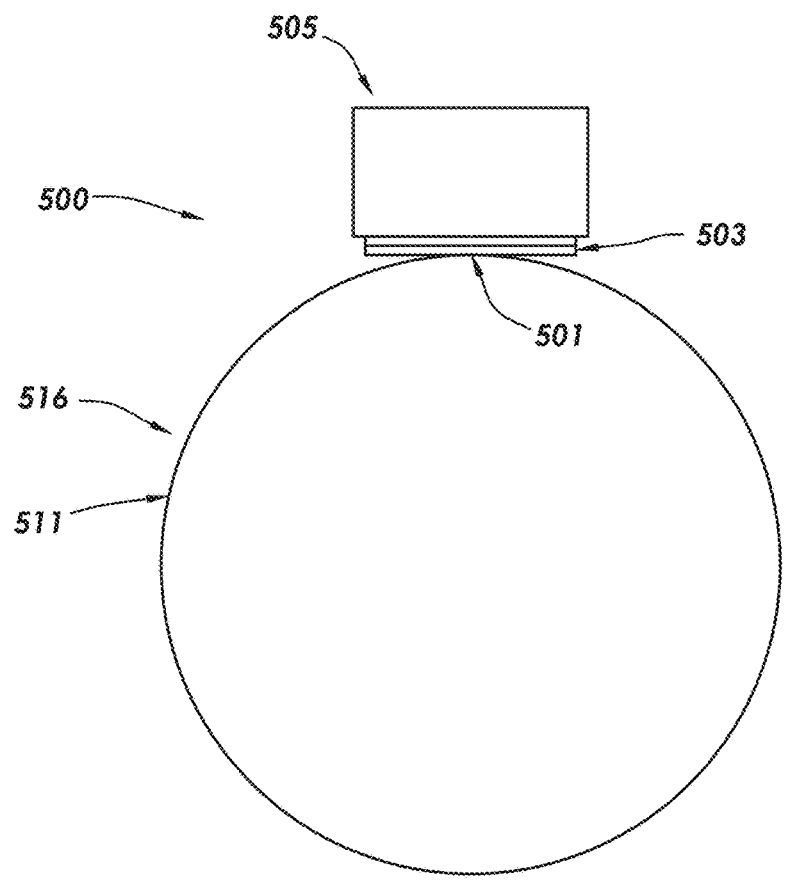
FIG. 5 depicts a cam follower engaged with a cam, without edge or point contact.

In certain aspects of the present disclosure, the avoidance of edge or point contact between the polycrystalline diamond element and the cam is provided. For example, a planar face polycrystalline diamond element may be used for the interface (i.e., the engagement between the engagement surface and opposing engagement surface) if the cam lobe geometry is such that only facial contact will occur with the polycrystalline diamond. In other aspects different, sometimes more complex, cam lobe geometry may require a differently shaped polycrystalline diamond element, such as a dome shaped, hemisphere shaped, ovoid shaped, cylinder shaped, paraboloid shaped, radius tipped conic shaped, rounded tip chisel shaped, or other shaped polycrystalline diamond element. Regardless of the particular shape of the polycrystalline diamond element, the polycrystalline diamond element may be lapped or polished using methods known in the art. With reference to FIG. 5, cam follower 505 is depicted, with engagement surface 501 in contact with opposing engagement surface 511 of cam 516. Edges or points 503 of the polycrystalline diamond element are not in contact with opposing engagement surface 511 (i.e., edge or point contact is avoided).

Cam Follower—Solid Lubricant Source

Figure 6:
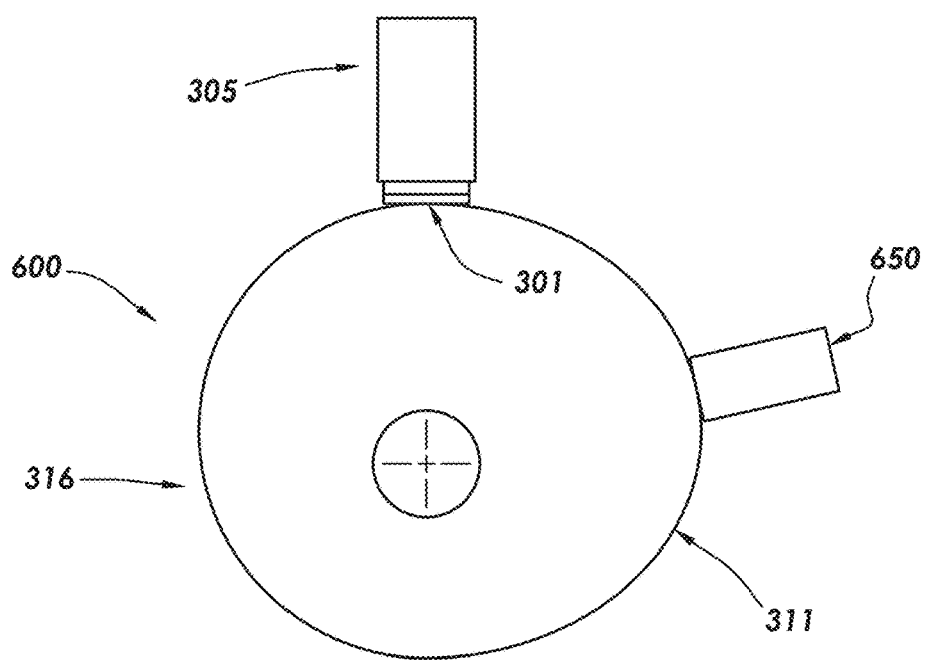
FIG. 6 depicts a cam assembly with a solid lubricant source.

In certain applications, the polycrystalline diamond element and engagement surface thereof that is slidingly interfaced with the opposing, camming, engagement surface may be augmented via a solid lubricant source. The solid lubricant source may be for example, and without limitation, a graphite or hexagonal boron nitride stick or inclusion, either energized or not energized, that is in contact with the opposing, camming, engagement surface including at least some of the diamond reactive material. FIG. 6 depicts an exemplary cam assembly 600, which is identical to that of FIG. 3, with the exception that cam assembly 600 includes solid lubricant source 650 in contact with opposing engagement surface 311.

Cam Follower—Opposing Engagement Surface Treatments

In some aspects, the opposing engaging surface of the diamond reactive material is pre-saturated with carbon (e.g., prior to engagement with the engagement surface). Such pre-saturation reduces the ability of the diamond reactive material to attract carbon through graphitization of the surface of the polycrystalline diamond. The pre-saturation of the diamond reactive material surface may be accomplished via any method known in the art.

In some aspects, the opposing engagement surface is boronized, nitrided, or case hardened. Without being bound by theory, it is believed that such treatments of the opposing engagement surface improve performance thereof.

Cam Follower—Applications

The cam followers and cam assemblies disclosed herein may be used in any of various applications, including high-performance applications, such as in internal combustion engines including, but not limited to, diesel engines, gasoline engines, and high performance auto and marine racing engines; drilling machines; various machining tools; and other applications. In certain aspects, the cam followers disclosed herein are high-performance cam followers capable of reliable application in harsh environments, such as in downhole environments. The cam followers disclosed herein may be high performance cam followers capable of application in non-lubricated, dusty, and/or vacuum environments including, but not limited to mining, aerospace, non-atmospheric, cyclonic, or agricultural environments.

In certain applications, the cam followers disclosed herein can operate in sliding engagement with a diamond reactive material without the occurrence of graphitization and the associated wear and failure of polycrystalline diamond components.

Radial Bearings

Certain aspects of the present disclosure include radial bearings and radial bearing assemblies, as well apparatus and systems including the same, and to methods of use thereof. For convenience, the following descriptions present an outer stator component and an inner rotor component. However, it would be understood by one skilled in the art that, in each of the exemplary embodiments disclosed herein, the inner component may be held static and the outer component may be rotated. Additionally, it would be understood by one skilled in the art that, although the descriptions of the disclosure are directed to rotor and stator configurations, the technology disclosed herein is not limited to such applications and may be applied in various other applications including discrete bearings with an inner and outer race where the outer and inner races both rotate or where either one or the other of the outer and inner races is held stationary.

Radial Bearings—Interfacing Polycrystalline Diamond with Diamond Reactive Materials In some aspects, the present disclosure provides for interfacing the engagement between a rotor and stator with a polycrystalline diamond element in contact with a diamond reactive material. For example, the polycrystalline diamond element may be positioned and arranged on the stator for sliding contact with the rotor, where the rotor is formed of or includes at least some diamond reactive material. Alternatively, the polycrystalline diamond element may be positioned and arranged on the rotor for sliding contact with the stator, where the stator is formed of or includes at least some diamond reactive material. The polycrystalline diamond element may have an engagement surface for engagement with an opposing engagement surface of the diamond reactive material.

In some aspects the opposing engagement surface includes or is composed of at least 2 wt. % of diamond reactive material, or from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond reactive material.

In certain applications, the polycrystalline diamond element, or at least the engagement surface thereof, is lapped or polished, optionally highly lapped or highly polished. Although highly polished polycrystalline diamond elements are preferred in at least some applications, the scope of this disclosure is not limited to highly polished polycrystalline diamond elements and includes polycrystalline diamond elements that are highly lapped or polished.

Radial Bearings—Evaluation Criteria

Figure 7:
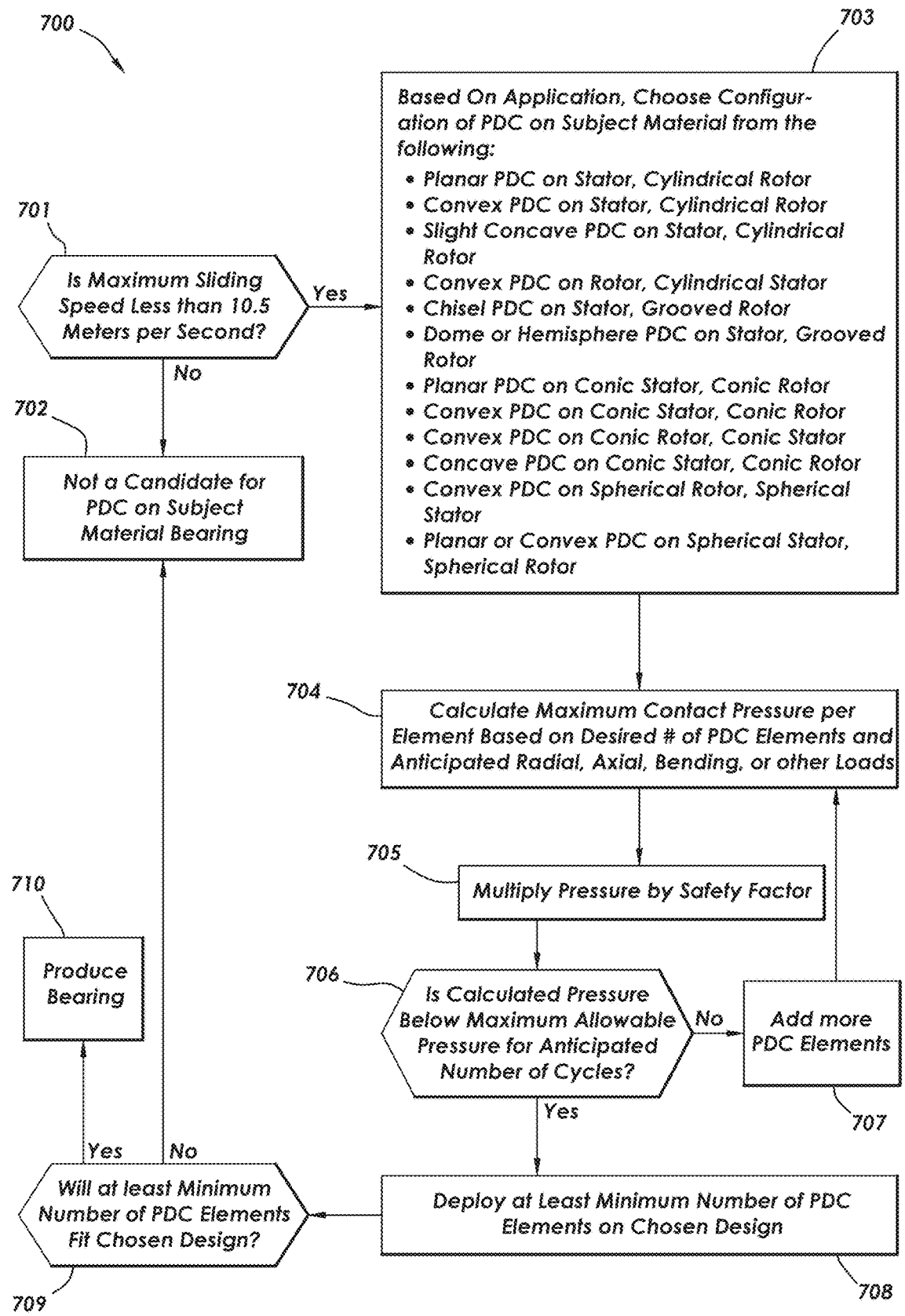
FIG. 7 is a flow chart showing generalized evaluation criteria for the use of the technology disclosed herein.

FIG. 7 depicts flow chart 700 of an emblematic generalized set of evaluation criteria for the use of the technology of this application in a dry, non-lubricated environment. As indicated by box 701, first it is evaluated if the maximum sliding speed in an application is less than 10.5 m/s. As used herein the "sliding speed", also referred to as the "sliding interface speed", is the speed with which two components in contact move relative to one another (e.g., the speed at which a rotor, in contact with a stator, moves relative to the stator).

If it is determined that the maximum sliding speed is not be less than 10.5 m/s, then, as indicated by box 702, it is determined that the evaluated application is not a candidate for use of a polycrystalline diamond element is sliding engagement with a diamond reactive material because the sliding speed is too high. One skilled in the art would understand that, in a lubricated or wet environment, the sliding interface speed can be significantly higher than in a dry, non-lubricated environment (as is herein evaluated).

If it is determined that the maximum sliding speed is less than 10.5 m/s, then, as indicated by box 703, the configuration (e.g., shape, size, and arrangement) of the polycrystalline diamond element is selected depending on the particular application at hand. Box 703 sets forth various non-limiting polycrystalline diamond element configurations for sliding engagement with diamond reactive materials in various bearing configurations. For example, a planar polycrystalline diamond element may be selected for use on a stator that is engaged with a cylindrical rotor formed of or including at least some diamond reactive material; a convex polycrystalline diamond element may be selected for use on a stator that is engaged with a cylindrical rotor formed of or including at least some diamond reactive material; a polycrystalline diamond element having a concave, or at least slightly concave, surface may be selected for use on a stator that is engaged with a cylindrical rotor formed of or including at least some diamond reactive material; a polycrystalline diamond element having a convex, or at least slightly convex, surface may be selected for use on a rotor that is engaged with a cylindrical stator formed of or including at least some diamond reactive material; a chisel shaped polycrystalline diamond element may be selected for use on a stator that is engaged with a grooved rotor formed of or including at least some diamond reactive material; a dome or hemisphere shaped polycrystalline diamond element may be selected for use on a stator that is engaged with a grooved rotor formed of or including at least some diamond reactive material; a planar polycrystalline diamond element may be selected for use on a conic shaped stator that is engaged with a conic shaped rotor formed of or including at least some diamond reactive material; a polycrystalline diamond element having a convex, or at least slightly convex, surface may be selected for use on a conic shaped stator that is engaged with a conic shaped rotor formed of or including at least some diamond reactive material; a polycrystalline diamond element having a convex, or at least slightly convex, surface may be selected for use on a conic shaped rotor that is engaged with a conic shaped stator formed of or including at least some diamond reactive material; a polycrystalline diamond element having a concave, or at least slightly concave, surface may be selected for use on a conic shaped stator that is engaged with a conic shaped rotor formed of or including at least some a diamond reactive material; a polycrystalline diamond element having a convex, or at least slightly convex, surface may be selected for use on a spherical shaped rotor that is engaged with a spherical shaped stator formed of or including at least some diamond reactive material; or a polycrystalline diamond element having a planar, convex, or at least slightly convex surface may be selected for use on a spherical shaped stator that is engaged with a spherical shaped rotor formed of or including at least some diamond reactive material. One skilled in the art would understand that the present disclosure is not limited to these particular selected shapes and contours, and that the shapes, including surface contouring, of the rotors, stators, polycrystalline diamond elements, and other application specific components may vary depending on the particular application.

After selecting the configuration, as set forth in box 703, the maximum contact pressure per polycrystalline diamond element is calculated. As set forth in box 704, the maximum contact pressure per polycrystalline diamond element is calculated based on the number of polycrystalline diamond elements and the anticipated load, including radial, axial, bending, or other loads. The maximum contact pressure may be determined by methods known to those skilled in the art.

After calculation of the maximum contact pressure per polycrystalline diamond element, the calculated maximum pressure per polycrystalline diamond element is multiplied by a safety factor, as set forth in box 705. The application of the safety factor, over and above the maximum pressure determined in box 704, may be set and applied at the discretion of a designer, for example. Thus, the safety factor, if applied, provides for a reduced pressure per polycrystalline diamond element relative to the maximum contact pressure per polycrystalline diamond element.

In box 706, it is determined whether the calculated maximum pressure is below maximum allowable pressure for anticipated cycles of the apparatus. As would be understood by those skilled in the art, the fatigue on the diamond reactive material is the limiting factor. The load is at the diamond/diamond reactive material (e.g., metal) interface. The more the PDC elements in an assembly, the lower the instant load on the metal. S-N curves (contact stress to cycles) can be used to facilitate making the determination in box 706.

If, per box 706, it is determined that the calculated pressure is not below the maximum allowable pressure, then, as indicated in box 707, additional polycrystalline diamond elements are deployed to the design configuration that was selected in box 703. After these additional polycrystalline diamond elements are deployed, the thus modified design configuration is evaluated per boxes 704 and 705 before being, once again, assessed per the criteria of box 706.

If, per box 706, it is determined that the calculated pressure is below the maximum allowable pressure, then, as indicated in box 708, the proposed design configuration is then created by deploying at least the minimum number of polycrystalline diamond elements indicated as required by the prior boxes 701-706 onto the components of the chosen design configuration of box 703 (e.g., attaching the minimum number of polycrystalline diamond elements onto the stator or rotor).

At box 709, it is determined whether the minimum number of polycrystalline diamond elements, per box 708, will fit on the chosen configuration of box 703. If it is determined that, the minimum number of polycrystalline diamond elements will fit on the chosen configuration of box 703, then the bearing assembly in the rotor and stator is produced, as shown in box 110. If it determined that the minimum number of polycrystalline diamond elements will not fit on the chosen configuration of box 703, then the chosen configuration of box 703 is determined to not be a candidate for use of a polycrystalline diamond element in sliding engagement with a diamond reactive material, per box 702.

The designer of the bearing configuration would also have the option (not shown) of choosing an alternative bearing configuration from box 703 if the required minimum number of polycrystalline diamond elements will not fit on the originally chosen design configuration. Alternatively, the safety factor can be lowered to reduce the minimum number of polycrystalline diamond elements required. One skilled in the art would understand that the criteria set forth in FIG. 7 is exemplary only, that other criteria may be evaluated depending on the particular application, and that, for at least some applications, some of the criteria set forth in FIG. 7 may be left out without departing from the scope of this disclosure.

Figure 8A:
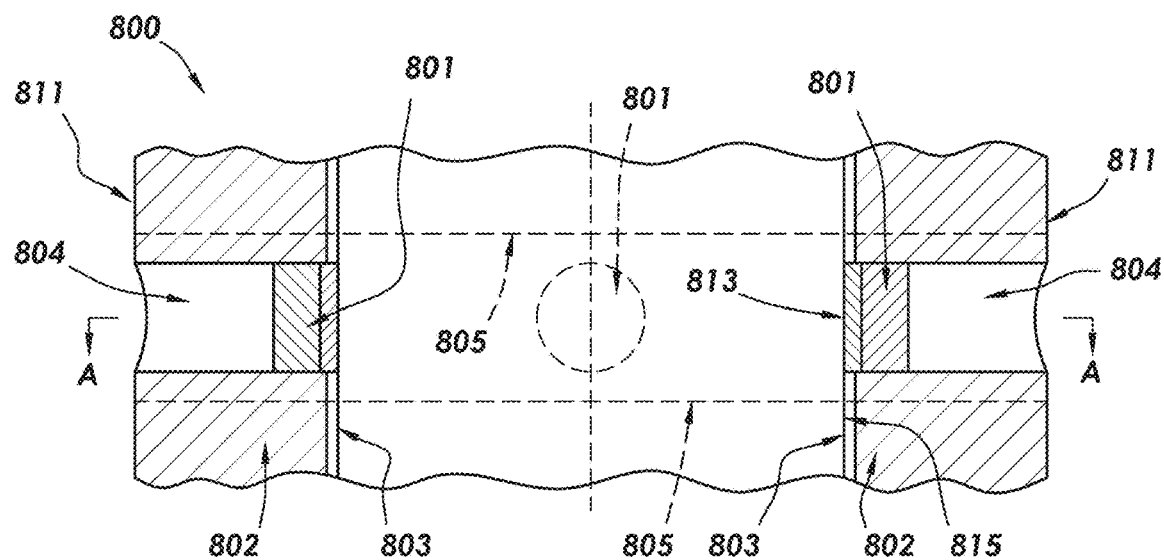
FIG. 8A is a partial side view of a rotor and stator radial bearing assembly of an embodiment of the technology of this application.
Figure 8B:
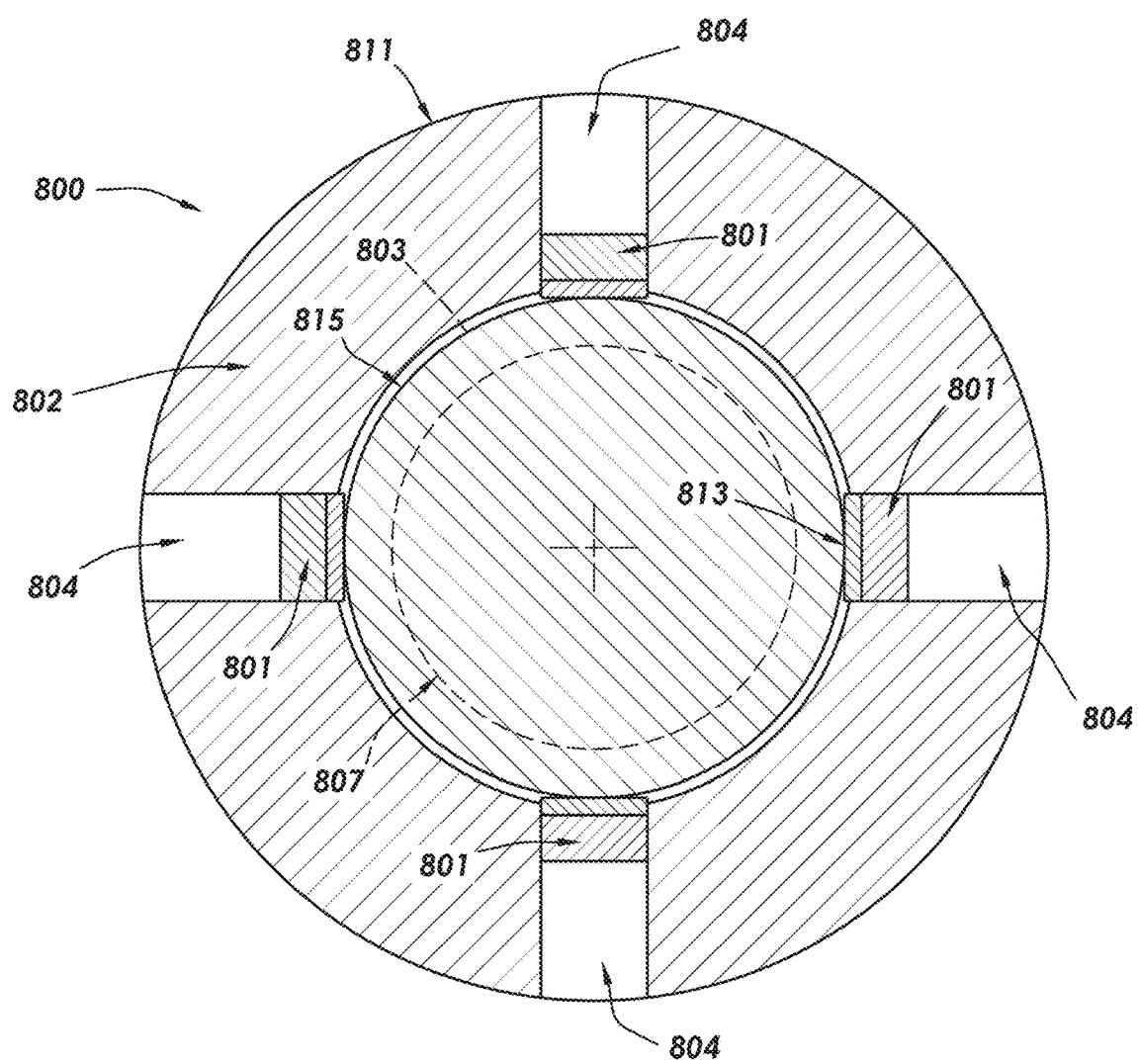
FIG. 8B is a cross-sectional view of the rotor and stator radial bearing assembly of FIG. 8A taken along line A-A.

Various exemplary rotor and stator radial bearing assemblies will now be described with reference to FIGS. 8A-19B. In FIGS. 8A-19B, like reference numerals refer to like elements. For example, an exemplary assembly is identified with reference numeral "800" in FIGS. 8A and 8B and is identified with reference numeral "900" in FIGS. 9A and 9B.
Radial Bearing—Stator with Planar Polycrystalline Diamond Element FIG. 8A is a partial side view of a rotor and stator radial bearing assembly, and FIG. 8B is a cross-sectional view of the rotor and stator radial bearing assembly of FIG. 8A taken along line A-A. With reference to both FIGS. 8A and 8B, rotor and stator radial bearing assembly 800 will be described.

Rotor and stator radial bearing assembly 800 includes stator 802 engaged with rotor 803. Four planar polycrystalline diamond elements 801 are fitted into stator 802 to provide for sliding engagement between stator 802 and rotor 803, where rotor 803 is formed of or includes at least some diamond reactive material. Polycrystalline diamond elements 801 are deployed (e.g., mechanically fitted) in stator 802 within loading ports 804, which are ports formed in and/or positioned within stator body 811. For example, and without limitation, each polycrystalline diamond element 801 may be press fit, glued, brazed, threaded, or otherwise mounted on stator 802 (or rotor in other applications) via methods known to those skilled in the art. One skilled in the art would understand that the present disclosure is not limited to these particular attachment methods or to the use of ports within the stator body, and that the polycrystalline diamond elements may be attached to the stator or rotor by any of a variety of methods. Further, while shown as including equally spaced, planar polycrystalline diamond elements, one skilled in the art would understand that the number, spacing, armament, shape, and size of the polycrystalline diamond elements may vary depending upon any number of various design criteria including, but not limited to, the criteria set forth in FIG. 7. In some aspects, polycrystalline diamond elements are composed of thermally stable polycrystalline diamond, either supported or unsupported by tungsten carbide, or polycrystalline diamond compact.

Each polycrystalline diamond element 801 includes an engagement surface 813 (here shown as planar surfaces), and rotor 803 includes opposing engagement surface 815. Polycrystalline diamond elements 801 are positioned on stator 802 in secure contact with rotor 803, to limit lateral movement of rotor 803 while allowing for free sliding rotation of rotor 803 during operation. Polycrystalline diamond elements 801 are positioned and arranged such that engagement surfaces 813 are in contact (e.g., sliding contact) with opposing engagement surface 815. Thus, engagement surfaces 813 and opposing engagement surface 815 interface the sliding contact between rotor 803 and stator 802.

FIGS. 8A and 8B depict a rotor and stator such as would be used in a downhole pump or motor. However, one skilled in the art would understand that radial bearings for other applications, as well as discrete radial bearings, may be designed and manufactured in the same or similar manner in accordance with this disclosure. Non-limiting proximal and distal dimensions for such a discrete bearing are indicated by dashed lines 805 shown in FIG. 8A. As shown in FIG. 8B, optionally, a through bore 807 is provided in rotor 803, which could be used in a discrete bearing, for example. As is evident in FIG. 8B, polycrystalline diamond elements 801 are deployed in stator 802 to radially support and provide sliding engagement with rotor 803.

Although FIGS. 8A and 8B depict an assembly that includes four polycrystalline diamond elements 801, one skilled in the art would understand that less than four polycrystalline diamond elements, such as three polycrystalline diamond elements, or more than four polycrystalline diamond elements may be used depending on the particular application and configuration, such as the space available such polycrystalline diamond elements on the stator or rotor. Further, although FIGS. 8A and 8B show a single circumferential set of polycrystalline diamond elements 801, it would be understood by those skilled in the art that one or more additional circumferential sets of polycrystalline diamond elements may be deployed in the stator (or rotor) to increase lateral support and lateral load taking capability of the bearing assembly.

Radial Bearing—Stator with Convex Polycrystalline Diamond Element

Figure 9A:
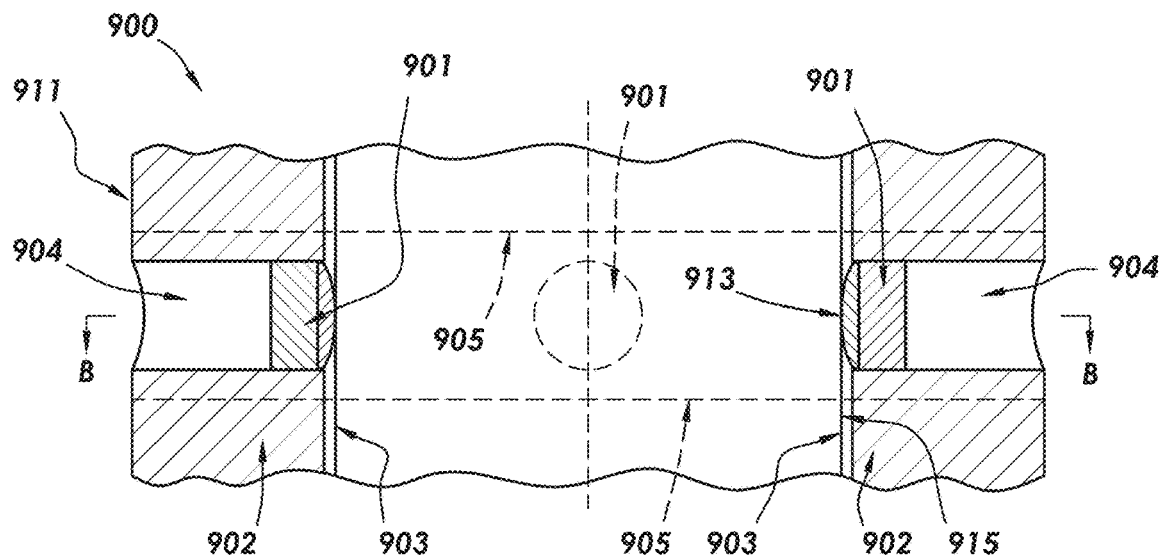
FIG. 9A is a partial side view of a rotor and stator radial bearing assembly of an embodiment of the technology of this application.
Figure 9B:
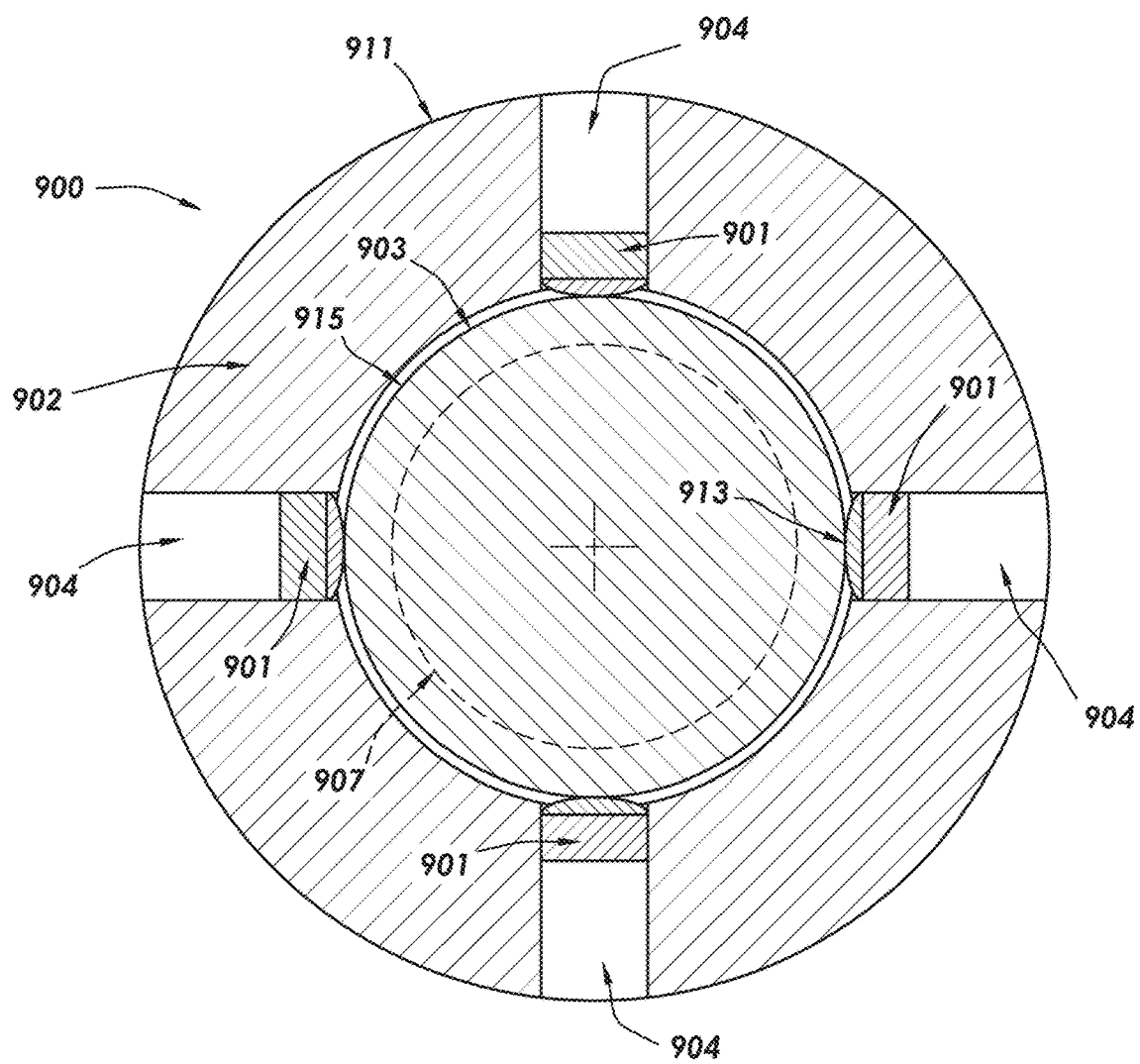
FIG. 9B is a cross-sectional view of the assembly of FIG. 9A taken along line B-B.

FIGS. 9A and 9B depict rotor and stator radial bearing assembly 900, which is substantially similar to that of FIGS. 8A and 8B, with the exception that polycrystalline diamond elements 901 have convex engagement surfaces 913 rather than the flat, planar engagement surfaces of FIGS. 8A and 8B.

With reference to FIGS. 9A and 9B, rotor and stator radial bearing 900 includes convex polycrystalline diamond elements 901 fitted into stator body 911 of stator 902 to provide for sliding engagement with rotor 903, formed of or including at least some diamond reactive material. Polycrystalline diamond elements 901 are deployed in stator 902 through loading ports 904, and may be press fit, glued, brazed, threaded, or otherwise mounted using methods known to those skilled in the art. Polycrystalline diamond elements 901 are placed into a secure contacting position with rotor 903 to limit lateral movement of rotor 903 while allowing for free sliding rotation of rotor 903 during operation. As is evident from FIG. 9B, polycrystalline diamond elements 901 are deployed in stator 902 to radially support and provide sliding engagement with rotor 903. FIG. 9B also shows optional through bore 907 such as could be used in a discrete bearing.

Although FIGS. 9A and 9B depict a rotor and stator such as would be used in a downhole pump or motor, other assemblies, including discrete radial bearing assemblies, may be designed and manufactured in the same or substantially the same way. Non-limiting proximal and distal dimensions for such a discrete bearing are indicated by dashed lines 905. Further, although FIGS. 9A and 9B show four polycrystalline diamond elements 901, it would be understood by those skilled in the art that fewer (e.g., three) or more polycrystalline diamond elements may be deployed in stator 902. Additionally, although FIGS. 9A and 9B show a single circumferential set of polycrystalline diamond elements 901, it would be understood by those skilled in the art that one or more additional circumferential sets of polycrystalline diamond elements may be deployed in the stator to increase lateral support and lateral load taking capability of the bearing assembly.

As with assembly 800, in operation engagement surface 913 interfaces with opposing engagement surface 915 to bear load between rotor 903 and stator 902.

Stator with Concave Polycrystalline Diamond Element

Figure 10A:
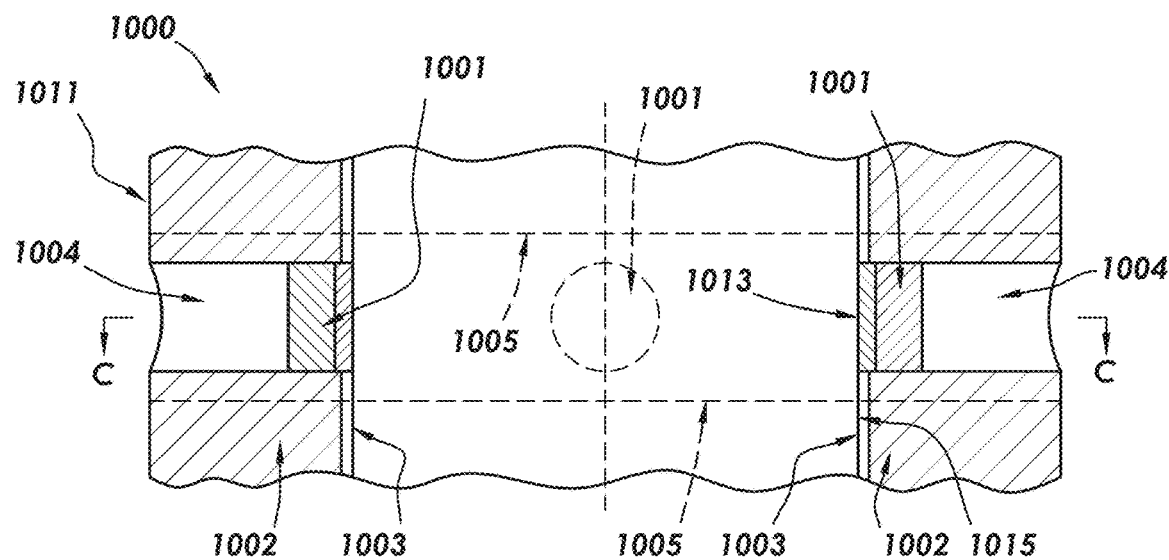
FIG. 10A is a partial side view of a rotor and stator radial bearing assembly of an embodiment of the technology of this application.
Figure 10B:
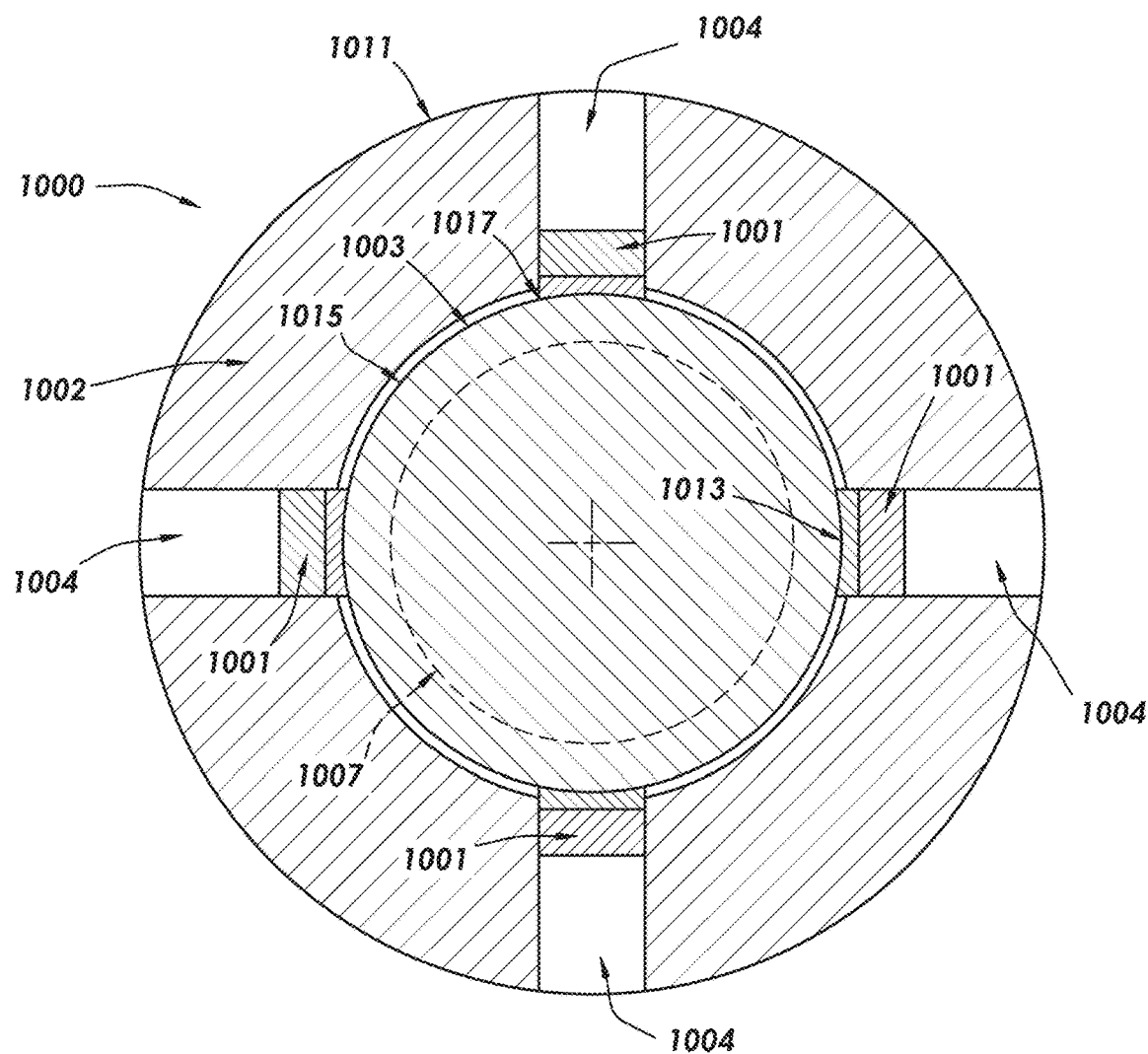
FIG. 10B is a cross-sectional view of the assembly of FIG. 4A taken along line C-C.

FIGS. 10A and 10B depict rotor and stator radial bearing assembly 1000, which is substantially similar to that of FIGS. 8A-9B, with the exception that polycrystalline diamond elements 1001 has concave, or at least slightly concave, engagement surfaces 1013 rather than the flat, planar engagement surfaces of FIGS. 8A and 8B or the convex engagement surfaces of FIGS. 9A and 9B.

Slightly concave polycrystalline diamond elements 1001 are fitted into stator body 1011 of stator 1002 to provide for sliding engagement with rotor 1003. Polycrystalline diamond elements 1001 are deployed in stator 1002 through loading ports 1004. Polycrystalline diamond elements 1001 may be press fit, glued, brazed, threaded, or otherwise mounted using methods known to those skilled in the art. Polycrystalline diamond elements 1001 are placed into secure contacting position with rotor 1003 to limit lateral movement of rotor 1003 while allowing for free sliding rotation of rotor 1003 during operation.

As with assembly 900, in operation engagement surface 1013 interfaces with opposing engagement surface 1015 to bear load between rotor 1003 and stator 1002. The at least slight concavity of each polycrystalline diamond element 1001 is oriented with the axis of the concavity, in line with the circumferential rotation of rotor 1003; thereby ensuring no edge contact between polycrystalline diamond elements 1001 and rotor 1003 and providing for linear area contact between polycrystalline diamond elements 1001 and rotor 1003, generally with the deepest portion of the concavity. That is, engagement between polycrystalline diamond elements 1001 and rotor 1003 is exclusively interfaced by engagement surface 1013 and opposing engagement surface 1015, such that edge or point 1017 of polycrystalline diamond elements 1001 do not make contact with rotor 1003. As such, only linear area contact, and no edge or point contact, occurs between polycrystalline diamond elements 1001 and rotor 1003. As is evident from FIG. 10B, polycrystalline diamond elements 1001 are deployed in stator 1002 to radially support and provide sliding engagement with rotor 1003. FIG. 10B also shows optional through bore 1007 such as could be used in a discrete bearing.

Although FIGS. 10A and 10B depict a rotor and stator such as would be used in a downhole pump or motor, assemblies, including a discrete radial bearing assembly, may be designed and manufactured in the same or substantially the same way. Non-limiting proximal and distal dimensions for such a discrete bearing are indicated by dashed lines 1005. Further, although FIGS. 10A and 10B show four polycrystalline diamond elements 1001, it would be understood by those skilled in the art that fewer (e.g., three) or more polycrystalline diamond elements may be deployed in stator 1002. Additionally, although FIGS. 10A and 10B show a single circumferential set of polycrystalline diamond elements 1001, it would be understood by those skilled in the art that one or more additional circumferential sets of polycrystalline diamond elements may be deployed in the stator to increase lateral support and lateral load taking capability of the bearing assembly.

Radial Bearing—Rotor with Convex Polycrystalline Diamond Element

Figure 11A:
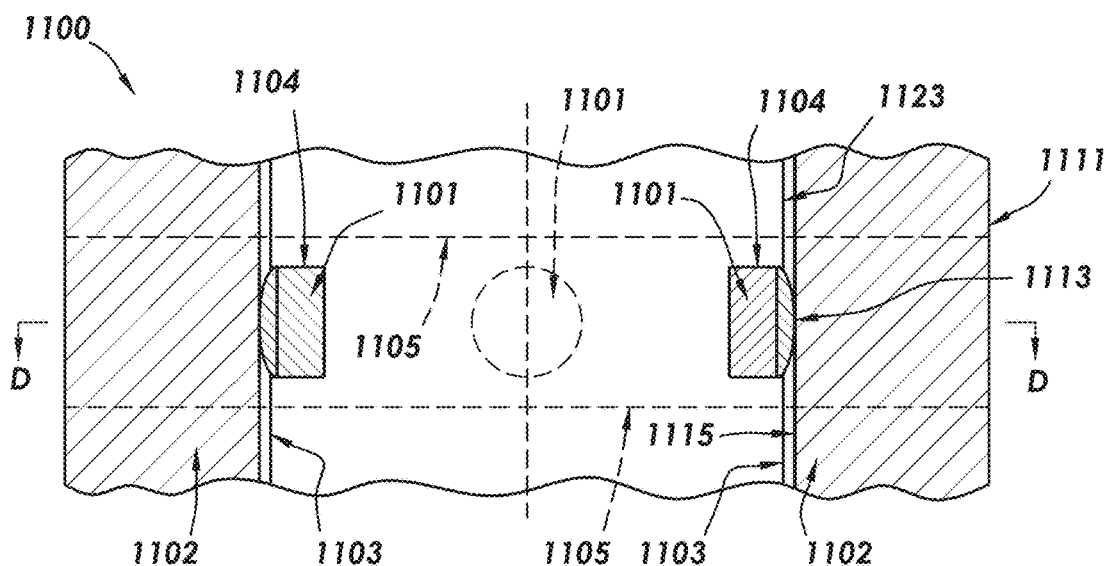
FIG. 11A is a partial side view of a rotor and stator radial bearing assembly of an embodiment of the technology of this application.
Figure 11B:
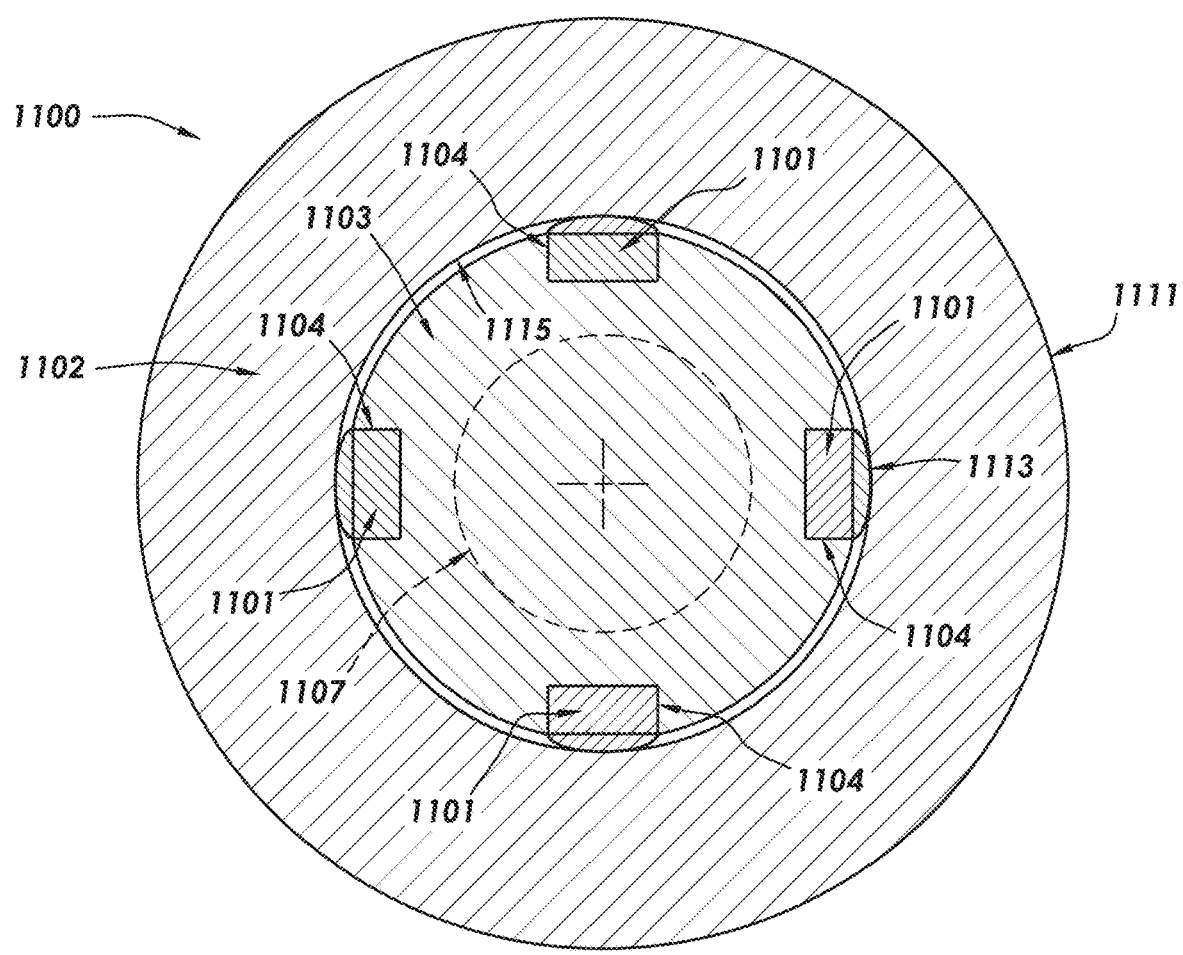
FIG. 11B is a cross-sectional view of the assembly of FIG. 11A taken along line D-D.

FIGS. 11A and 11B depict rotor and stator radial bearing assembly 1100, which is substantially similar to that of FIGS. 9A and 9B, with the exception that polycrystalline diamond elements 1101, having the convex, dome shaped engagement surfaces 1113, are installed on rotor 1103 rather than on the stator.

Convex polycrystalline diamond elements 1101 are fitted into rotor body 1123 of rotor 1103 to provide for sliding engagement with stator 1102, which is formed of or includes at least some diamond reactive material. Polycrystalline diamond elements 1101 are deployed in rotor 1103 in sockets 1104 formed into and/or positioned in rotor body 1123. Polycrystalline diamond elements 1101 may be press fit, glued, brazed, threaded, or otherwise mounted using methods known to those skilled in the art. Polycrystalline diamond elements 1101 are placed into a secure contacting position relative to stator 1102 to limit lateral movement of rotor 1103 while allowing for free sliding rotation of rotor 1103 during operation. As is evident from FIG. 11B, polycrystalline diamond elements 1101 are deployed in rotor 1103 to radially support and provide sliding engagement with stator 1102. FIG. 11B also shows optional through bore 1107 such as could be used in a discrete bearing.

Although FIGS. 11A and 11B depict a rotor and stator such as would be used in a downhole pump or motor, other assemblies, including a discrete radial bearing assembly, may be designed and manufactured in the same or similar way. Non-limiting proximal and distal dimensions for such a discrete bearing are indicated by dashed lines 1105. Further, although FIGS. 11A and 11B show four polycrystalline diamond elements 1101, one skilled in the art would understand that fewer (e.g., three) or more polycrystalline diamond elements may be deployed in rotor 1103. Additionally, although FIGS. 11A and 11B show a single circumferential set of polycrystalline diamond elements 1101, it would be understood by one skilled in the art that one or more additional circumferential sets of polycrystalline diamond elements may be deployed in the rotor to increase lateral support and lateral load taking capability of the bearing assembly.

Thus, contrary to the embodiments shown in FIGS. 8A-10B, in the embodiment shown in FIGS. 11A and 11B, the engagement surfaces 1113 are on the rotor 1103, and the opposing engagement surface 1115 is on the stator 1102.

Radial Bearing—Stator with Chisel Shaped Polycrystalline Diamond Element

Figure 12A:
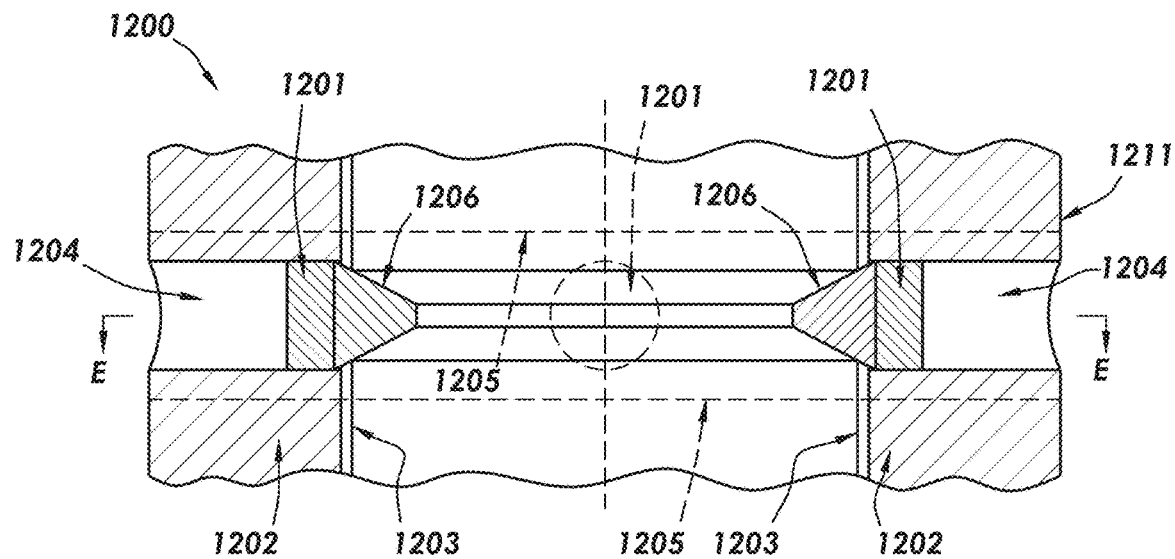
FIG. 12A is a partial side view of a rotor and stator radial bearing assembly of an embodiment of the technology of this application.
Figure 12B:
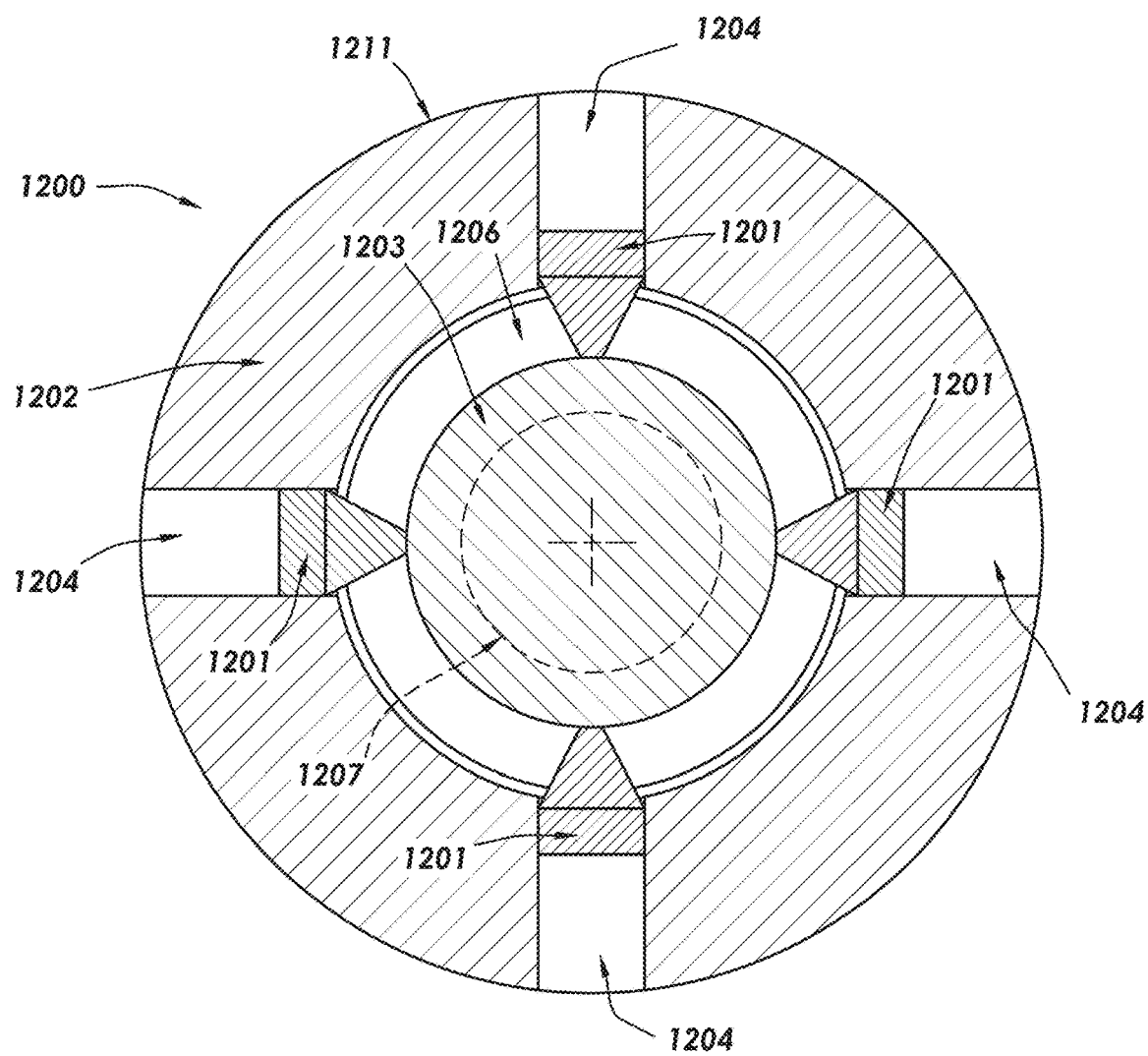
FIG. 12B is a cross-sectional view of the assembly of FIG. 12A taken along line E-E.

FIGS. 12A and 12B depict rotor and stator radial bearing assembly 1200 with chisel shaped polycrystalline diamond elements 1201 fitted into stator body 1211 of stator 1202 to provide for sliding engagement with rotor 1203, which is formed of or includes at least some diamond reactive material. Polycrystalline diamond elements 1201 are deployed in stator 1202 through loading ports 1204, which are formed in and/or positioned in stator body 1211. Polycrystalline diamond elements 1201 may be press fit, glued, brazed, threaded, or otherwise mounted using methods known to those skilled in the art.

Polycrystalline diamond elements 1201 are placed into a secure contacting position within radial/thrust surface groove 1206 of rotor 1203 to limit lateral and axial movement of rotor 1203 while allowing for free sliding rotation of rotor 1203 during operation. Chisel shaped polycrystalline diamond elements 1201 are positioned, arranged, shaped, sized, and oriented to slidingly engage into the mating radial/thrust surface groove 1206 of rotor 1203. Chisel shaped polycrystalline diamond elements 1201 include engagement surface (defined by the chisel shaped polycrystalline diamond elements 1201), which interfaces in contact with opposing engagement surface, here the surface of radial/thrust surface groove 1206. It is evident from FIG. 12B that chisel shape polycrystalline diamond elements 1201 are deployed in stator 1202 to radially and axially support and provide sliding engagement with rotor 1203. FIG. 12B also depicts optional through bore 1207 such as could be used in a discrete bearing. The embodiment shown in FIGS. 12A and 12B may further act as a rotor catch.

Although FIGS. 12A and 12B depict a rotor and stator such as would be used in a downhole pump or motor, other assemblies, including a discrete radial bearing assembly, may be designed and manufactured in the same or similar way. Non-limiting proximal and distal dimensions for such a discrete bearing are indicated by dashed lines 1205. Further, although FIGS. 12A and 12B depict four polycrystalline diamond elements 1201, it would be understood by one skilled in the art that fewer (e.g., three) or more polycrystalline diamond elements 1201 may be deployed in stator 1202. Additionally, although FIGS. 12A and 12B depict a single circumferential set of polycrystalline diamond elements 1201, it would be understood by one skilled in the art that one or more additional circumferential sets of polycrystalline diamond elements may be deployed in the stator to increase lateral and axial support and lateral and axial load taking capability of the bearing assembly.

Stator with Dome or Hemisphere Shaped Polycrystalline Diamond Element

Figure 13A:
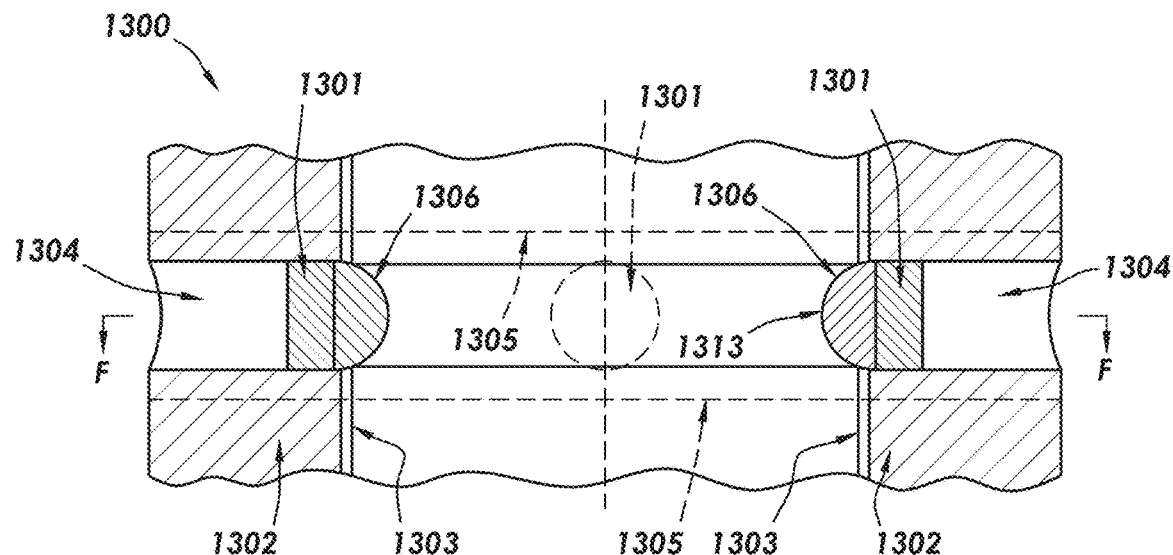
FIG. 13A is a partial side view of a rotor and stator radial bearing assembly of an embodiment of the technology of this application.
Figure 13B:
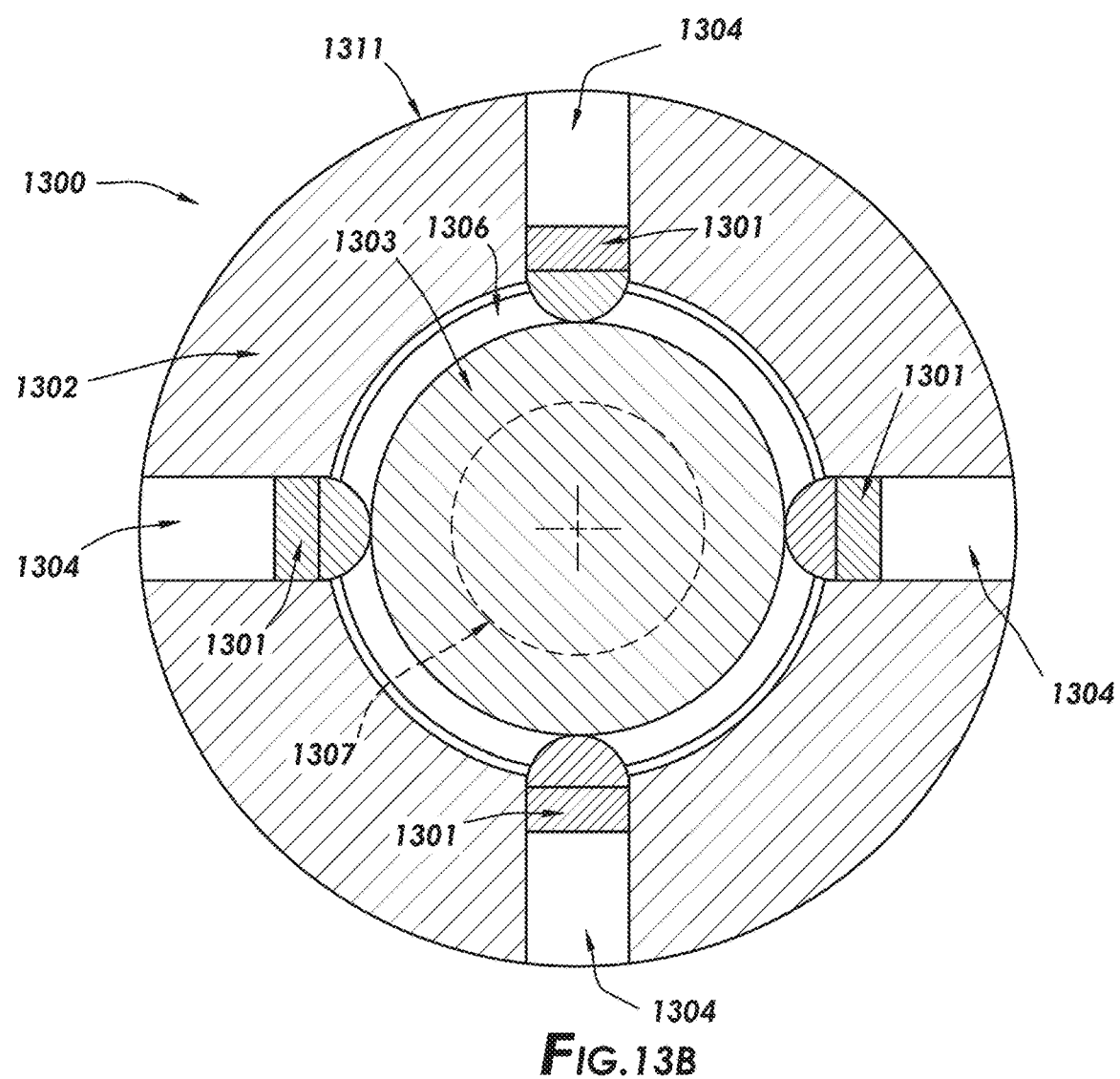
FIG. 13B is a cross sectional view of the assembly of FIG. 13A taken along line F-F.

FIGS. 13A and 13B depict rotor and stator radial bearing assembly 1300, which is substantially similar to that of FIGS. 13A and 13B, with the exception that polycrystalline diamond elements 1301 have dome or hemisphere shaped engagement surfaces 1313 rather chisel shaped polycrystalline diamond elements.

Dome or hemisphere shaped polycrystalline diamond elements 1301 are fitted into stator housing 1311 of stator 1302 to provide for sliding engagement with rotor 1303. Polycrystalline diamond elements 1301 are deployed in stator 1302 through loading ports 1304 formed in and/or positioned in stator body 1311. Polycrystalline diamond elements 1301 may be press fit, glued, brazed, threaded, or otherwise mounted using methods known to those skilled in the art. Polycrystalline diamond elements 1301 are placed into a secure contacting position relative to radial/thrust surface groove 1306 of rotor 1303 to limit lateral and axial movement of rotor 1303 while allowing for free sliding rotation of rotor 1303 during operation. Dome or hemisphere polycrystalline diamond elements 1301 slidingly engage the mating radial/thrust surface groove 1306 of rotor 1303. Dome or hemisphere polycrystalline diamond elements 1301 define engagement surface, which interfaces in contact with opposing engagement surface, here the surface of radial/thrust surface groove 1306. As is evident from FIG. 13B, dome or hemisphere polycrystalline diamond elements 1301 are deployed in stator 1302 to radially and axially support and provide sliding engagement with rotor 1303. FIG. 13B also shows optional through bore 1307 such as could be used in a discrete bearing. The embodiment shown in FIGS. 13A and 13B may further act as a rotor catch.

Although FIGS. 13A and 13B depict a rotor and stator such as would be used in a downhole pump or motor, other assemblies, including a discrete radial bearing assembly, may be designed and manufactured in the same or similar way. Non-limiting proximal and distal dimensions for such a discrete bearing are indicated by dashed lines 1305. Further, although FIGS. 13A and 13B depict four polycrystalline diamond elements 1301, it would be understood by those skilled in the art that fewer (e.g., three) or more polycrystalline diamond elements may be deployed in stator 1302. Additionally, although FIGS. 13A and 13B depict a single circumferential set of polycrystalline diamond elements, it would be understood by those skilled in the art that one or more additional circumferential sets of polycrystalline diamond elements may be deployed in the stator to increase lateral and axial support and lateral and axial load taking capability of the bearing assembly.

Radial Bearing—Stator with Planar Polycrystalline Diamond Element

Figure 14A:
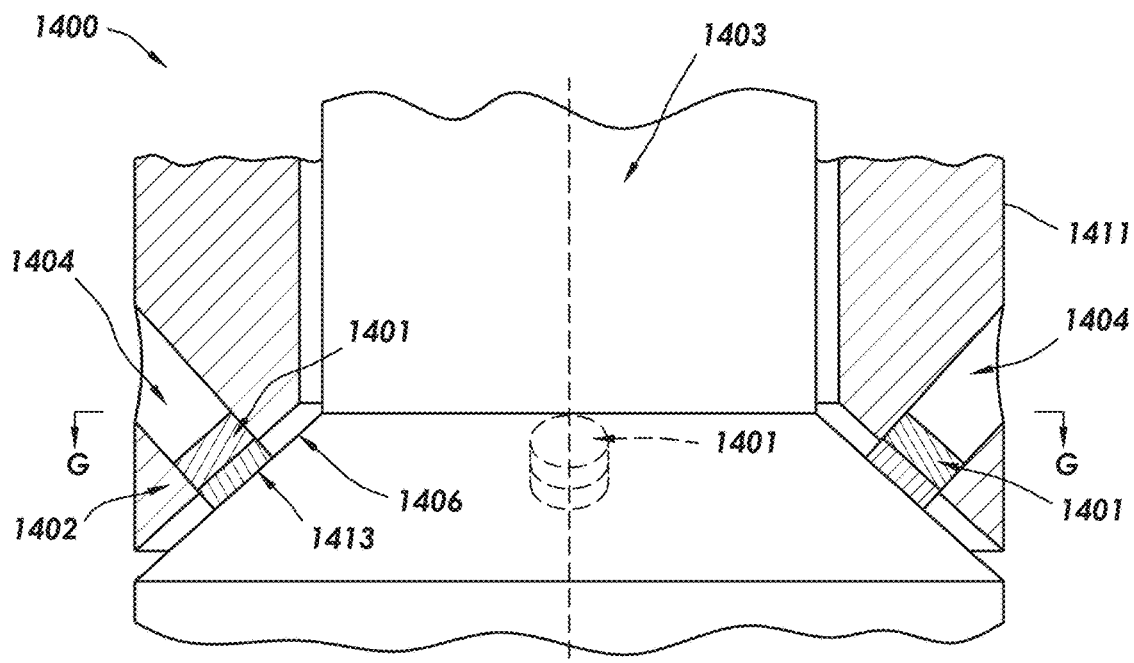
FIG. 14A is a partial side view of a rotor and stator radial bearing assembly of an embodiment of the technology of this application.
Figure 14B:
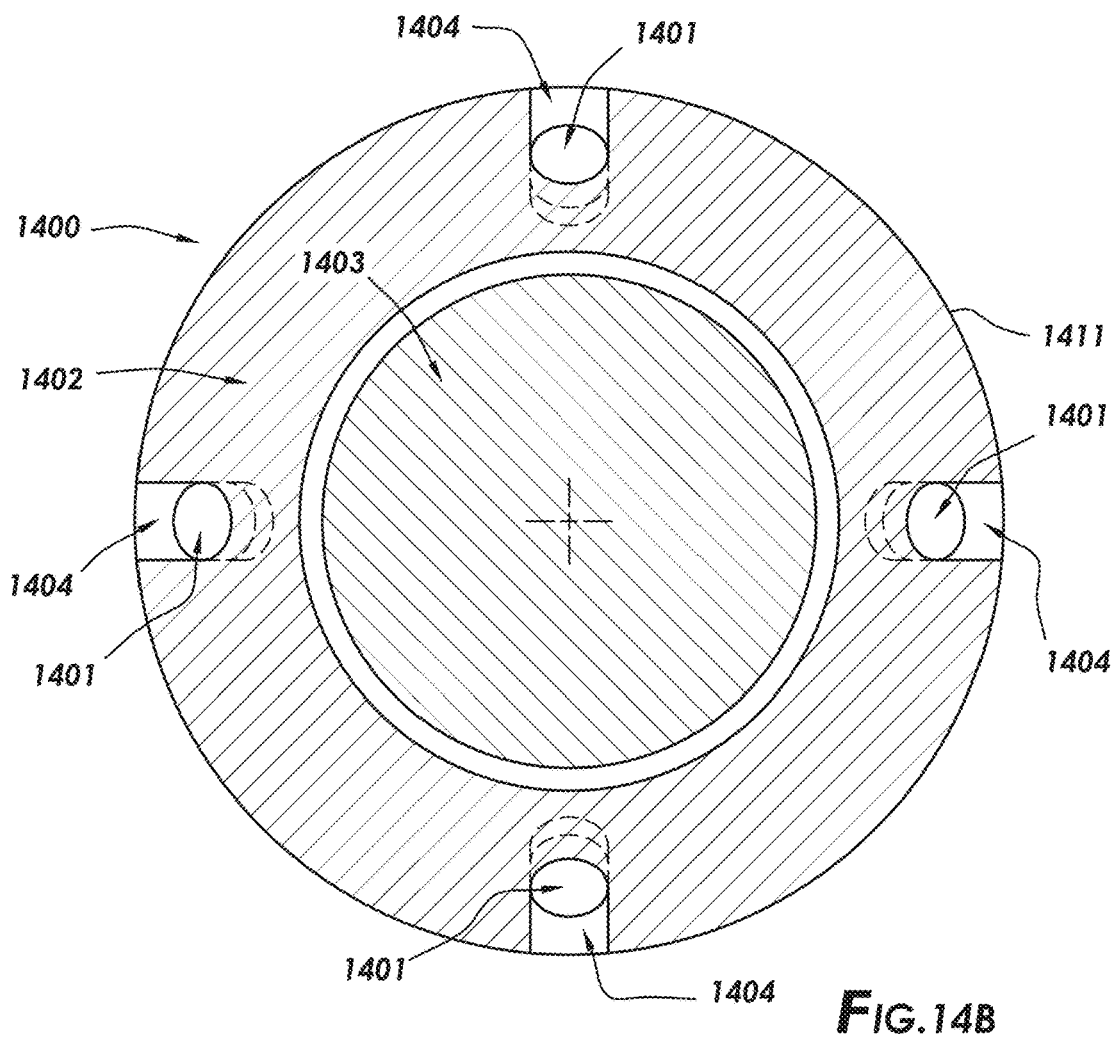
FIG. 14B is a cross-sectional view of the assembly of FIG. 14A taken along line G-G.

FIGS. 14A and 14B depict rotor and stator radial bearing assembly 1400 including planar polycrystalline diamond elements 1401 fitted into stator body 1411 of stator 1402 to provide for sliding engagement with rotor 1403, which is formed of or includes at least some diamond reactive material. Polycrystalline diamond elements 1401 are deployed in stator 1402 through loading ports 1404 formed in and/or positioned in stator body 1411. Polycrystalline diamond elements 1401 may be press fit, glued, brazed, threaded, or otherwise mounted using methods known to those skilled in the art.

Polycrystalline diamond elements 1401 are placed into a secure contacting position relative to radial/thrust conical surface 1406 of rotor 1403 to limit lateral and upward axial movement of rotor 1403 while allowing for free sliding rotation of rotor 1403 during operation.

The planar polycrystalline diamond elements 1401 slidingly engage the mating radial/thrust conical surface of rotor 1403, such that engagement surfaces 1413 contact and interface with opposing engagement surface 1406. As is evident from FIG. 14B, polycrystalline diamond elements 1401 are deployed in stator 1402 to radially and axially support and provide sliding engagement with rotor 1403.

Although FIGS. 14A and 14B depict four polycrystalline diamond elements 1401, it would be understood by those skilled in the art that fewer (e.g., three) or more polycrystalline diamond elements may be deployed in stator 1402. Further, although FIGS. 14A and 14B depict a single circumferential set of polycrystalline diamond elements 1401, it would be understood that one or more additional circumferential sets of polycrystalline diamond elements may be deployed in the stator to increase lateral and axial support and lateral and axial load taking capability of the bearing assembly.

Radial Bearing—Stator with Convex Polycrystalline Diamond Element

Figure 15A:
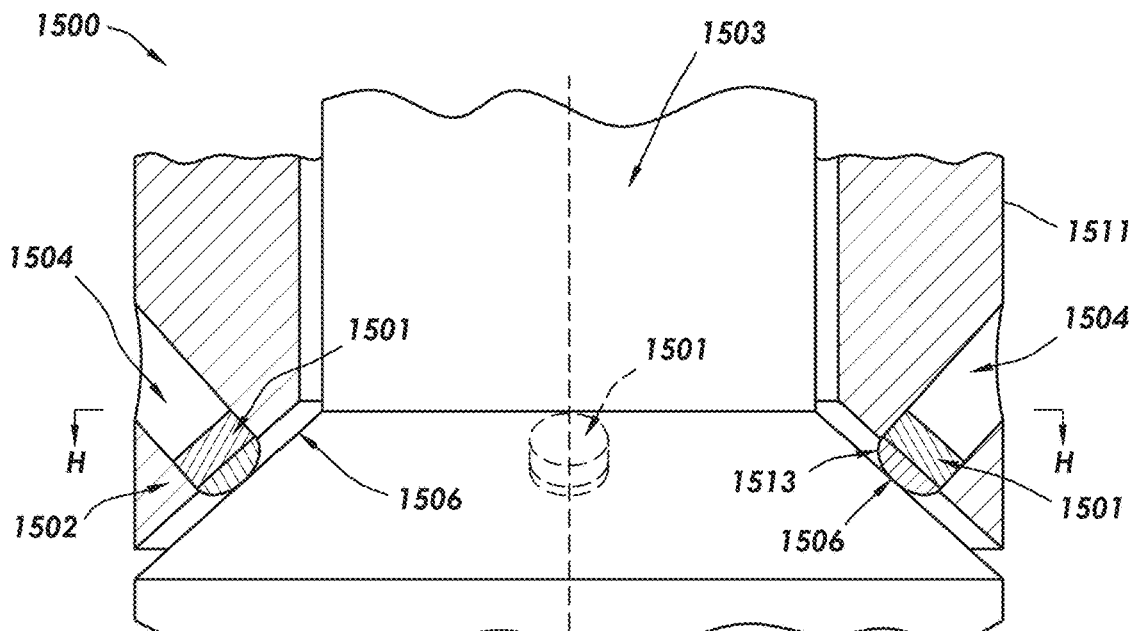
FIG. 15A is a partial side view of a rotor and stator radial bearing assembly of an embodiment of the technology of this application.
Figure 15B:
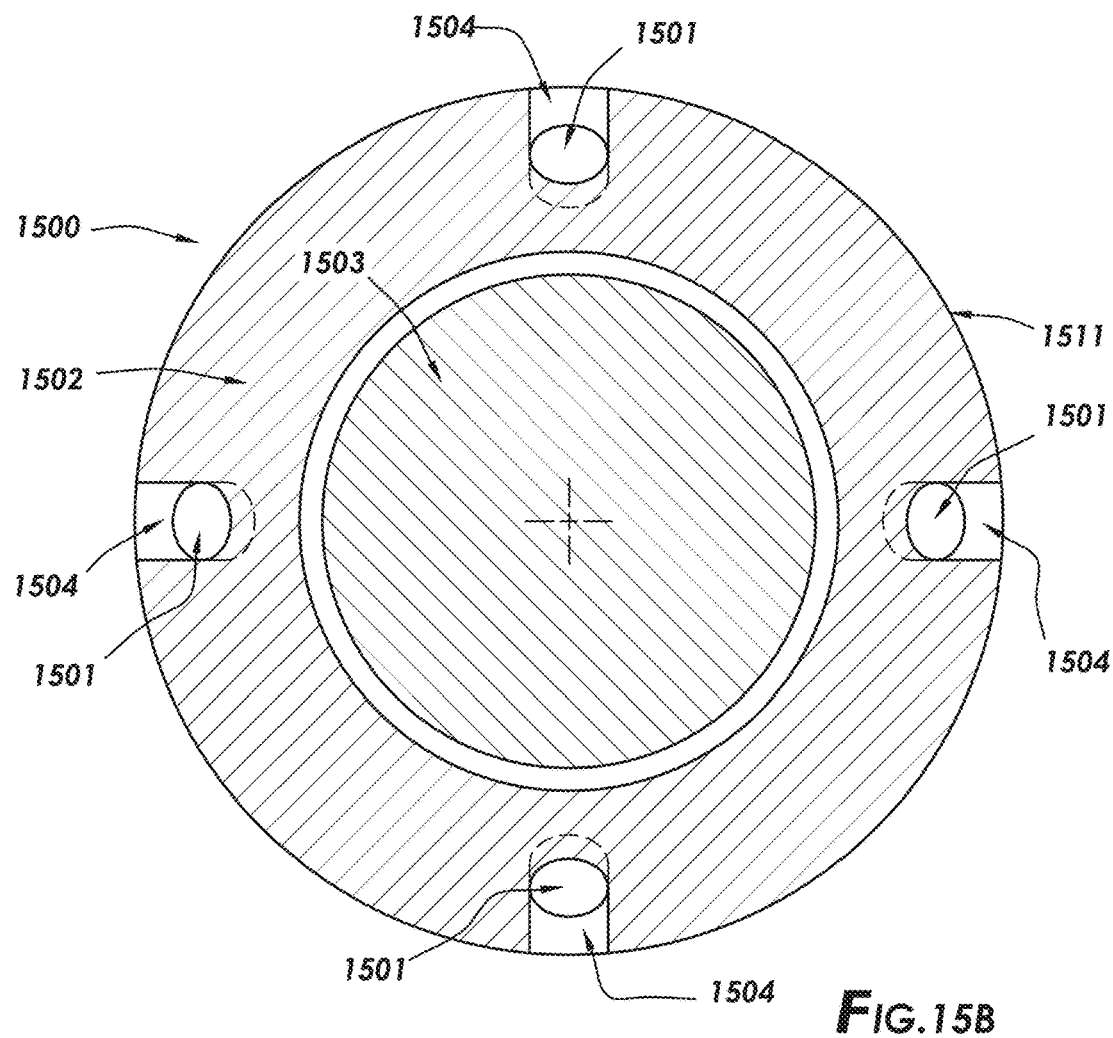
FIG. 15B is a cross-sectional view of the assembly of FIG. 15A taken along line H-H.

FIGS. 15A and 15B depict rotor and stator radial bearing assembly 1500, which is substantially similar to that of FIGS. 14A and 14B, with the exception that polycrystalline diamond elements 1501 have convex engagement surfaces 1513 rather than planar engagement surfaces.

Convex polycrystalline diamond elements 1501 are fitted into stator body 1511 of stator 1502 to provide for sliding engagement with rotor 1503. Polycrystalline diamond elements 1501 are deployed in stator 1502 through loading ports 1504 formed in and/or positioned in stator body 1511. Polycrystalline diamond elements 1501 may be press fit, glued, brazed, threaded, or otherwise mounted using methods known to those skilled in the art.

Convex polycrystalline diamond elements 1501 are placed into secure contacting position with radial/thrust conical surface 1506 of rotor 1503 to limit lateral and upward axial movement of rotor 1503 while allowing for free sliding rotation of rotor 1503 during operation. Polycrystalline diamond elements 1501 slidingly engage the mating radial/thrust conical surface of rotor 1503, such that engagement surfaces 1513 contact and interface with opposing engagement surface 1506.

As is evident from FIG. 15B, convex polycrystalline diamond elements 1501 are deployed in stator 1502 to radially and axially support and provide sliding engagement with rotor 1503.

Although FIGS. 15A and 15B depict four polycrystalline diamond elements 1501, it would be understood by those skilled in the art that fewer (e.g., three) or more polycrystalline diamond elements may be deployed in stator 1502. Further, although FIGS. 15A and 15B depict a single circumferential set of polycrystalline diamond elements 1501, it would be understood by those skilled in the art that one or more additional circumferential sets of polycrystalline diamond elements may be deployed in the stator to increase lateral and axial support and lateral and axial load taking capability of the bearing assembly.

Radial Bearing—Rotor with Convex Polycrystalline Diamond Element

Figure 16A:
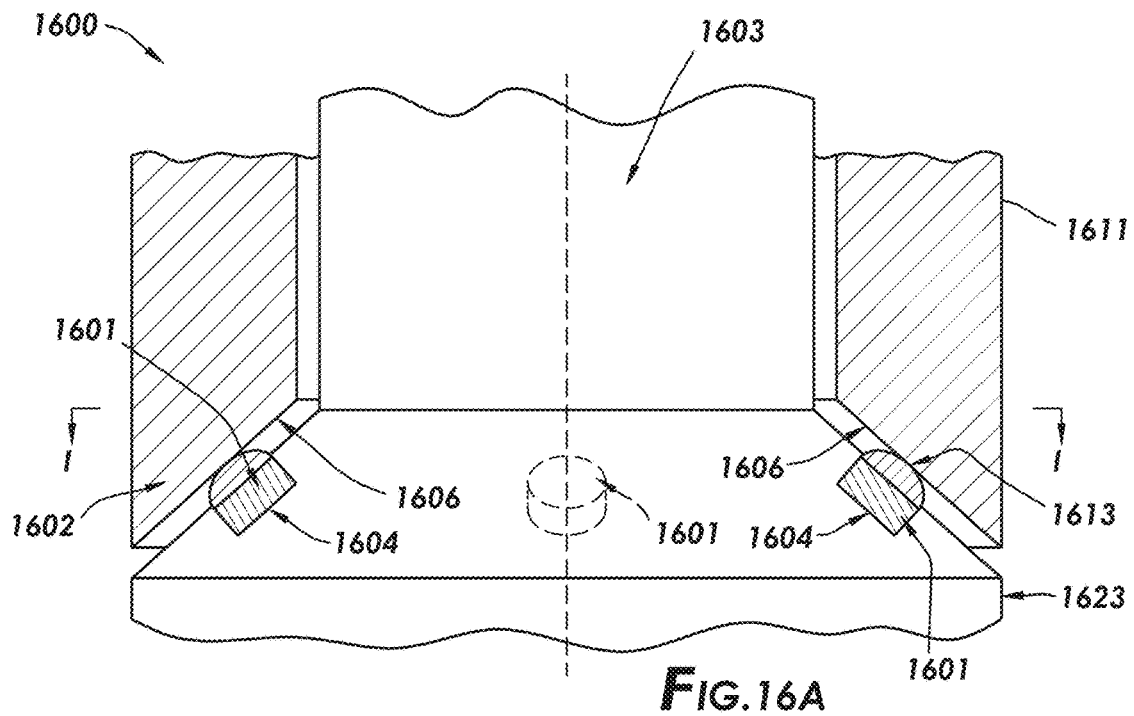
FIG. 16A is a partial side view of a rotor and stator radial bearing assembly of an embodiment of the technology of this application.
Figure 16B:
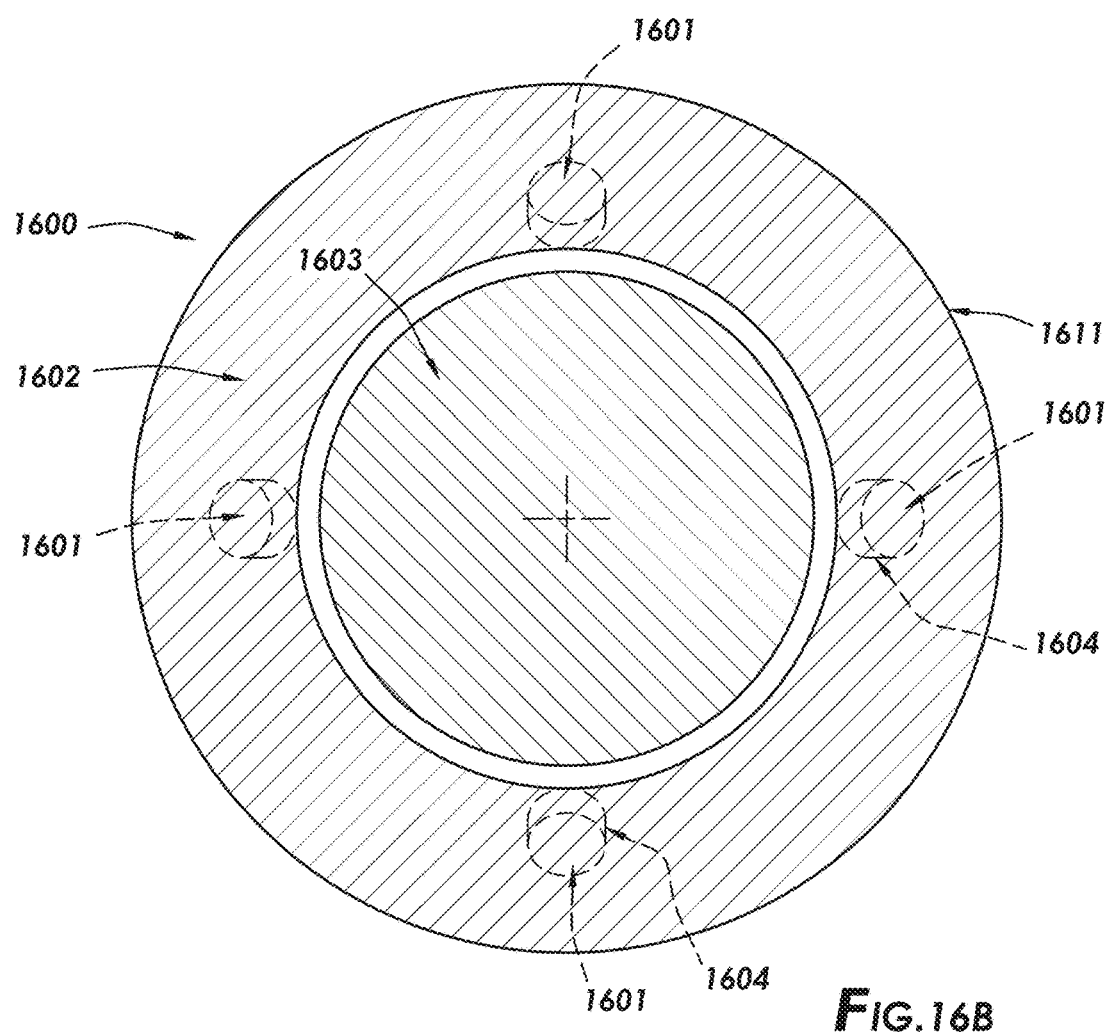
FIG. 16B is a top cross-sectional view of the assembly of FIG. 16A taken along line I-I.

FIGS. 16A and 16B depict a rotor and stator radial and thrust bearing assembly 1600 including convex polycrystalline diamond elements 1601 fitted into rotor body 1623 of rotor 1603 to provide for sliding engagement with stator 1602, which is formed of or includes at least some diamond reactive material. Polycrystalline diamond elements 1601 are deployed in rotor 1603 in sockets 1604 formed in and/or positioned in rotor body 1623. Polycrystalline diamond elements 1601 may be press fit, glued, brazed, threaded, or otherwise mounted using methods known to those skilled in the art.

Convex polycrystalline diamond elements 1601 are placed into a secure contacting position within radial/thrust conical surface 1606 of stator 1602 to limit lateral and upward axial movement of rotor 1603 while allowing for free sliding rotation of rotor 1603 during operation. The convex polycrystalline diamond elements 1601 slidingly engage the mating radial/thrust conical surface of stator 1602, such that engagement surfaces 1613 contact and interface with opposing engagement surface 1606. As is evident from FIG. 16B, convex polycrystalline diamond elements 1601 are deployed in rotor 1603 to radially and axially support and provide sliding engagement with subject material stator 1602.

Although FIGS. 16A and 16B depict four polycrystalline diamond elements 1601, it would be understood by those skilled in the art that fewer (e.g., three) or more polycrystalline diamond elements may be deployed in rotor 1603. Further, although FIGS. 16A and 16B depict a single circumferential set of polycrystalline diamond elements 1601, it would be understood by those skilled in the art that one or more additional circumferential sets of polycrystalline diamond elements may be deployed in the rotor to increase lateral and axial support and lateral and axial load taking capability of the bearing assembly.

Radial Bearing—Stator with Planar Polycrystalline Diamond Element

Figure 17A:
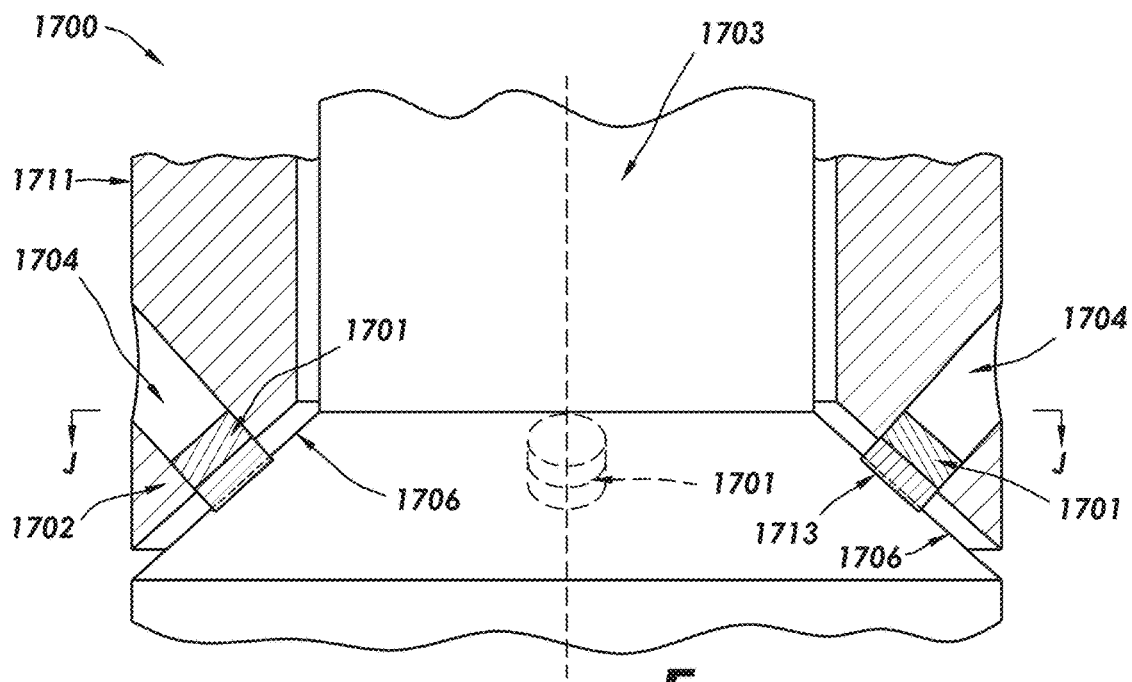
FIG. 17A is a partial side view of a rotor and stator radial bearing assembly of an embodiment of the technology of this application.
Figure 17B:
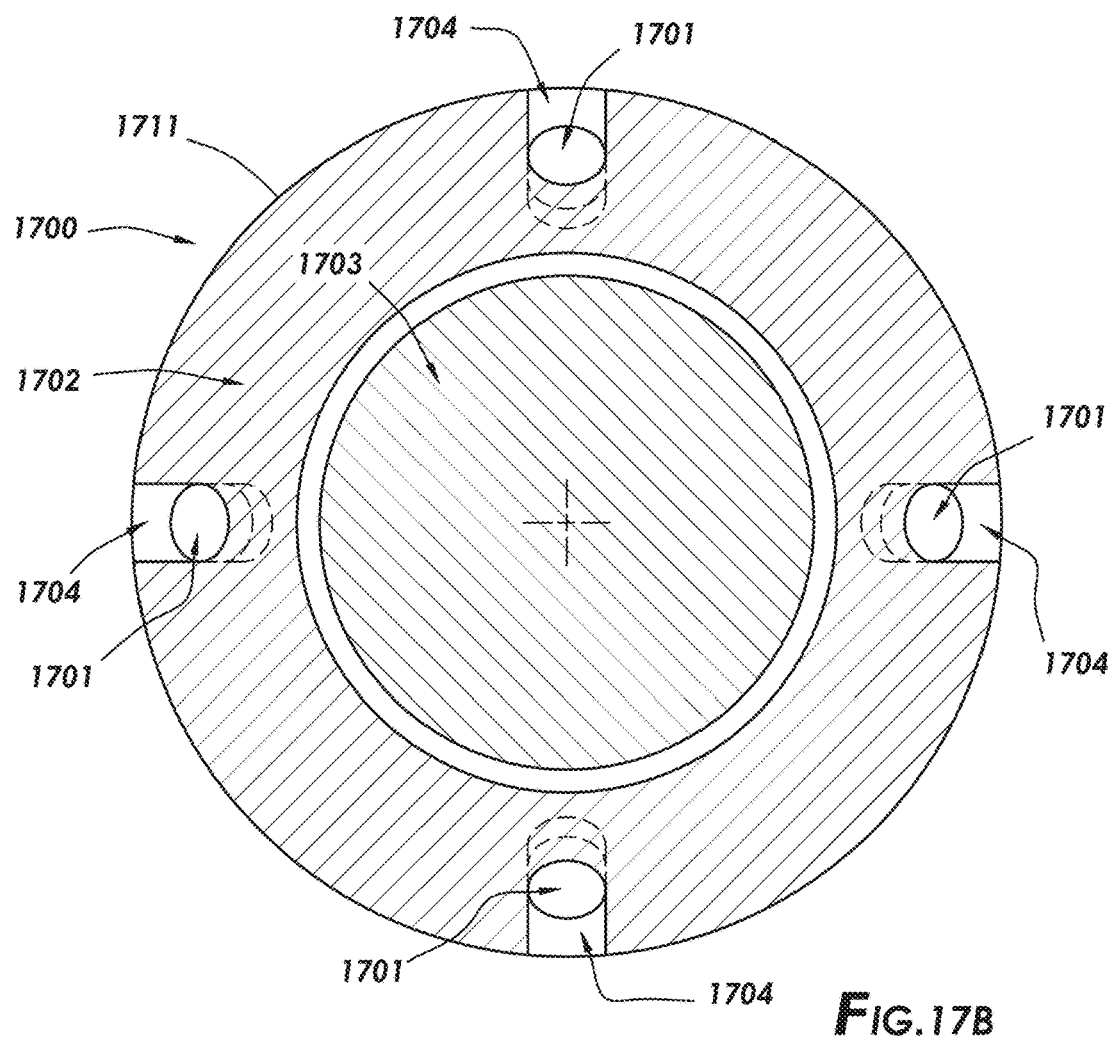
FIG. 17B is a cross-sectional view of the assembly of FIG. 17A taken along line J-J.

FIGS. 17A and 17B depict rotor and stator radial and thrust bearing assembly 1700 including concave, or at least slightly concave, polycrystalline diamond elements 1701 fitted into stator body 1711 of stator 1702 to provide for sliding engagement with rotor 1703, which is formed of or includes at least some diamond reactive material. Polycrystalline diamond elements 1701 are deployed in stator 1702 through loading ports 1704 formed and/or positioned therethrough. Polycrystalline diamond elements 1701 may be press fit, glued, brazed, threaded, or otherwise mounted using methods known to those skilled in the art.

Polycrystalline diamond elements 1701 are placed into a secure contacting position within radial/thrust conical surface 1706 of rotor 1703 to limit lateral and upward axial movement of rotor 1703 while allowing for free sliding rotation of rotor 1703 during operation. Polycrystalline diamond elements 1701 are oriented with the axis of the concavity in line with the circumferential rotation of the rotor 1703 to ensure no edge or point contact, and thus ensure only linear area contact generally with the deepest portion of the concavity. The slightly concave polycrystalline diamond elements 1701 slidingly engage the radial/thrust conical surface of rotor 1703, such that engagement surfaces 1713 contact and interface with opposing engagement surface 1706.

As is evident from FIG. 17B, slightly concave polycrystalline diamond elements 1701 are deployed in stator 1702 to radially and axially support and provide sliding engagement with rotor 1703.

Although FIGS. 17A and 17B depict four polycrystalline diamond elements 1701, it would be understood by those skilled in the art that fewer (e.g., three) or more polycrystalline diamond elements may be deployed in stator 1702. Further, although FIGS. 17A and 17B show a single circumferential set of polycrystalline diamond elements 1701, it would be understood by those skilled in the art that one or more additional circumferential sets of polycrystalline diamond elements may be deployed in the stator to increase lateral and axial support and lateral and axial load taking capability of the bearing assembly.

Radial Bearing—Rotor with Convex Polycrystalline Diamond Elements

FIGS. 18A and 18B depict rotor and stator radial and thrust bearing assembly 1800, including convex polycrystalline diamond elements 1801 are fitted into rotor body 1823 of rotor 1803 to provide for sliding engagement with stator 1802. Polycrystalline diamond elements 1801 are deployed in rotor 1803 in sockets 1804 formed in and/or positioned in rotor body 1823. Polycrystalline diamond elements 1801 may be press fit, glued, brazed, threaded, or otherwise mounted using methods known to those skilled in the art.

Convex polycrystalline diamond elements 1801 are placed into a secure contacting position within radial/thrust concave curved surface 1806 of stator 1802 to limit lateral and upward axial movement of rotor 1803 while allowing for free sliding rotation of rotor 1803 during operation. Convex polycrystalline diamond elements 1801 slidingly engage the mating radial/thrust concave curved surface of stator 1802, such that engagement surfaces 1813 engage with radial/thrust concave curved surface 1806. In the embodiment of FIGS. 18A and 18B, the radial/thrust concave curved surface 1806 is or forms the opposing engagement surface. In the assembly 1800, the contact areas on the convex polycrystalline diamond elements 1801 are generally circular. However, one skilled in the art would understand that the polycrystalline diamond elements are not limited to having such a contact area.

As is evident from FIG. 18B, convex polycrystalline diamond elements 1801 are deployed in rotor 1803 to radially and axially support and provide sliding engagement with stator 1802.

Although FIGS. 18A and 18B depict four polycrystalline diamond elements 1801, it would be understood by those skilled in the art that fewer (e.g., three) or more polycrystalline diamond elements may be deployed in rotor 1803. Further, although FIGS. 18A and 18B depict a single circumferential set of polycrystalline diamond elements 1801, it would be understood by those skilled in the art that one or more additional circumferential sets of polycrystalline diamond elements may be deployed in the rotor to increase lateral and axial support and lateral and axial load taking capability of the bearing assembly.

Radial Bearing—Stator with Planar Polycrystalline Diamond Elements

Figure 19A:
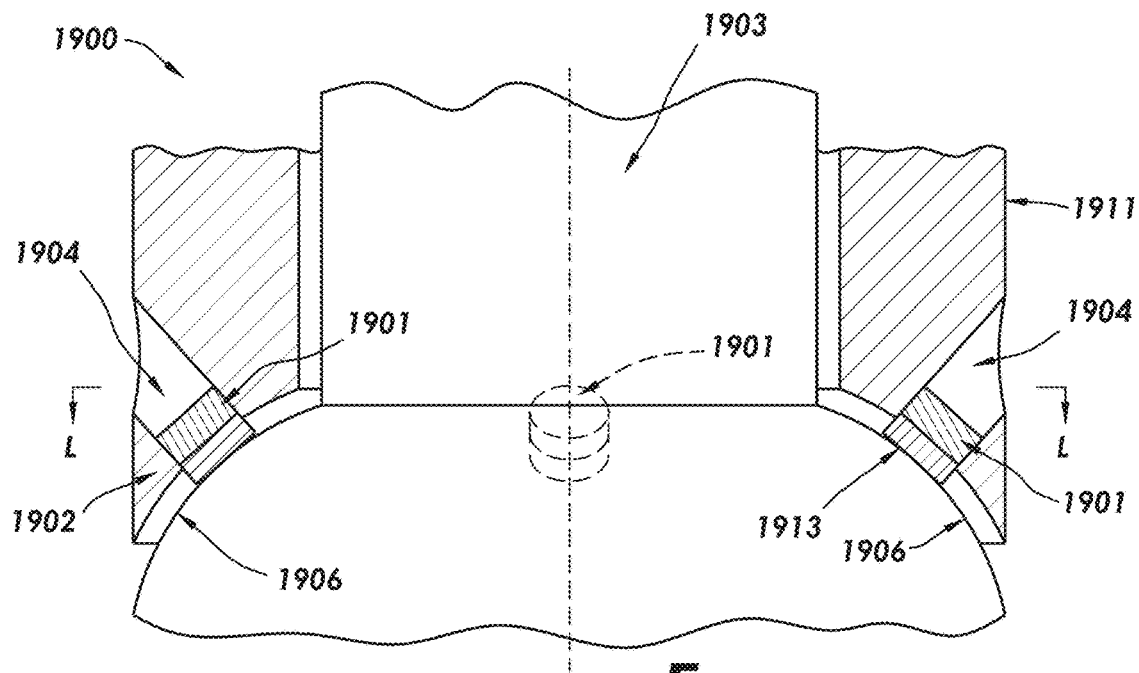
FIG. 19A is a partial side view of a rotor and stator radial bearing assembly of an embodiment of the technology of this application.
Figure 19B:
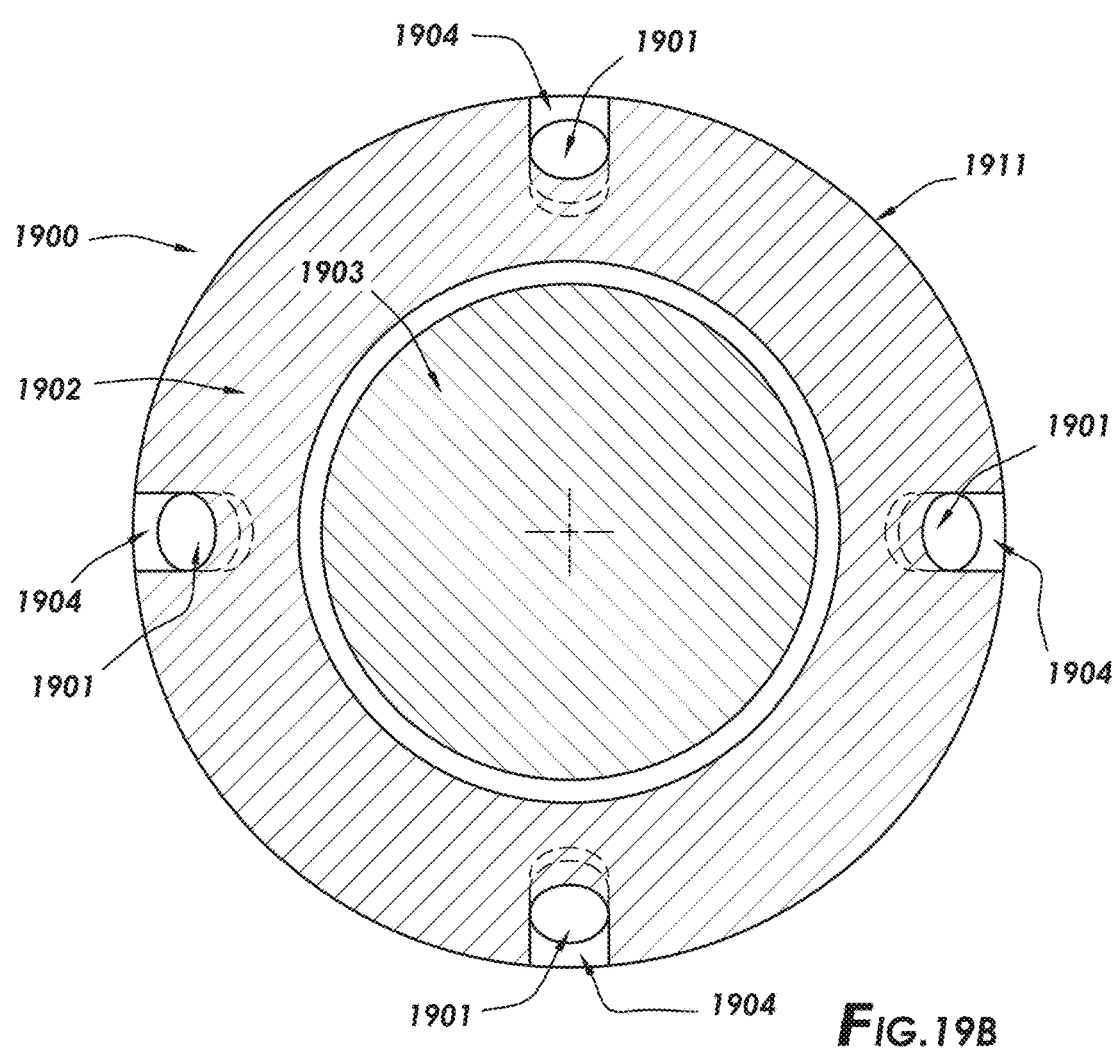
FIG. 19B is a cross-sectional view of the assembly of FIG. 19A taken along line L-L.
Figure 20:
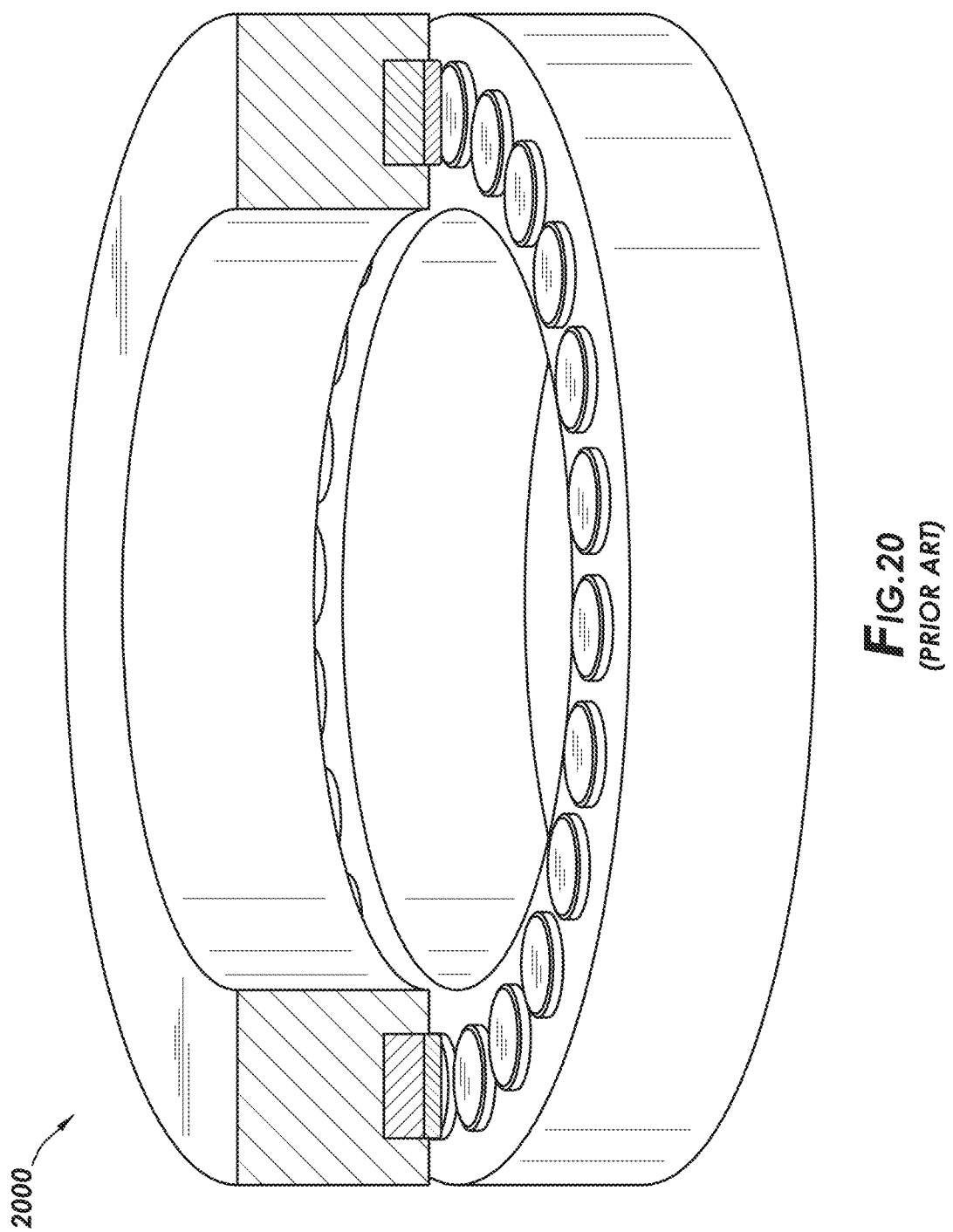
FIG. 20 is a partial cutaway view of a polycrystalline diamond to polycrystalline diamond interface thrust bearing of the prior art.

FIGS. 19A and 19B depict a partial side view of a rotor and stator radial and thrust bearing assembly 1900 including planar (or domed, not shown) polycrystalline diamond elements 1901 fitted into stator body 1911 of stator 1902 to provide for sliding engagement with rotor 1903, which is formed of or includes at least some diamond reactive material. Polycrystalline diamond elements 1901 are deployed in stator 1902 through loading ports 1904 formed in and/or positioned in stator body 1911. Polycrystalline diamond elements 1901 may be press fit, glued, brazed, threaded, or otherwise mounted using methods known to those skilled in the art.

Polycrystalline diamond elements 1901 are placed into a secure contacting position with radial/thrust convex curved surface 1906 of rotor 1903 to limit lateral and upward axial movement of rotor 1903 while allowing for free sliding rotation of rotor 1903 during operation. Radial/thrust convex curved surface 1906 is or forms the opposing engagement surface. Polycrystalline diamond elements 1901 slidingly engage the radial/thrust convex curved surface 1906 of rotor 1903, such that engagement surface 1913 is engaged with the opposing engagement surface (i.e., radial/thrust convex curved surface 1906). In the assembly 1900, the contact areas on the planar or domed polycrystalline diamond elements are typically circular. However, one skilled in the art would understand that the polycrystalline diamond elements may have different contact areas.

As is evident from FIG. 19B, planar polycrystalline diamond elements 1901 are deployed in stator 1902 to radially and axially support and provide sliding engagement with rotor 1903.

Although FIGS. 19A and 19B show four polycrystalline diamond elements 1901, it would be understood by those skilled in the art that fewer (e.g., three) or more polycrystalline diamond elements may be deployed in stator 1902. Further, although FIGS. 19A and 19B depict a single circumferential set of polycrystalline diamond elements 1901, it would be understood by those skilled in the art that one or more additional circumferential sets of polycrystalline diamond elements may be deployed in the stator to increase lateral and axial support and lateral and axial load taking capability of the bearing assembly.

As is evident in view of FIGS. 8A-19B, some aspects of the present disclosure include high-performance radial bearings incorporating polycrystalline diamond elements in sliding engagement with curved or cylindrical surfaces formed of or including at least some diamond reactive material. Some such aspects include high-performance radial bearings where a diamond reactive material containing rotor is put into sliding contact with preferably three or more polycrystalline diamond elements mounted on a stator. The polycrystalline diamond elements of the stator are preferably planar faced, but may also be slightly concave, convex, or any combination of the three. The facial contours of the polycrystalline diamond elements of the stator need not, and preferably do not, match the curve of the circumference of the stator. Although three or more polycrystalline diamond elements are preferred, the technology of the application may be practiced with as few as one or two polycrystalline diamond elements, such as where the polycrystalline diamond elements are used to reduce wear and friction on the gravitational low side of a stator in a horizontally oriented positive displacement pump or opposite the scribe side of a directional drilling assembly.

In certain applications, the bearing assemblies disclosed herein are configured to resist thrust load. At least some embodiments of the bearing assemblies disclosed herein are capable of simultaneously handling components of both radial and thrust loads.

At least some embodiments of the bearing assemblies disclosed are economically viable and of a relatively large diameter.

Radial Bearing—Shapes, Sizes, and Arrangements of PCD Elements

In some applications, the radial bearings have one or more convex, contoured polycrystalline diamond elements mounted on a rotor (or stator) in sliding contact with a stator (or rotor).

In some applications, the polycrystalline diamond elements are deployed in rings along the bearing component. A non-limiting example is a ring of five planar face polycrystalline diamond elements deployed on a distal portion of a stator and another ring of five planar face polycrystalline diamond elements deployed on a proximal portion of the stator. Thus, the high-performance polycrystalline diamond elements bearing assemblies can be deployed to ensure stable operation along the length of the stator/rotor interface, while requiring less total polycrystalline diamond elements than are used in prior, existing assemblies.

The polycrystalline diamond elements may be arranged in any pattern, layout, spacing or staggering within the bearing assembly to provide the desired support, without concern for the need for overlapping contact with polycrystalline diamond elements engagement surfaces on the opposing bearing component.

Radial Bearing—Contact Area of Engagement Surface

A key performance criterion is that the polycrystalline diamond element is configured and positioned in such a way as to preclude any edge or point contact with the opposing engagement surface or component. For a planar faced polycrystalline diamond element placed on the stator, such polycrystalline diamond elements typically experience less than full face contact with the rotor. That is, as the rotor rotates against the polycrystalline diamond elements, the engagement surface contact area is less than full face. For polycrystalline diamond elements, mounted on either the rotor or stator, that are at least slightly domed or convex, such polycrystalline diamond elements exhibit a small, generally circular engagement surface contact area. If the convex polycrystalline diamond elements, mounted on either the rotor or stator, are saddle shaped, then the polycrystalline diamond elements exhibit a small linear area engagement surface contact area. For slightly concave polycrystalline diamond elements that are deployed on the stator, a somewhat narrow linear engagement surface contact area is exhibited on each polycrystalline diamond element.

Radial Bearing—PCD Element Mounting

The polycrystalline diamond elements may be mounted directly to the bearing element (e.g., stator or rotor) via methods known in the art including, but not limited to, brazing, gluing, press fitting, shrink fitting, or threading. Additionally, the polycrystalline diamond elements may be mounted in a separate ring or rings. The ring or rings may then be deployed on the bearing element (rotor or stator) via methods known in the art including, but not limited to, gluing, press fitting, thread locking, or brazing. Planar face or domed polycrystalline diamond elements may be mounted in a manner to allow them to rotate about their own axis.

Radial Bearing—Treatment of Opposing Engagement Surface

In some aspects, the opposing engaging surface of the diamond reactive material is pre-saturated with carbon (e.g., prior to engagement with the engagement surface). Such pre-saturation reduces the ability of the diamond reactive material to attract carbon through graphitization of the surface of the polycrystalline diamond. The pre-saturation of the diamond reactive material surface contact area may be accomplished via any method known in the art.

Radial Bearing—Solid Lubricant Source

In certain applications, a solid lubricant source, for example, a graphite or hexagonal boron nitride stick or inclusion, either energized or not energized, is in contact with the opposing engagement surface formed of or including at least some the diamond reactive material.

Radial Bearing—Applications

The bearing assemblies disclosed herein may form a portion of a machine or other apparatus or system. In some such aspects, the proximal end of the stator may be connected to another component, such as a drill string or motor housing by threaded connection, welding, or other connection means as known in the art. In some aspects, if the bearing assembly is used in a downhole application, the distal end of the rotor may be augmented by a thrust bearing and may carry a threaded connection for the attachment of a drill bit, or the distal end of the rotor may be a drill bit directly formed on and/or positioned on the end of the mandrel of the rotor. The component connections are not limited to downhole applications, and can be applied to other applications, for example wind turbine energy generators, or marine applications.

Furthermore, discrete versions of the bearing assemblies described herein may be used in a broad array of other applications including, but not limited to, heavy equipment, automotive, turbines, transmissions, rail cars, computer hard drives, centrifuges, medical equipment, pumps, and motors.

In certain aspects, the bearing assemblies disclosed herein are suitable for deployment and use in harsh environments (e.g., downhole). In some such aspects, the bearing assemblies are less susceptible to fracture than bearing assemblies where a polycrystalline diamond engagement surface engages with another polycrystalline diamond engagement surface. In certain aspects, such harsh environment suitable radial bearings provide enhanced service value in comparison with bearing assemblies that include a polycrystalline diamond engagement surface engaged with another polycrystalline diamond engagement surface. Furthermore, the bearing assemblies disclosed herein may be capable of being spaced apart at greater distances that the spacings required when using bearing assemblies that include a polycrystalline diamond engagement surface engaged with another polycrystalline diamond engagement surface.

In certain applications, the bearing assemblies disclosed herein can act as a rotor catch, such as in downhole applications.

In lubricated environments, the bearing assemblies may benefit from the hydrodynamic effect of the lubricant creating a clearance between the moving and stationary elements of the bearing assembly.

Thrust Bearing

Certain embodiments of the present disclosure include thrust bearings and thrust bearing assemblies, as well apparatus and systems including the same, and to methods of making, assembling, and using the same. In the thrust bearings, one thrust face is formed of or includes at least some polycrystalline diamond and the other, opposing thrust face is formed of or includes at least some diamond reactive material.

Thrust Bearing—Interfacing Polycrystalline Diamond with Diamond Reactive Materials In some aspects, the present disclosure provides for interfacing the engagement between a thrust face and an opposing thrust face with polycrystalline diamond elements in contact with a diamond reactive material. For example, the polycrystalline diamond elements may be positioned and arranged on one thrust face for contact with the other, opposing thrust face, where the other, opposing thrust face is formed of or includes at least some diamond reactive material. The polycrystalline diamond element may have an engagement surface for engagement with an opposing engagement surface of the diamond reactive material.

In some aspects the opposing engagement surface includes or is composed of at least 2 wt. % of diamond reactive material, or from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond reactive material.

In certain applications, the polycrystalline diamond element, or at least the engagement surface thereof, is lapped or polished, optionally highly lapped or highly polished. Although highly polished polycrystalline diamond elements are preferred in at least some applications, the scope of this disclosure is not limited to highly polished polycrystalline diamond elements and includes polycrystalline diamond elements that are highly lapped or polished.

Exemplary Thrust Bearings

Turning now to the Figures, exemplary, non-limiting embodiments of the thrust bearings will now be described. Throughout the Figures, like reference numerals indicate like elements. For example, in FIGS. 21A and 21B, the reference numeral 2102 refers to the engagement surfaces of the polycrystalline diamond elements, and in FIGS. 22A and 22B, the reference numeral 2202 refers to the engagement surfaces of the polycrystalline diamond elements.

Figure 21A:
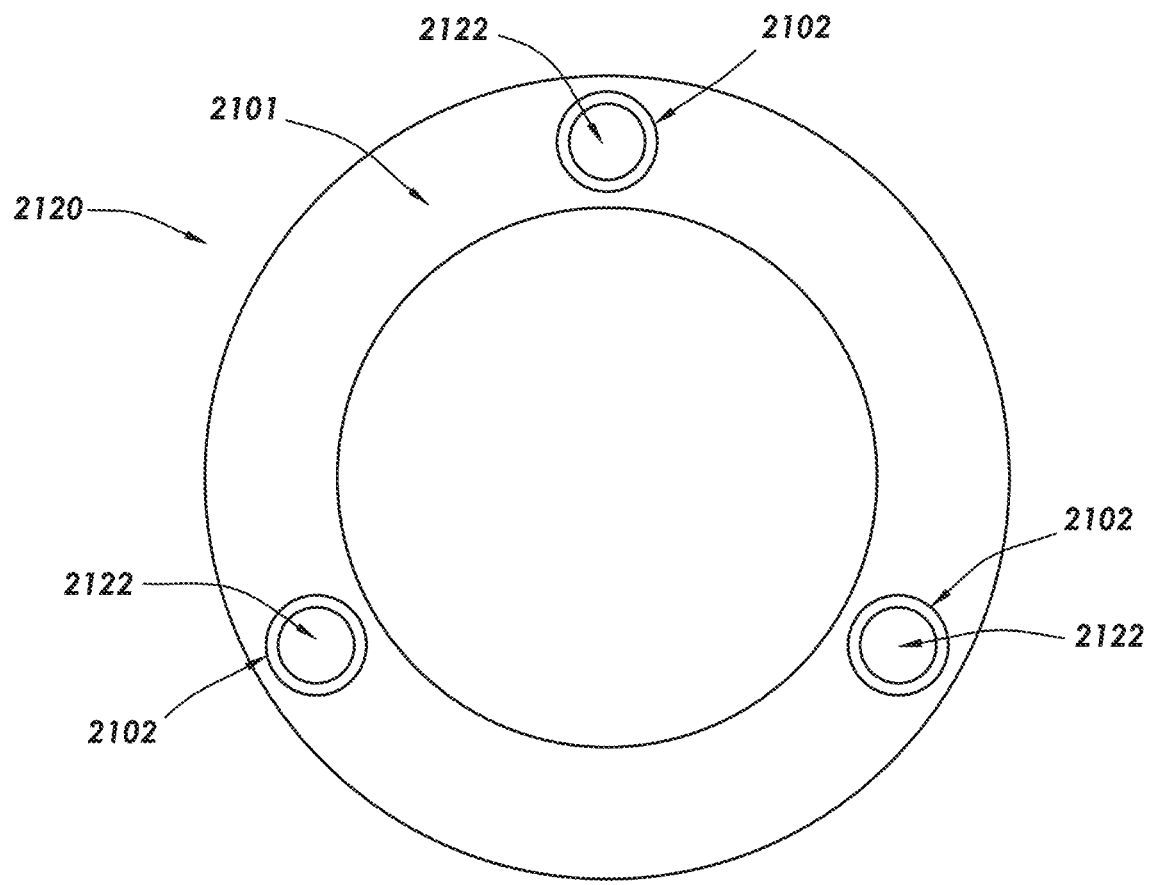
FIG. 21A is a top view of polycrystalline diamond thrust face of a thrust bearing of an embodiment of the technology of this application.

FIG. 21A depicts a top view of thrust ring 2120 having thrust face 2101 in accordance with an embodiment of the technology of this application. Thrust face 2120 (also referred to as polycrystalline diamond thrust face) includes polycrystalline diamond elements 2102 embedded within, attached to, or otherwise coupled with and/or engaged with thrust face 2120. Polycrystalline diamond elements 2102 may be mounted directly to thrust face 2120 via methods known in the art including, but not limited to, brazing, gluing, press fitting, shrink fitting, or threading. While thrust face 2120 is shown and described as having three polycrystalline diamond elements 2102, one skilled in the art would understand that thrust face 2120 may include more or less than three polycrystalline diamond elements 2102. Also, while shown has evenly spaced, one skilled in the art would understand that the spacing between polycrystalline diamond elements 2102 may be even or uneven. Further, one skilled in the art would understand that the spacing between polycrystalline diamond elements 2102 may be more or less than as shown in FIG. 21A.

Each polycrystalline diamond element 2102 includes an engagement surface 2122. Engagement surfaces 2122 may be a surface layer of lapped, polished, highly lapped, or highly polished polycrystalline diamond. In some aspects, engagement surfaces 2122 may be planar or convex.

Figure 21B:
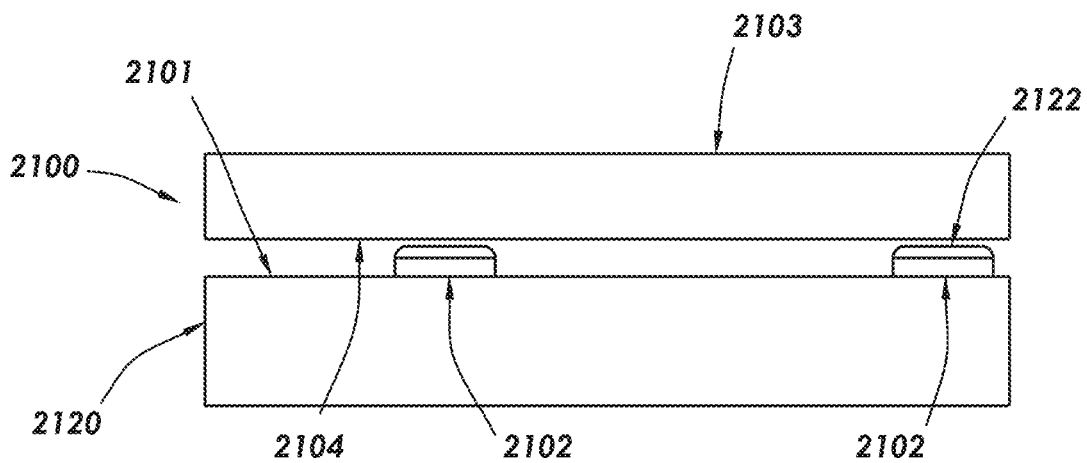
FIG. 21B is a side view of the polycrystalline diamond thrust face of FIG. 21A in sliding contact with an opposing thrust face formed of or including at least some diamond reactive material.

FIG. 21B depicts thrust bearing assembly 2100, including thrust face 2101 of thrust ring 2120 in sliding contact with opposing thrust face 2104 of opposing thrust ring 2103. Thrust ring 2103 and opposing thrust face 2104 are formed of or includes at least some diamond reactive material. Thus, in operation, when thrust bearing assembly 2100 is bearing load, engagement surfaces 2122 are in sliding contact with opposing thrust face 2104 (also referred to as opposing engagement surface).

While both thrust rings 2120 and 2103 are shown having the shape of a ring, one skilled in the art would understand that the thrust faces disclosed herein may be formed on thrust components of other shapes suitable for thrust bearing depending upon the particular application.

Figure 22A:
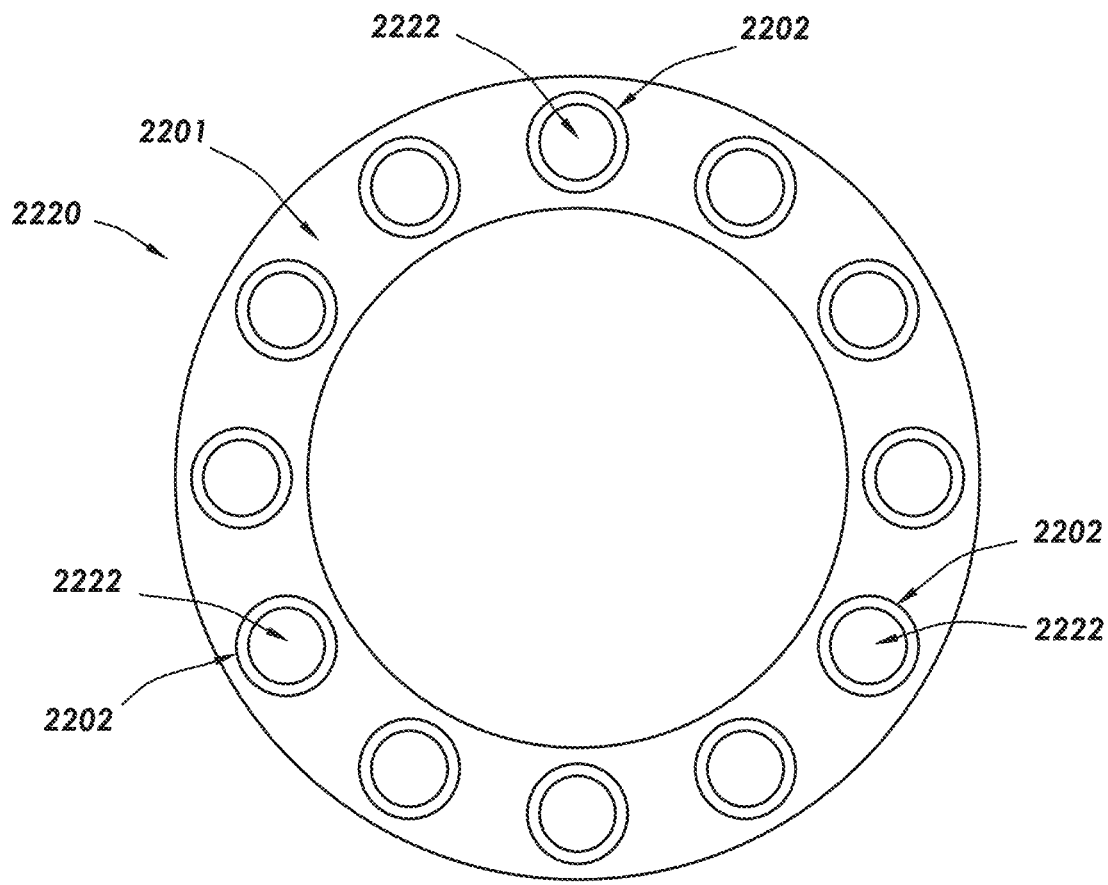
FIG. 22A is a top view of polycrystalline diamond thrust face of a thrust bearing of an embodiment of the technology of this application.

FIG. 22A depicts a top view of thrust ring 2220 having thrust face 2201 with a plurality of polycrystalline diamond elements 2202 coupled therewith in accordance with an embodiment of the technology of this application. In this embodiment, thrust face 2201 is set with twelve polycrystalline diamond elements 2202, each having an engagement surface 2222.

Figure 22B:
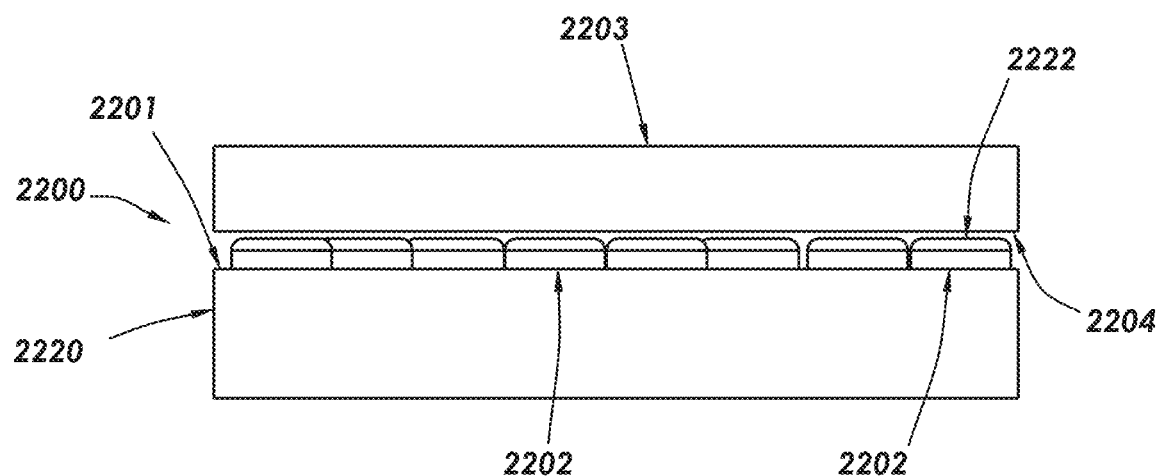
FIG. 22B is a side view of the polycrystalline diamond thrust face of FIG. 23A in sliding contact with an opposing thrust face formed of or including at least some diamond reactive material.

FIG. 22B depicts a side view thrust bearing assembly 2200, including thrust face 2201 of FIG. 22A in sliding contact with thrust face 2204, such that engagement surfaces 2222 are in sliding contact with opposing thrust face 2204, which is formed of or includes at least some diamond reactive material.

Thrust Bearing—Polycrystalline Diamond Layer with Edge Radius

Figure 23:
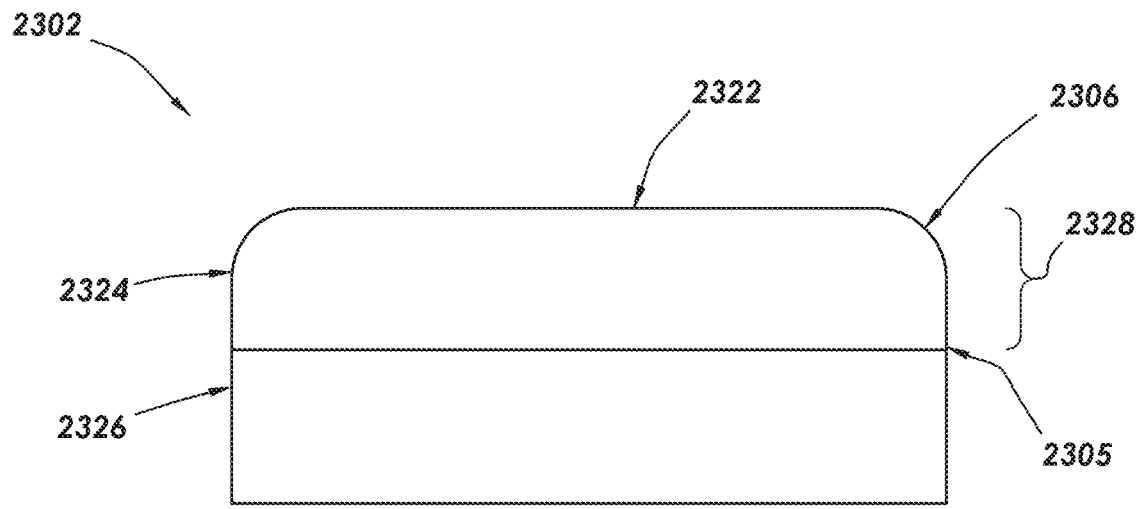
FIG. 23 is a side view of an exemplary polycrystalline diamond element of an embodiment of the technology of this application.

FIG. 23 depicts a side view of an exemplary polycrystalline diamond element 2302 of an embodiment of the technology of this application. In this example, polycrystalline diamond element 2302 includes polycrystalline diamond layer 2324 supported by tungsten carbide substrate 2326. A diamond-to-substrate interface line is indicated at 2305.

Opposite the interface between polycrystalline diamond layer 2324 and tungsten carbide substrate 2326 (i.e., opposite diamond-to-substrate interface line 2305), engagement surface 2322 is formed on polycrystalline diamond layer 2324. Engagement surface 2322 may be a top surface of polycrystalline diamond layer 2324 that has been lapped, polished, highly lapped, or highly polished. As shown, from diamond-to-substrate interface line 2305 to engagement surface 2322, alongside edge 2328, polycrystalline diamond layer 2324 has a relatively significant edge radius 2306. One skilled in the art would understand that polycrystalline diamond layers disclosed herein are not limited to this particular shape and are not limited to being supported on tungsten carbide or to be supported at all.

Thrust Bearing—Polycrystalline Diamond Layer with Arcuate Edge

Figure 24:
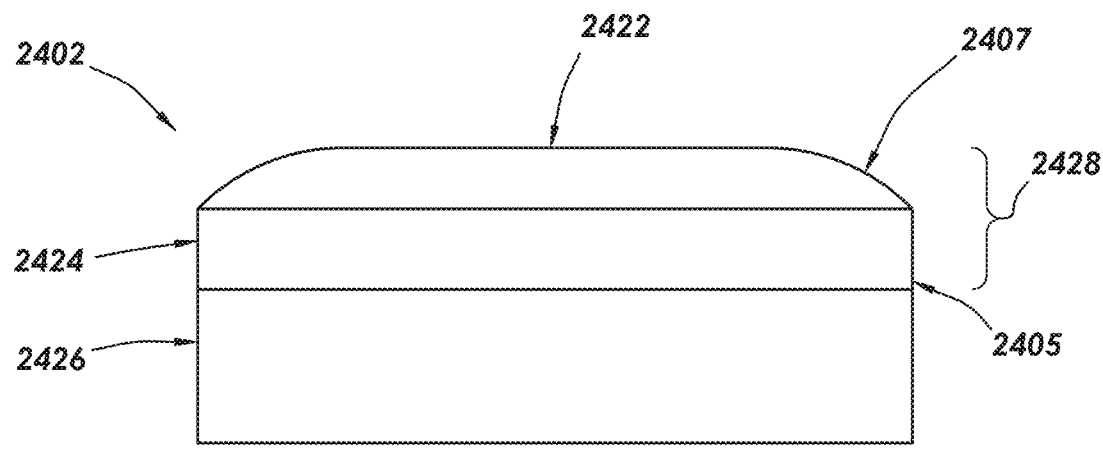
FIG. 24 is a side view of an exemplary polycrystalline diamond element of an embodiment of the technology of this application.

FIG. 24 depicts a side view of an exemplary polycrystalline diamond element 2402 of an embodiment of the technology of this application. In this example, polycrystalline diamond layer 2424 is supported by tungsten carbide substrate 2426, and interfaces therewith at diamond-to-substrate interface line 2405. Polycrystalline diamond element 2402 is substantially similar to polycrystalline diamond element 2402, with the exception that polycrystalline diamond layer 2424 has more arcuate edge 2407 in comparison to edge radius 2406. Arcuate edge 2407 of polycrystalline diamond layer 2424 may be provided via arcuate edge treatments, as is known in the art. Also shown is side edge 2428.

Thrust Bearing—Polycrystalline Diamond Layer with Large Edge Radius

Figure 25:
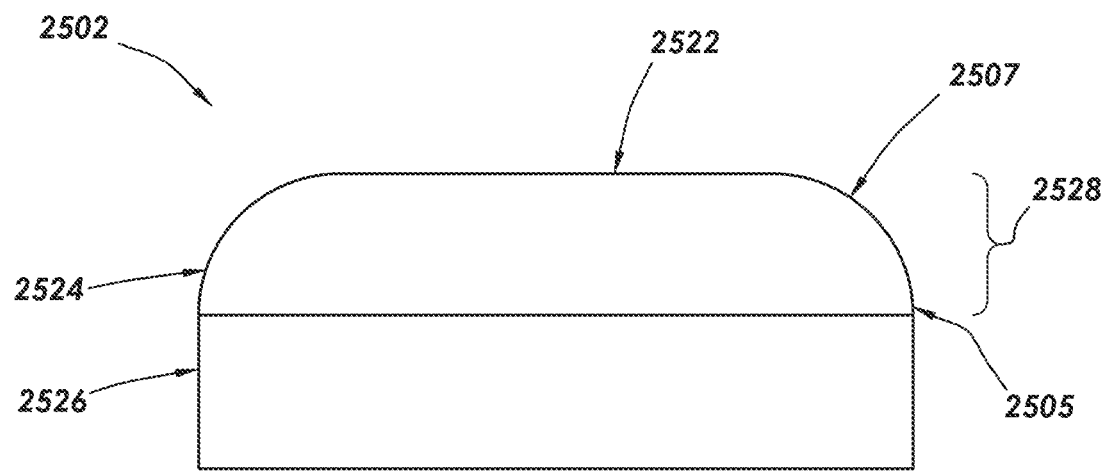
FIG. 25 is a side view of an exemplary polycrystalline diamond element of an embodiment of the technology of this application.

FIG. 25 depicts a side view of an exemplary polycrystalline diamond element 2502 of an embodiment of the technology of this application. In this example, polycrystalline diamond layer 2524 is supported by tungsten carbide substrate 2526, with diamond-to-substrate interface line shown at 2505. Polycrystalline diamond element 2502 is substantially similar to polycrystalline diamond element 2502, with the exception that polycrystalline diamond layer 2524 has a large radius edge 2507. Large radius edge 2507 may be provided via large radius edge treatments, as is known in the art. Also shown is side edge 2528.

Thrust Bearing—Polycrystalline Diamond Layer with Larger Edge Radius

Figure 26:
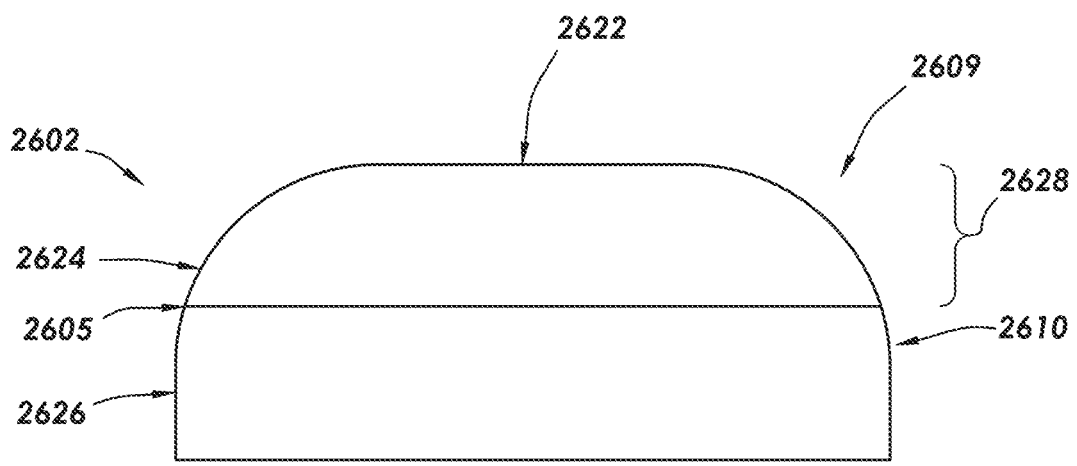
FIG. 26 is a side view of an exemplary polycrystalline diamond element of an embodiment of the technology of this application.

FIG. 26 depicts a side view of an exemplary polycrystalline diamond element 2602 of an embodiment of the technology of this application. In this example, polycrystalline diamond layer 2624 is supported by tungsten carbide substrate 2626, with diamond-to-substrate interface line shown at 2605. Polycrystalline diamond element 2602 is substantially similar to polycrystalline diamond element 2502, with the exception that polycrystalline diamond layer 2624 has an even larger radius edge 2609, which may be provided via large radius edge treatments, as is known in the art. In this example, the edge radius begins, not on the polycrystalline diamond layer 2624, as is the case in polycrystalline diamond element 2502, but in the tungsten carbide substrate 2626 at tangent point 2610. Also shown is side edge 2628.

Thrust Bearing—Polycrystalline Diamond Layer with Multi-Component Edge

Figure 27:
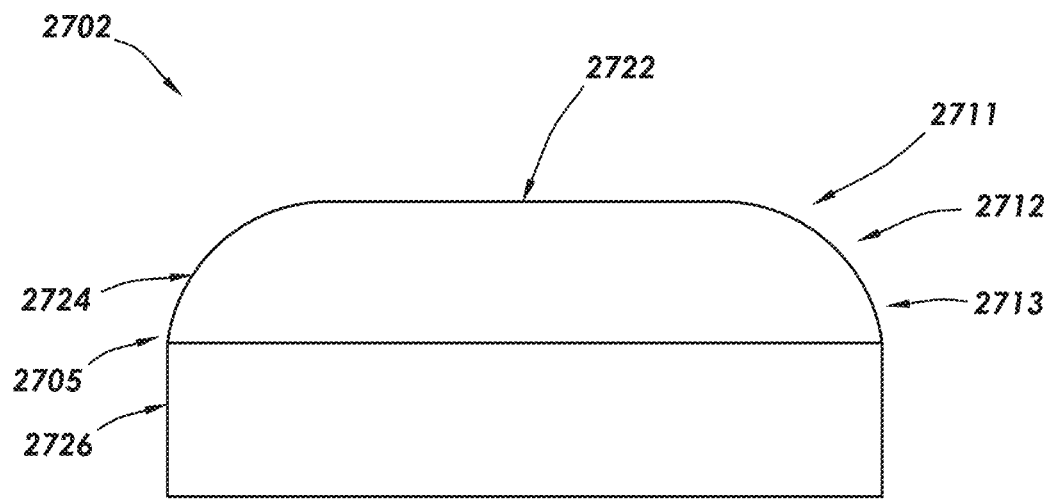
FIG. 27 is a side view of an exemplary polycrystalline diamond element of an embodiment of the technology of this application.

FIG. 27 depicts a side view of an exemplary polycrystalline diamond element 2702 of an embodiment of the technology of this application. In this example, polycrystalline diamond layer 2724 is supported by tungsten carbide substrate 2726, with diamond-to-substrate interface line shown at 2705. Polycrystalline diamond layer 2724 has been treated via multi-component edge treatment, including edge radius 2711 connected to chamfer angle 2712, which is connected to additional edge radius 2713.

Thus, in some embodiments the thrust bearings of the present application are high-performance thrust bearings, where a diamond reactive material of an opposing thrust face is put into sliding contact with at least one polycrystalline diamond element mounted on another thrust face. The polycrystalline diamond element(s) of the thrust face are preferably planar but may be convex. Further, although three or more polycrystalline diamond elements are preferred, the technology of the application may be practiced with as few as one or two polycrystalline diamond elements. Even use of a single polycrystalline diamond element in sliding contact with an opposing diamond reactive material surface may result in a decrease in the coefficient of friction between the thrust bearing surfaces (thrust faces) and may act to break up or reduce galling between the surfaces.

At least some embodiments of the thrust bearings disclosed herein are suitable for use in harsh environments. At least Some embodiments of the thrust bearings disclosed herein are less susceptible to polycrystalline diamond fracture in comparison to thrust bearings that have polycrystalline diamond-to-polycrystalline diamond engagement. Thus, the thrust bearings provided by the technology of this application are harsh-environment suitable thrust bearings that provide enhanced service value in comparison to thrust bearings that have polycrystalline diamond-to-polycrystalline diamond engagement.

Thrust Bearing—Preclusion of Edge Contact

A key performance criterion of at least some embodiments of the presently disclosed thrust bearings is that the polycrystalline diamond bearing element(s) are configured (i.e., positioned, arranged) in such a way as to preclude any edge contact between the polycrystalline diamond bearing element and the opposing component formed of or including at least some the diamond reactive material (i.e., the opposing thrust face). One preferred method of accomplishing this key performance criterion is to employ polycrystalline diamond elements that have relatively significant edge radii. The edge radii of the polycrystalline diamond elements are such that, if tilt or misalignment of one or both of the thrust faces occurs, the edge radii of the polycrystalline diamond elements will present a blunt surface to the opposing thrust face that is formed of or includes at least some diamond reactive material, rather than presenting a sharp edge that could lead to machining or cutting or scribing of the surface of the diamond reactive material. Without limiting this disclosure, in certain embodiments traditionally chamfered polycrystalline diamond edge treatments are not preferred.

Figure 28:
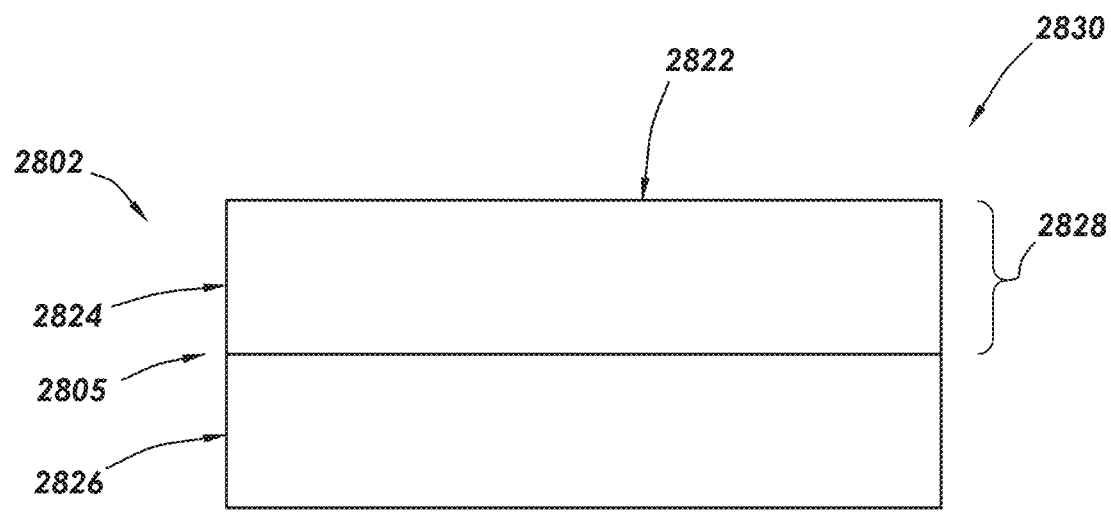
FIG. 28 is a side view of a polycrystalline diamond element without edge treatment, having a sharp corner.

The polycrystalline diamond edge treatments shown and described with reference to FIGS. 23-27 provide non-limiting methods of blunting the edges of an otherwise planar face (engagement surfaces 2322, 2422, 2522, 2622, 2722) of the respective polycrystalline diamond elements. Such blunting of the edges of the planar faces avoids the occurrence of machining or cutting between the opposing thrust faces, such as if either of the polycrystalline diamond thrust face (engagement surfaces) and the opposing thrust face of diamond reactive material experience a tilting or misalignment. If such a tilting or misalignment occurred, and the polycrystalline diamond layer of the polycrystalline diamond element had a sharp edge 2830, as is shown in FIG. 28, rather than a treated edge, the sharp edge 2830 could machine, cut, or otherwise undesirably engage with the opposing thrust face. Also shown in depiction of polycrystalline diamond element 2802 in FIG. 28 are engagement surface 2822, side edge 2828, polycrystalline diamond layer 2824, diamond-to-substrate interface line 2805, and tungsten carbide substrate 2826.

Figure 29A:
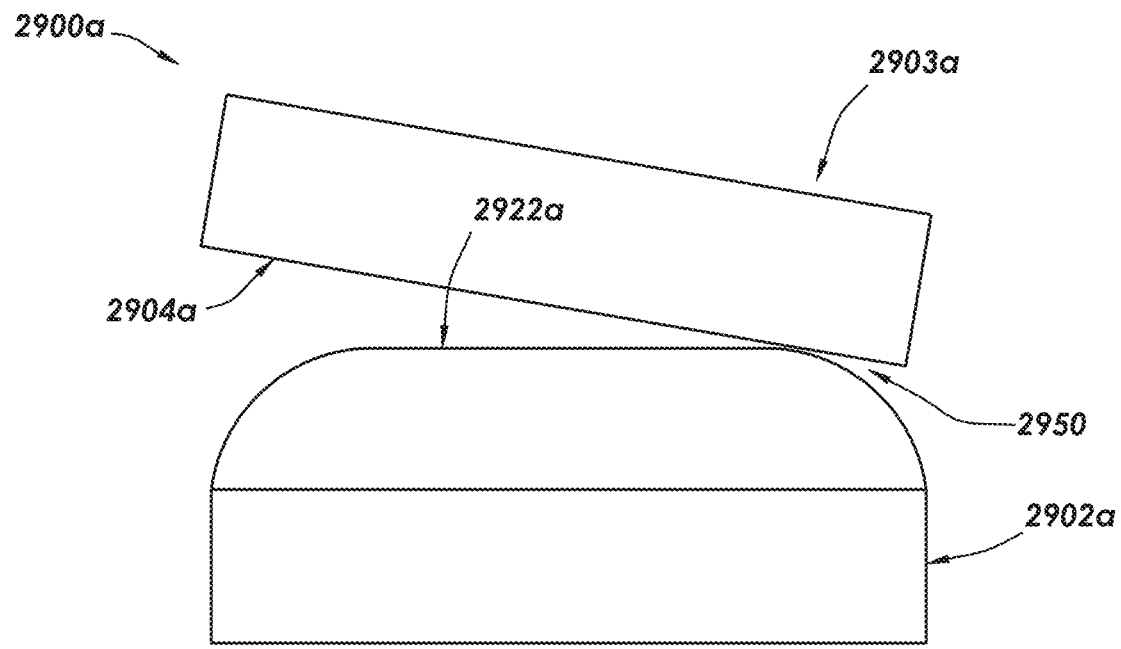
FIG. 29A is a simplified depiction of edge contact between a polycrystalline diamond element having undergone edge treatment and an opposing thrust face.
Figure 29B:
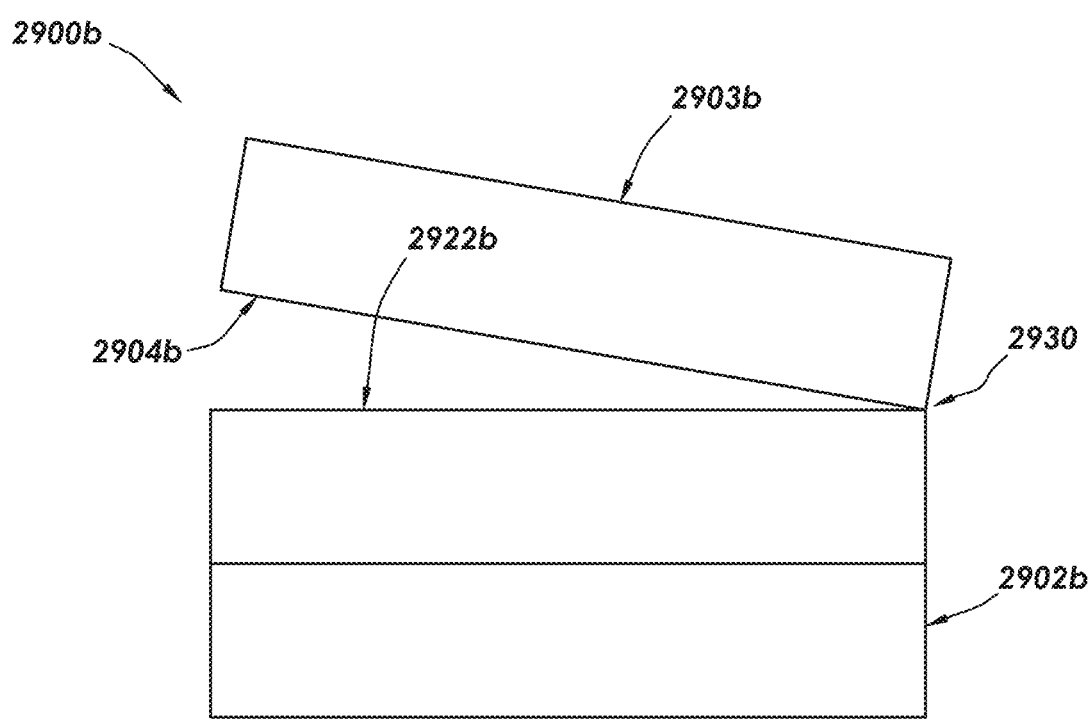
FIG. 29B is a simplified depiction of edge contact between a polycrystalline diamond element not having undergone edge treatment, with a sharp corner, and an opposing thrust face.

FIGS. 29A and 29B illustrate the use an edge-treated polycrystalline diamond element and a polycrystalline diamond element that is not edge-treated, respectively. FIG. 29A depicts a portion of a thrust bearing assembly 2900a, showing polycrystalline diamond element 2902a in sliding contact with thrust ring 2903a (only a portion of which is shown). In FIG. 29A, thrust ring 2903a is tilted or misaligned relative to polycrystalline diamond element 2902a, such that the plane defined by thrust face 2904a is at an angle relative to the plane defined by engagement surface 2922a. Thus, thrust face 2904a engaged with edge 2950 of polycrystalline diamond element 2902a.

Similar to FIG. 29A, FIG. 29B depicts a portion of a thrust bearing assembly 2900b, showing polycrystalline diamond element 2902b in sliding contact with thrust ring 2903b (only a portion of which is shown). In FIG. 29B, thrust ring 2903b is tilted or misaligned relative to polycrystalline diamond element 2902b, such that the plane defined by thrust face 2904b is at an angle relative to the plane defined by engagement surface 2922b. Thus, thrust face 2904b engaged with edge 2930 of polycrystalline diamond element 2902b. However, because polycrystalline diamond element 2902a is subjected to edge treatment, edge 2950 is blunter in comparison to edge 2930, which is sharp. As edge 2930 is sharp, edge 2930 can machine, cut, or otherwise undesirably engage with thrust face 2904b. However, as edge 2950 is blunt, the occurrence of such machining or cutting is reduced or eliminated in the embodiment depicted in FIG. 29A.

In certain aspects, the thrust bearings disclosed herein include a polycrystalline diamond layer that has an edge radius that is at least a 0.050" radius. In certain aspects, the thrust bearings disclosed herein include a polycrystalline diamond layer that has an edge radius that is at least a 0.060" radius, or at least a 0.070" radius, or at least a 0.080" radius, or at least a 0.090" radius.

Thrust Bearing—Polycrystalline Diamond Element—Shapes, Sizes, and Arrangements

In some applications, the polycrystalline diamond elements are deployed in rings along the bearing component (i.e., thrust ring). The polycrystalline diamond bearing elements of the present technology may be deployed in rings around the deployed thrust face. A non-limiting example is a ring of five planar face polycrystalline diamond bearing elements for engagement with an opposing thrust face formed of or including at least some diamond reactive material. Without being bound by theory, a comparable thrust bearing having a polycrystalline diamond thrust face-to-polycrystalline diamond thrust face (as opposed to a polycrystalline diamond thrust face-to-diamond reactive material thrust face) could require more than 20 or even 30 total polycrystalline diamond elements to bear axial load. Thus, some embodiments of the technology of this application provide polycrystalline diamond thrust bearings having a greater spacing between individual polycrystalline diamond elements than is achievable in thrust bearings that have polycrystalline diamond thrust face-to-polycrystalline diamond thrust face contact. With the technology of the present application, the polycrystalline diamond elements may be arranged in any pattern, layout, spacing, or staggering to provide the desired support, without concern for the need for overlapping contact with polycrystalline diamond surfaces on the opposing bearing face.

Thrust Bearing—PCD Element Mounting

As previously described, the polycrystalline diamond elements may be mounted directly to the bearing element (e.g., thrust ring) via methods known in the art including, but not limited to, brazing, gluing, press fitting, shrink fitting, or threading. The polycrystalline diamond elements may be mounted in a separate ring or rings. The ring or rings may then be deployed on the bearing element via methods known in the art including, but not limited to, gluing, press fitting, thread locking, or brazing.

Planar face or domed polycrystalline diamond elements may be mounted in a manner to allow them to rotate about their own axis.

Thrust Bearing—Treatment of Opposing Engagement Surface

In some aspects, the opposing engaging surface of the diamond reactive material is pre-saturated with carbon (e.g., prior to engagement with the engagement surface). Such pre-saturation reduces the ability of the diamond reactive material to attract carbon through graphitization of the surface of the polycrystalline diamond. The pre-saturation of the diamond reactive material surface contact area may be accomplished via any method known in the art.

In certain applications, a solid lubricant source, for example, a graphite or hexagonal boron nitride stick or inclusion, either energized or not energized, is in contact with the opposing engagement surface formed of or including at least some the diamond reactive material.

In lubricated environments, the bearing assemblies may benefit from the hydrodynamic effect of the lubricant creating a clearance between the moving and stationary elements of the bearing assembly.

Material Treatments

Certain embodiments of the present disclosure include treatment processes for the treatment of materials or surfaces thereof, including materials and surfaces of apparatus that have an engagement surface and an opposing engagement surface that are in moving contact with one another, as well as to apparatus having materials or surfaces that are treated by such treatment processes. The treatment processes disclosed herein may be used to treat the opposing engagement surfaces disclosed herein that include diamond reactive material. The treatment processes disclosed herein may be applied to any of the apparatus shown and described herein, including the cam follower assemblies (and portions thereof) of FIGS. 1-6, the radial bearing assemblies (and portions thereof) of FIGS. 8A-19B, and the thrust bearing assemblies (and portions thereof) of FIGS. 21A-29B. For example, with reference to the FIGS. 1-29B, some of the exemplary materials and surfaces that may be treated with the treatment processes disclosed herein are opposing engagement surface 211 (FIGS. 2A and 2B), opposing engagement surface 311 (FIGS. 3 and 6), opposing engagement surface 411 (FIG. 4), opposing engagement surface 511 (FIG. 5), opposing engagement surface 815 (FIGS. 8A and 8B), opposing engagement surface 915 (FIGS. 9A and 9B), opposing engagement surface 1015 (FIGS. 10A and 10B), opposing engagement surface 1115 (FIGS. 11A and 11B), opposing engagement surface 1215 (FIGS. 12A and 12B), opposing engagement surface 1315 (FIGS. 13A and 13B), opposing engagement surface 1415 (FIGS. 14A and 14B), opposing engagement surface 1515 (FIGS. 15A and 15B), opposing engagement surface 1615 (FIGS. 16A and 16B), opposing engagement surface 1715 (FIGS. 17A and 17B), opposing engagement surface 1815 (FIGS. 18A and 18B), opposing engagement surface 1915 (FIGS. 19A and 19B), opposing engagement surface 2104 (FIGS. 21A and 21B), opposing engagement surface 2204 (FIGS. 22A and 22B), and opposing engagement surfaces 2904a and 2904b (FIGS. 29A and 29B).

In some particular embodiments, the opposing engagement surface that is subjected to the material treatments disclosed herein is or includes steel or another diamond reactive material, and the engagement surface is or includes polycrystalline diamond.

Certain material treatments that may be used to treat the diamond reactive material, or at least the opposing bearing surface thereof, include material treatments described in the incorporated U.S. patent application Ser. Nos. 16/049,588; 16/049,608; and Ser. No. 16/049,617, including the application of a solid lubricant onto the opposing bearing surface, such as graphite or hexagonal boron nitride; the pre-saturation of the opposing bearing surface with carbon; and an opposing bearing surface that has been boronized, nitrided, or otherwise case hardened. The application or graphite or another form of carbon to the opposing bearing surface may provide a sacrificial layer of carbon, as described in more detail below.

In some embodiments, the diamond reactive material, or a surface thereof, is hardened via one or more material treatments, is treated to increase resistance to corrosion, or combinations thereof. For example, the diamond reactive material may be hardened, plated, coated, cladded, or combinations thereof. Some exemplary material treatments that may be used to treat the diamond reactive materials and surfaces thereof include, but are not limited to: cold working or work hardening, such as burnishing and shot-peening; heat treating, such as through hardening, case hardening, or cryogenic treatment; plating or coating, such as physical vapor deposition (PVD), chemical vapor deposition (CVD), chromium plating, phosphating, or anodizing; and cladding.

Cold Working/Work Hardening

In some embodiments, the diamond reactive material, or at least the opposing engagement surface thereof, is subjected to plastic deformation to harden the diamond reactive material and smooth the surface thereof. Some exemplary plastic deformation processes that may be used include work hardening, including cold working.

"Work hardening" (sometimes referred to as strain hardening) is a process by which a material is strengthened via plastic deformation of the material, as a result of dislocations within a crystal structure of the material. Some work hardening processes are cold working or cold forming processes, in which a material is treated at a temperature below the recrystallization temperature of that material (e.g., at ambient temperature). Work hardening of a metal increases the hardness, yield strength, and tensile strength of the metal, as well as increasing fatigue life (fatigue resistance) of the metal.

In some embodiments, when a diamond engagement surface and a diamond reactive material opposing engagement surface are engaged with one another and are moving relative to one another, such moveable engagement therebetween results in a work hardening of the opposing engagement surface. That is, the thermal and mechanical forces involved in such moveable engagement of the surfaces results in the plastic deformation of the diamond reactive material, at least at the surface thereof. Such plastic deformation results in the occurrence of dislocations within the crystal structure of the diamond reactive material at least at the opposing engagement surface. As such, operation of a component that includes such an engagement surface and opposing engagement surface results in working hardening of at least the opposing engagement surface.

Work Hardening—Burnishing

One particular type of work hardening is "burnishing". To burnish a surface, the surface is placed in sliding contact with another surface. The engagement and interfacing of the two surfaces (e.g., the engagement surface and opposing engagement surface disclosed herein) during such sliding contact results in the plastic deformation of at least one of the surfaces, smoothing and shinning the burnished surface as well as hardening the burnished surface. The plastic deformation occurs when the contact stress on the surface exceeds the yield strength of the material at the surface. The burnished surface may exhibit increased resistance to fatigue failure, corrosion and stress corrosion; decreased visual defects and porosity; and surface compressive residual stress.

In some embodiments, burnishing of the opposing engagement surface occurs as a result of the sliding movement of the engagement surface when engaged with the opposing engagement surface (e.g., in the instance of a cam follower sliding on a camming rotor or a radial bearing element sliding relative to a bearing surface).

In some embodiments, the opposing engagement surface, including diamond reactive material, is burnished. The burnished opposing engagement surface exhibits an increased hardness relative to the opposing engagement surface prior to burnishing, as determined in accordance with the Brinell, Rockwell, Knoop and/or Vickers scales, and an improved surface finish (i.e., smoother surface) relative to the opposing engagement surface prior to burnishing. Methods of burnishing are well known to those skilled in the art, and will not be described in further detail.

Work Hardening—Shot-Peening

Another type of work hardening is "shot-peening", which provides a compressive residual stress layer on a surface of a material. To shot-peen a surface, typically the surface is impacted with "shot" (particles) which may be composed of metallic, glass, or ceramic. The shot impacts the surface with a force that is sufficient to result in plastic deformation of the material, at least at the surface thereof. In some embodiments, the opposing engagement surface is subjected to shot-peening prior to engagement with the engagement surface.

Thus, in some embodiments, the opposing engagement surface of diamond reactive material is subjected to hardening and/or surface smoothing via a non-abrasive process, such as burnishing or shot-peening, as opposed to an abrasive process such as polishing. Methods of shot-peening are well known to those skilled in the art, and will not be described in further detail.

Heat-Treating

In some embodiments, the diamond reactive material, or at least the opposing engagement surface thereof, is subjected to heat treating to harden the diamond reactive material. Some exemplary heat-treating processes that may be used include through hardening, case hardening, and cryogenic treatment.

Heat-Treating—Through Hardening

"Through hardening" involves quenching a material, resulting in an increase in hardness of the material. Through hardening results in a generally uniform hardening of a material throughout the bulk of the material, as opposed to just at the surface of the material. To through harden a material, the material is heated, then quenched, and then reheated or tempered.

Thus, in some embodiments, the diamond reactive material is hardened throughout an entirety of the material (e.g., via through hardening), as opposed to being hardened only at the opposing engagement surface of the diamond reactive material (e.g., via case hardening). Methods of through hardening are well known to those skilled in the art, and will not be described in further detail.

Heat-Treating—Case Hardening

"Case hardening" results in a hardening the surface of an apparatus, without the occurrence of substantial hardening of the apparatus below the surface thereof. The case hardening disclosed herein may include carburizing, nitriding, cyaniding, carbo-nitriding and boronizing. In some embodiments, the case hardening disclosed herein includes flame hardening, induction hardening, or laser hardening. In some embodiments, case hardening involves the introduction of a substance onto the surface of the diamond reactive material, and heating such that the substance migrates into the diamond reactive material. For example, carburizing, nitriding, and boronizing may include the dissolution of external elements into the surface of steel (e.g., a relatively low carbon steel having 0.3% C or less), resulting in a hard case thereon. This results in a hardening of the diamond reactive material at the surface where the substance has migrated into the diamond reactive material. For example, carbon or a carbon containing substance may be introduced onto the opposing engagement surface of the diamond reactive material and heated such that a surface layer of the diamond reactive material is enriched in carbon content and is, thereby, hardened. Thus, case-hardening may include a process by which material is added to the diamond reactive material (e.g., the addition of carbon). In some embodiments, the case hardening includes flame, induction or laser hardening, wherein a surface of a metal is hardened without the introduction of external carbon or other elements therein. For example, a steel that contain a sufficient amount of carbon (e.g., a relatively high carbon steel having 0.3% C or more) may be case hardened by flame, induction, or laser hardening.

In some embodiments, the opposing engagement surface is subjected to case hardening prior to engagement with the engagement surface. Methods of case hardening are well known to those skilled in the art, and will not be described in further detail.

Heat-Treating—Cryogenic Treatment

In some embodiments, the diamond reactive material is subjected to cold or cryogenic treatment, such as deep freezing, to harden the diamond reactive material or at least the opposing engagement surface thereof. For example, the diamond reactive material may be cooled (e.g., using liquid or gaseous nitrogen) to a temperature ranging from −100° F. to −300° F. In addition to increased hardness, such treatments may provide the diamond reactive material or at least the opposing engagement surface with increased wear resistance. Methods of cryogenic treatment are well known to those skilled in the art, and will not be described in further detail.

External Layers—Plating, Coating & Cladding

As described above, the work hardening and heat-treating processes are processes by which the diamond reactive material is treated to result in changes in the physical properties (e.g., hardness) exhibited by the diamond reactive material itself. However, in some embodiments, an additional material is added onto or over the diamond reactive material to provide certain properties. The additional material may be added onto the diamond reactive material in the form of plating, coating, or cladding, for example. For example, the additional material may provide increased corrosion-resistance to the diamond reactive material, relative to the corrosion-resistance of the diamond reactive material without the additional material thereon.

External Layers—Chromium Plating

One exemplary plating process may include electroplating, such as Chrome or chromium plating the opposing engagement surface of the diamond reactive material via electroplating a relatively thin layer of chromium onto the opposing engagement surface of the diamond reactive material, providing an opposing engagement surface that has increased corrosion resistance and/or increased surface hardness, relative to the corrosion resistance and/or surface hardness prior to the Chrome or chromium plating. Methods of plating are well known to those skilled in the art, and will not be described in further detail.

External Layers—Phosphating

Another exemplary process of providing the opposing engagement surface of the diamond reactive material with an external layer includes phosphating. In phosphating, metal-phosphate layers are formed via an acid-metal reaction on the opposing engagement surface of the diamond reactive material to provide at least temporary corrosion protection. Methods of phosphating are well known to those skilled in the art, and will not be described in further detail.

External Layers—Vapor Deposition

In some embodiments, an external layer is provided on the opposing engagement surface of the diamond reactive material via vapor deposition, such as CVD or PVD. In some embodiments, plasma is used during CVD processes, sometimes referred to as plasma vapor deposition.

Vapor deposition involves the deposition, from the vapor state, of one component onto the surface of another, solid component, forming a deposition layer thereon. In some embodiments, the opposing engagement surface is subjected to vapor deposition prior to engagement with the engagement surface. One exemplary component that may be deposited onto the opposing engagement surface to form a deposition layer thereon is carbon. Methods of vapor deposition are well known to those skilled in the art, and will not be described in further detail.

Sacrificial Layer of Carbon

For example, a sacrificial layer of carbon may be deposited onto the opposing engagement surface. As used herein a "sacrificial layer of carbon" refers to a layer of carbon positioned between the opposing engagement surface and the diamond of the engagement surface, such that when the opposing engagement surface and engagement surface are movably engaged at or above the graphitization temperature of diamond (i.e., about 700° C.), reaction between the diamond reactive material and the sacrificial layer of carbon occurs preferentially to, or at least prior to, graphitization of the diamond of the engagement surface. That is, because the sacrificial layer of carbon is positioned between the engagement surface of diamond and the opposing engagement surface of diamond reactive material, the sacrificial layer of carbon is closer to and the diamond reactive material than is the diamond of the engagement surface, and is, thus, more susceptible to reaction therewith. The sacrificial layer of carbon may be provided via vapor deposition or another method, such as the application of solid lubricant or pre-saturation with carbon, as described elsewhere herein. Thus, the opposing engagement surface of the diamond reactive material may have a sacrificial layer of carbon thereon. The sacrificial layer of carbon may include carbon or a carbon-containing molecule or composition. In one embodiment, the opposing engaging surface of the diamond reactive material may be pre-saturated with carbon (e.g., prior to engagement with the engagement surface) forming the sacrificial carbon layer, such that the ability of the diamond reactive material to attract carbon through graphitization of the surface of the polycrystalline diamond is reduced.

External Layers—Cladding

In some embodiments, an external layer is provided on the opposing engaging surface by cladding the opposing engagement surface. The opposing engagement surface may be clad with any of numerous materials, including materials that are not diamond reactive materials. For example, the opposing engagement surface may be clad with a material that has a higher corrosion-resistance than the diamond reactive material. Methods of cladding are well known to those skilled in the art, and will not be described in further detail.

External Layers—Anodizing

In some embodiments, the opposing engagement surface of the diamond reactive material is subjected to anodizing, to increase corrosion-resistance, wear-resistance, and/or hardness of the opposing engagement surface. Methods of anodizing are well known to those skilled in the art, and will not be described in further detail.

While various material treatment processes have been described that involve little to no material removal from the diamond reactive material (burnishing and shot-peening) and that involve material additions to the diamond reactive material (external layers and case hardening), the material treatments are not limited to such processes. In some embodiments, the diamond reactive material is treated in such as manner as to result in the removal of material from the diamond reactive material, such as via subjecting the diamond reactive material to polishing or a leaching process.

Methods of Material Treatment

In some embodiments, a method is provided for treating the diamond reactive material, or at least the opposing engagement surface thereof, using one or more of the material treatment processes disclosed herein, including the work hardening/cold working, the heat-treatment, and the external layer applications (e.g., plating, coating, cladding) disclosed herein. For example, the diamond reactive material (or opposing engagement surface) may be treated to provide the diamond reactive material (or opposing engagement surface) with an increase in hardness, corrosion-resistance, or combinations thereof. While the various material treatment processes disclosed herein are described separately, one or more of said material treatment processes may be combined. For example, the opposing engagement surface may be case hardened, and then burnished, through hardened and then shot-peened, or any other combination of material treatment processes.

In some embodiments, the opposing engagement surface is subjected to a material treatment process prior to engagement with the engagement surface. For example, the opposing engagement surface may be through hardened and/or shot-peened prior to engagement with the engagement surface. In other embodiments, the opposing engagement surface is subjected to a material treatment process upon of subsequent to engagement with the engagement surface. For example, movingly (e.g., slidingly) engaging the engagement surface with the opposing engagement surface results in the burnishing of the opposing engagement surface. That is, movingly (e.g., slidingly) engaging the engagement surface with the opposing engagement surface may, in some applications, generate sufficient mechanical and/or thermal forces to result in the opposing engagement surface being burnished.

In some embodiments, the method incudes plastically deforming the opposing engagement surface, resulting in the hardening of the opposing engagement surface, the smoothing of the surface of the opposing engagement surface (i.e., improved surface finish), or combinations thereof. Such methods may include burnishing or shot-peening the opposing engagement surface, or another working hardening or cold working process.

In some embodiments, the method incudes heat-treating the diamond reactive material to increase the hardness and/or corrosion-resistance of the diamond reactive material.

In some embodiments, the method incudes adding one or more external layers on or above the opposing engagement surface to provide the opposing engagement surface with additional properties, such as an increase in hardness and/or corrosion-resistance.

In some embodiments, the method does not include a material removal process, such as polishing or leaching.

In some embodiments, the diamond reactive material is treated to provide a change in property (e.g., increase in hardness) that is exhibited throughout the entirety of the diamond reactive material. In some such embodiments, the change in property is exhibited uniformly (or generally uniformly) throughout the entirety of the diamond reactive material. For example, through hardening provides a generally uniform increase in hardness throughout the diamond reactive material. An example of such a change in property that is exhibited throughout the entirety of the diamond reactive material is shown in FIG. 31B.

In other embodiments, the diamond reactive material is treated to provide a change in property (e.g., increase in hardness) that is only exhibited at a surface of the diamond reactive material and up to a discrete depth below the surface of the diamond reactive material that is less than an entire depth of the diamond reactive material. That is, in such embodiments, at a certain depth below the surface of the diamond reactive material, the change in property provided by the material treatment is not exhibited. For example, case hardening provides a discrete hardening of the diamond reactive material at the surface and to a discrete depth below the surface. An example of such a change in property that is exhibited at the surface of the diamond reactive material is shown in FIG. 30B.

Pre-Burnished Surface

Certain embodiments provide for an opposing engagement surface that is pre-burnished. As used herein, a "pre-burnished" opposing engagement surface is an opposing engagement surface that has been subjected to burnishing prior to operational use, such as prior to deployment in the field (e.g., deployment downhole for operational use). The opposing engagement surface may be pre-burnished by an amount sufficient that the opposing engagement surface maintains a substantially constant coefficient of friction (CoF) when movably engaged with the engagement surface. By pre-burnishing a bearing surface, the apparatus including that bearing surface may have a longer operational life, as the relatively easily deformed portions of the surface (e.g., the asperities), are no longer present due to plastic deformation. With the lower CoF that is provided by such pre-burnishing and the elimination of the relatively easily deformed portions of the surface, the part or apparatus that includes the engagement and opposing engagement surfaces will exhibit less "loosening" between these surfaces.

Material Treated Apparatus

Some embodiments of the present disclosure include an apparatus that includes an engagement surface of diamond and an opposing engagement surface of a diamond reactive material, with the engagement surface and opposing engagement surface in moving (e.g., sliding) contact with one another (i.e., at least one of the engagement surface and opposing engagement surface moves relative to the other while in contact with the other surface), and with the diamond reactive material (or at least the opposing engagement surface) subjected to a material treatment to increase the hardness, corrosion-resistance, or combinations thereof. In some such embodiments, the engagement surface and opposing engagement surfaces are surfaces of bearing assembly, such as a cam follower assembly, a radial bearing assembly, or a thrust bearing assembly. In some such embodiments, the diamond reactive material (or at least the opposing engagement surface) is work-hardened, heat treated, or treated to have an external layer thereon.

Figure 30A:
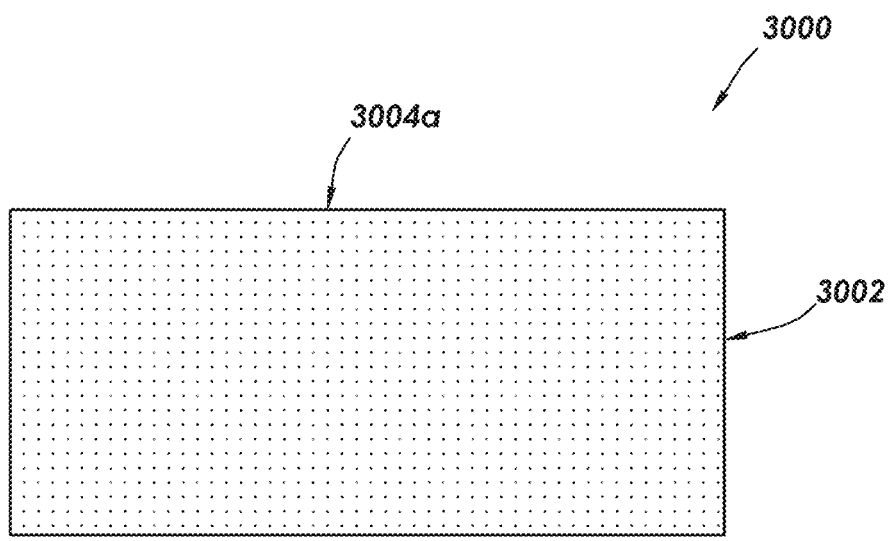
FIG. 30A depicts a bearing surface prior to surface treatment.
Figure 30B:
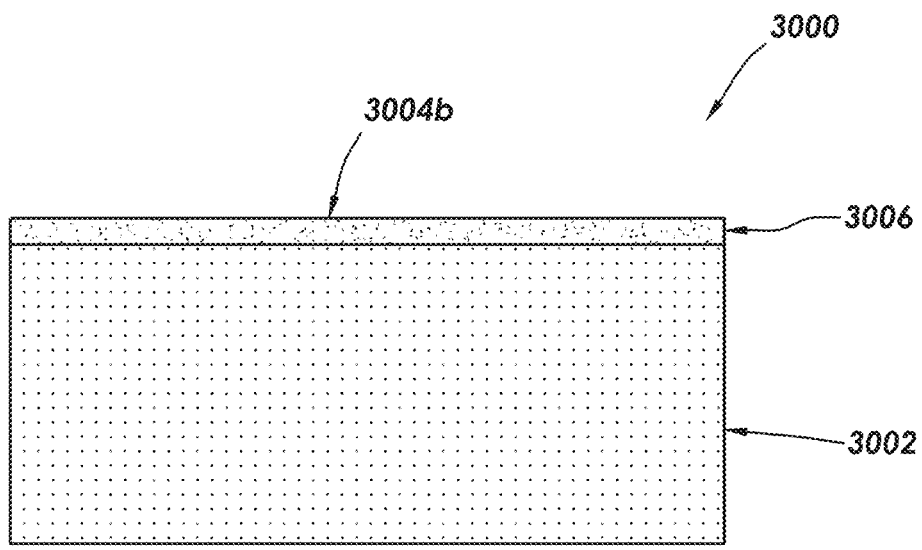
FIG. 30B depicts the bearing surface of FIG. 30A, after surface treatment.

FIGS. 30A and 30B depict one exemplary opposing engagement surface before and after a material treatment, respectively. With reference to FIG. 30A, component 3000*a* includes material 3002, such as steel or another diamond reactive material. Component 3000 includes opposing engagement surface 3004*a*, which is a bearing surface. With reference to FIG. 30B, component 3000 has been subjected to one or more material treatments, as disclosed herein (e.g., work hardening/cold working, heat treatment, and application of an external layer), such that treated surface 3004b is formed, including treated layer 3006. In some embodiments, treated layer 3006 is a different material composition than material 3002. In other embodiments, treated layer 3006 is the same or substantially the same composition as material 3002. For example, treated layer 3006 may be a layer of material 3002 having been subjected to work hardening (e.g., burnishing or shot-peening). In some embodiments, treated layer 3006 is a layer of a second material, different from material 3002, having been deposited onto material 3002, such as via coating, plating, cladding, or vapor deposition. In some embodiments, treated layer 3006 is a portion of material 3002 having been modified via a material treatment process to be different from the remainder of material 3002 in at least one property (e.g., increased hardness). In some such embodiments, treated layer 3006 is layer of material 3002 having been subjected to case hardening, such as carburizing, nitriding, cyaniding, or carbonitriding. Treated layer 3006 may be a layer of hardened diamond reactive material. For example, threated layer 3006 may be a layer of work hardened diamond reactive material, such as burnished or shot-peened diamond reactive material; or heat-treated diamond reactive material, such as case-hardened diamond reactive material. Treated layer 3006 may be an external layer of additional material, such as plating, coating, phosphating, anodized layer, cladding, or deposition layer. As used herein a material or surface is "work hardened" if the material or surface has been subjected to work hardening, a material or surface is "heat treated" if the material or surface has been subjected to heat treating, a material or surface is "case-hardened" if the material or surface has been subjected to case hardening, a material or surface is "through hardened" if the material or surface has been subjected to through hardening, and a material or surface is "cryogenically treated" if the material or surface has been subjected to cryogenic treatment. Treated layer 3006 may be a sacrificial layer of carbon.

As shown in FIGS. 30A and 30B, in some embodiments only an outer layer (treated layer 3006) is treated to exhibit desired properties, such as increased hardness, with the remainder of material 3002 remaining unchanged relative to prior to the material treatment. Some exemplary material treatments that may provide a discrete treated layer 3006 include burnishing, shot-peening, case hardening, chromium plating, anodizing, phosphating, CVD, PVD, and cladding.

Figure 31A:
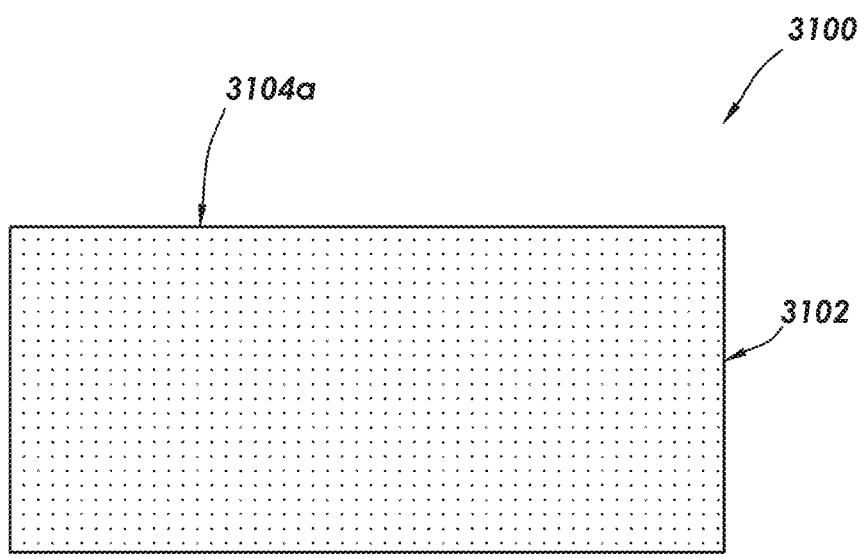
FIG. 31A depicts a bearing body prior to material treatment.
Figure 31B:
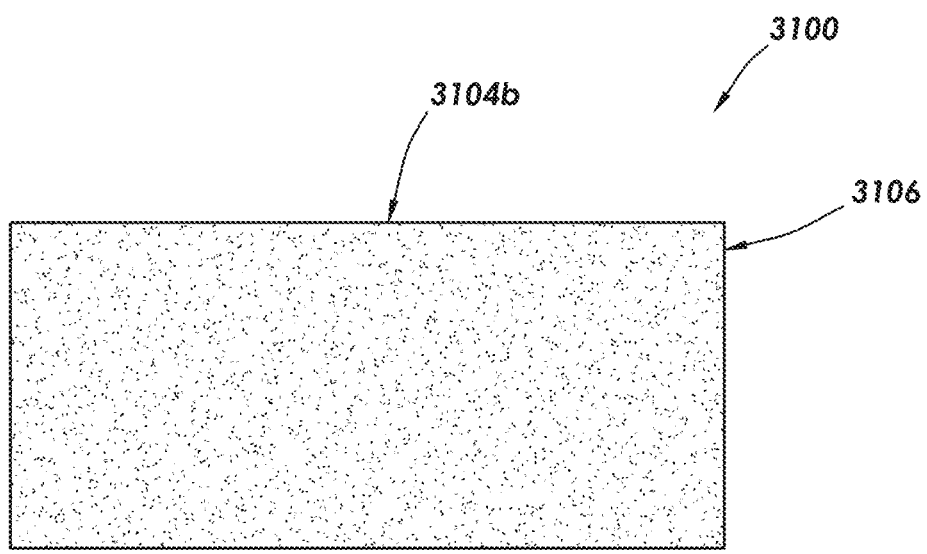
FIG. 31B depicts the bearing body of FIG. 31A, after material treatment.

In other embodiments, as shown in FIGS. 31A and 31B, an entirety of material 3002 exhibits modified properties (e.g., increased hardness) relative to prior to treatment. An exemplary material treatment that may provide a treated material 3106 include through hardening. In some such embodiments, treated material 3106 exhibits uniform properties (e.g., uniform hardness), and in other embodiments, treated material 3106 does not exhibit uniform properties.

In some embodiments, the opposing engagement surface is treated to have a surface finish of 16 μn or less, or 12 μn or less, or 8 μn or less.

Selection of Material Treatment

Selection of which of the one or more material treatments disclosed herein to apply to the diamond reactive material may by performed based upon the particular application. Some considerations that may be factors in the selection of material treatments include, but are not limited to, the financial cost of the material treatment, the severity of the application (e.g., the expected load on the opposing bearing surface in operation or the degree of corrosiveness of the operational environment), or combinations thereof. For example, for some applications cold working/work hardening may be less financially expensive to implement than platings/coatings, and platings/coatings may be less financially expensive to implement than heat treatments. For more severe applications, heat treatment may provide a more wear-resistance to the bearing surface than cold working/work hardening, and cold working/work hardening may provide a more wear-resistance to the bearing surface than platings/coatings. Such considerations are not limited to the present disclosure, and are only for exemplary purposes, as different treatments have different abilities to handle wear under different operational and environment conditions.

EXAMPLES

The following examples show particular embodiments of the disclosure. It is understood that the examples are given by way of illustration and are not intended to limit the specification or the claims.

Example 1—Cam Follower

In an effort to develop and assess robust cam follower interfaces for use in various applications, such as for use in or with the "Drilling Machine" technology, as disclosed in the '254 Application, Applicants designed and constructed an advanced test bench. The test bench employed a 200 RPM electric gearmotor driving a hard-faced ferrous rotor mandrel inside a hard-faced ferrous stator housing. The mandrel incorporated a non-hard faced offset camming cylinder midway along its length. The rotor/stator assembly was fed a circulating fluid through the use of a positive displacement pump. Candidate cam follower mechanisms were placed in sealed contact and under load with the camming cylinder of the rotor mandrel. Employing the test bench, candidate cam follower mechanisms were tested for survivability and wear under loads ranging from 500 to 3000 lbf, either in clear water or in sand laden drilling fluid.

The testing performed included tests of a curved ferrous surface in high-load facial linear area contact with planar face polycrystalline diamond under rotation. This testing produced a slightly discolored Hertzian contact area line on the face of the polycrystalline diamond about 0.250" in width along the entire ½" wide face of the polycrystalline diamond. Without being bound by theory, the width of the contact area can be a result of vibration in the system and, possibly, slight deformation of the ferrous metal under load. By calculation, the total contact area on the ½" polycrystalline diamond element face at any given point in time is about 7% of the total area of the polycrystalline diamond element face. The configuration employed in the testing demonstrated that even a small surface area on the face of a polycrystalline diamond element can handle significant load. Thus, effective polycrystalline diamond element cam followers can be designed and manufactured without the need for full face contact of the polycrystalline diamond element with the subject material cam surface.

Testing was performed on various configurations of sliding interfaces. Table 3, below, summarizes some of the testing performed, and results thereof.

TABLE 3

| | | RPM | Surface Speed | Loading | Result |
|---|---|---|---|---|---|
| | Tested Mechanism - Bearing Steel Ball in Alloy Steel Cup Against Rotating Steel Cam Surface | | | | |
| Test 1 | 1.50 Ball Socket | 200 | 1.13 m/s | 1200 lb | Abort after 3 minutes, ball is not rolling, heavy galling on ball and cup |
| Test 2 | 1.25 Ball Socket | 200 | 1.13 m/s | 500 lb | Abort alter 3 minutes, ball is not rolling, heavy galling on ball and cup |
| Test 3 | Single Polished PDC 1.50 Ball | 200 | 1.13 m/s | 700 lb | Ball is rolling, wear of steel on side wall of cup after 45 minutes |
| Test 4 | Tripod Polished PDC 1.50 Ball Tested Mechanism - Planar PDC Rotating Steel Cam Surface | 200 | 1.13 m/s | 700 lb | 20 hr test, little wear on Ball slight Hertzian trace on PDCs |
| Test 5 | Single Polished PDC Slider | 200 | 1.13 m/s | 900 lb | Ran 20 hours, PDC direct on steel cam in water. Slight, small Hertzian trace on PDC |
| Test 6 | Single Polished PDC Slider | 200 | 1.13 m/s | 900 lb | Varied load from zero, 4 hrs, good results in water. Slight, small Hertzian trace on PDC |
| Test 7 | Single Polished PDC Slider | 200 | 1.13 m/s | 2000 lb | Varied load from zero, 20 hrs, good results in water. Slight, small Hertzian trace on PDC |
| Test 8 | Single Polished PDC Slider | 200 | 1.13 m/s | 2000 lb | Drilling Fluid & Sand test, 32+ hrs, good results, Slight, small Hertzian trace on PDC |
| Test 9 | Single Polished PDC Slider | 200 | 1.13 m/s | 3000 lb | Mud test at 3000 lbf, 10 hrs, good results. Slight, small Hertzian trace on PDC |
| Test 10 | Single Polished vs Single Unpolished | 200 | 1.13 m/s | 1100 lb | Mud test, 2 hours each, Unpolished coefficient of friction at least 50% higher by ampere measurement |

Tests 1 and 2 summarize failed tests of individual steel balls rolling in a steel cup under load. Test 3 summarizes the results of a more successful test of a steel ball supported by a single polished polycrystalline diamond element in a steel cup. Test 4 summarizes a very successful test of a single steel ball supported by an array of three polished polycrystalline diamond elements in a steel cup. Tests 5 through 9 summarize increasingly rigorous tests, each of a single polished polycrystalline diamond element in sliding contact with a rotating ferrous cam surface. Test 10 summarizes a comparative test of a single polished polycrystalline diamond element versus a single unpolished polycrystalline diamond element, each in sliding contact with a rotating ferrous cam surface. The tests demonstrated a significant increase in coefficient of friction when the unpolished polycrystalline diamond element was used. Without being bound by theory, the conditions and results presented in Table 3 are believed to be emblematic of the potential use of polycrystalline diamond on diamond reactive material and are not to be considered limiting or fully encompassing of the methods, systems, and apparatus disclosed herein.

The numerous and extensive tests conducted demonstrated the ability to operate the ferrous camming cylinder in sliding contact with polished polycrystalline diamond surfaces without deleterious effects or apparent chemical interaction. Ferrous materials are attractive for bearing applications due to their ready availability, ease of forming and machining, higher elasticity, and lower cost than so called superhard materials.

The testing conducted by Applicants has established that, even at relatively high loads and high RPM speeds, a successful cam follower interface or load interface between polycrystalline diamond and a diamond reactive material cam can be practiced. A key finding of the testing was that, as long as the polycrystalline diamond element was not put into edge or point contact, which, it is believed, could lead to machining and chemical interaction, the polycrystalline diamond element can be used in sliding contact with a diamond reactive material at the typical loads and speeds called for in many commercial and industrial applications. The unexpected success of the testing has led to the development of new high-performance cam followers, as disclosed herein. This unexpected and surprising success of the Applicants' testing has also led to the development of new high-performance radial bearings and thrust bearings.

Applicants have found that polycrystalline diamond, especially polished polycrystalline diamond, provides a cam follower engagement surface that has a sliding coefficient of friction that is low enough to be applied across a broad spectrum of camming mechanisms, while also avoiding the requirement for small moving parts and the need for sealed lubrication. These findings are contrary to, and are surprising and unexpected in view of, the traditional contraindication of using polycrystalline diamond in direct sliding engagement with diamond reactive materials.

Without being bound by theory, in operation, running a cam and cam follower in a liquid cooled, lubricated environment, allows for higher speeds and loads to be attained without commencing a thermo-chemical reaction. Further, a polycrystalline diamond face that has been polished, notably, provides a lower thermo-chemical response.

The PSI experienced by common cam materials typically ranges from 58,000 PSI to 226,000 PSI. Without being bound by theory, it is believed that, for a camming PDC assembly as disclosed herein with a ½" diameter PDC cam follower, from 10,000 to 15,000 lbs of force can be applied during operation of the camming PDC assembly, with a useful working life of the assembly being approximately from 1,000,000 to cycles for at least some embodiments. When operating at 3000 lbs force, equal to 150,000 PSI, it is believed that at least some embodiments of the assemblies disclosed herein can operate for a life cycle of from 1,000,000 to 100,000,000 cycles.

From the descriptions and figures provided above it can readily be understood that the surface-to-surface engagement technology of the present application may be employed in a broad spectrum of applications, including those in downhole environments. The technology provided herein additionally has broad application to other industrial applications.

Furthermore, while shown and described in this example in relation to engagement between the surface of a cam follower and the surface of a cam, one skilled in the art would understand that the present disclosure is not limited to this particular application and that the concepts disclosed herein may be applied to the engagement between any diamond reactive material surface that is engaged with the surface of a diamond material.

Example 2—Additional Testing

In a continuation of Example 1, additional testing of a spherical ferrous ball under load and rotation against a planar polycrystalline diamond face produced a small, approximately 0.030 diameter, discolored Hertzian contact area in the center of the polycrystalline diamond element. As in the contact explanation of Example 1, it is believed, without being bound by theory, that the diameter of the discoloration is a result of slight vibration in the test apparatus and by slight deformation of the ferrous metal under load.

It was found that applications of polycrystalline diamond elements in a radial bearing can employ far less than the full face of the elements and still take significant load. This finding means effective polycrystalline diamond element containing radial bearings can be designed and manufactured without the need for full face contact of the polycrystalline diamond elements with the opposing surface. Employing this finding in the technology of the present application means it is possible to manufacture radial bearings with far less processing of the polycrystalline diamond elements used and substantially reducing the risk of edge clashing, or of the instigation of machining of a diamond reactive material opposing surface.

Example 3—Burnishing

Figure 32:
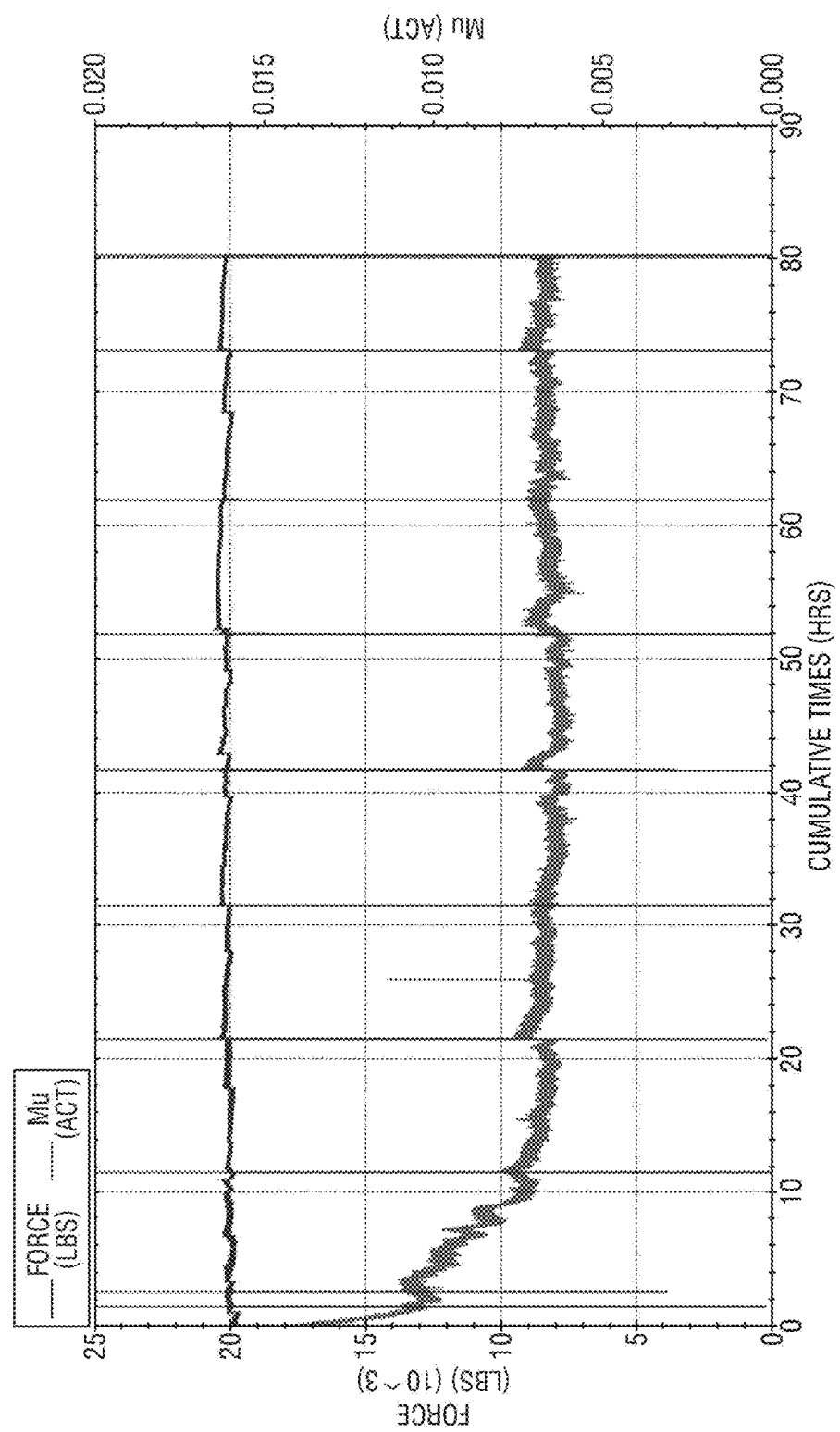
FIG. 32 is a graph of load and CoF during burnishing of a shaft in Example 3.

In Example 3, a bearing surface made of a diamond reactive material (steel) was subjected to the force (radial load) of 20k lbs, under moving engagement with a polished diamond bearing surface, as shown in the graph of FIG. 32 over a period of 80 hours. During the testing of the bearing surface, the coefficient of friction was determined for the bearing surface, which is also plotted in the graph of FIG. 32, where load is the upper line in the graph and CoF is the lower line in the graph. As is evident from FIG. 32, there is an initial period of about 20 hours where the coefficient of friction declines. After the first approximately 20 hours of load bearing, the coefficient of friction reaches relative steady state condition, where the coefficient of friction of the bearing surface does not substantially further decline, but is maintained substantially constant over the final 60 hours of testing.

It was found that the bearing surface was improved by such burnishing. Without being bound by theory, it is believed that the asperities on the metal bearing surface are cold worked or plastically deformed during such burnishing, creating a relatively harder bearing surface having a relatively smoother surface finish in comparison to prior to the burnishing. It was also found that, as the surface finish of the bearing surface became smoother (lower surface finish), the coefficient of friction between the diamond and the diamond reactive material decreased. It was observed that the Rockwell C (HRC) increased from 32 to 38. Also, the surface finish was about 16 µin or less.

Figure 33A:
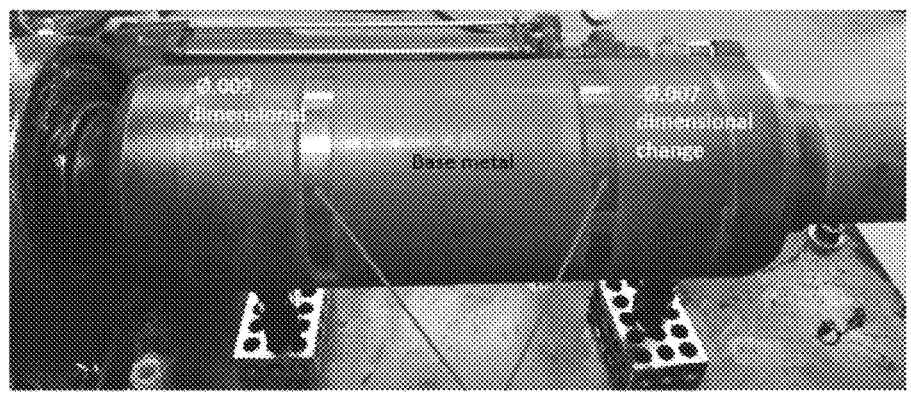
FIGS. 33A-33E are images and schematics of the shaft of Example 3.
Figure 33B:
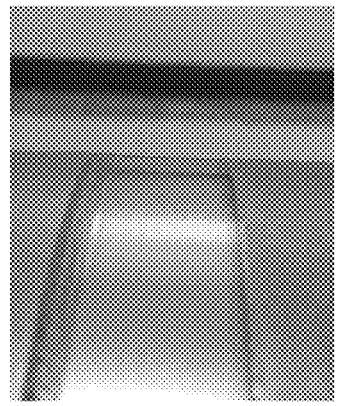

FIGS. 33A and 33B show images of races burnished during this testing. As is evident from the images, the burnished races, indicated by arrow, are more polished appearance than the base metal. Before this testing, the entirety of the shaft shown in FIG. 33A was coated with black phosphate, but the black phosphate is no longer present in the burnished races. Without being bound by theory, it is believed that the black phosphate coating wore off relatively early on during this testing. Table 4 shows the average hardness of the base metal and the bearing race obtained during this testing, where it is evident that the bearing race increased in hardness by 6 HRC during the 80 hours of testing. The dimensional change along the bearing races, relative to the base metal, is indicated. The base metal was an unburnished surface.

TABLE 4

Average Hardness

| Material | Average Hardness (HRC) |
|---|---|
| Base metal | 32 |
| Bearing Race after 80 hours | 38 |

Figure 33C:

FIG. 33C is an image of the shaft, re-machined to pre-burnish the bearing area. The bearing area of the shaft was pre-burnished to a surface finish of 8 µin. Unburnished sides are also indicated by arrows.

Figure 33D:
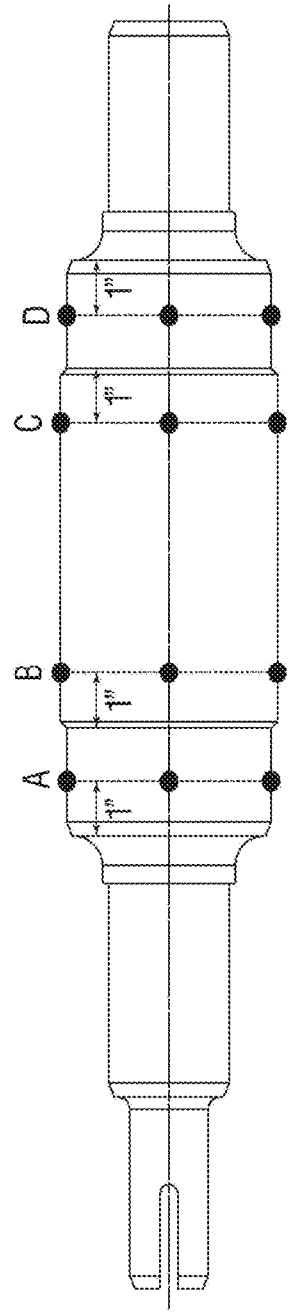

FIG. 33D is a schematic of the shaft of FIG. 33C, indicating four radial locations: A, B, C, and D. Locations B and C are burnished, and locations A and D are unburnished. Table 5 sets forth the average HRC for each area.

TABLE 5

Average Hardness

| Location | Average Hardness (HRC) |
|---|---|
| A | 31 |
| B | 38 |
| C | 37 |
| D | 32 |

As is evident from Table 5, the burnished locations have an increased hardness relative to the unburnished locations.

Figure 33E:
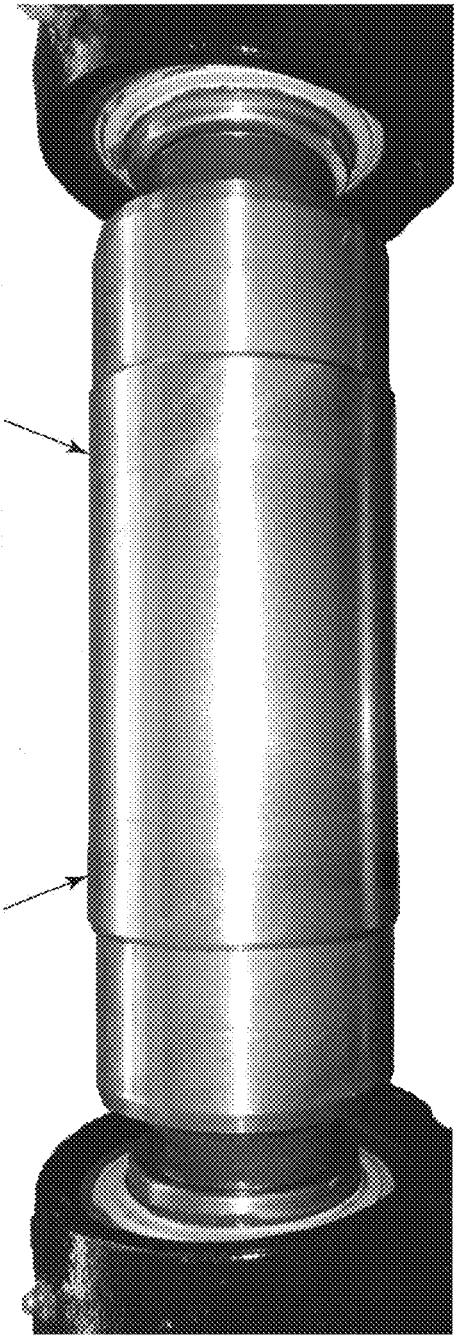

FIG. 33E depicts the re-machined shaft having the pre-burnish bearing area of FIGS. 33C and 33D, after subjection to 34 klbs of radial load for 10 hours. It was found that there was no measurable dimensional change along the bearing race relative to the remainder of the pre-burnished bearing area. Thus, pre-burnishing a bearing surface provides a bearing surface that is capable of operation without the occurrence of dimensional change along the bearing race, or at least without the occurrence of substantial dimensional change along the bearing race.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method of making a bearing, the method comprising:
providing a bearing surface, the bearing surface comprising polycrystalline diamond;
providing an opposing bearing surface, the opposing bearing surface comprising a diamond reactive material;
hardening the opposing bearing surface; and
engaging the bearing surface with the opposing bearing surface.

2. The method of claim 1, wherein the hardening of the opposing bearing surface comprises hardening the opposing bearing surface prior to engaging the bearing surface with the opposing bearing surface.

3. The method of claim 1, wherein the hardening of the opposing bearing surface comprises plastically deforming asperities on the opposing bearing surface, and wherein plastically deforming the asperities reduces a surface finish of the opposing bearing surface.

4. The method of claim 1, wherein hardening the of the opposing bearing surface comprises work hardening the opposing bearing surface.

5. The method of claim 4, wherein the work hardening comprises burnishing the opposing bearing surface.

6. The method of claim 5, wherein the burnishing includes engaging the bearing surface and the opposing bearing surface in sliding contact.

7. The method of claim 6, wherein the opposing bearing surface is burnished via sliding contact with the bearing surface at least until the coefficient of friction between the bearing surface and the opposing bearing surface reaches a steady state condition.

8. The method of claim 4, wherein the work hardening comprises shot-peening the opposing bearing surface.

9. The method of claim 1, wherein the opposing bearing surface is hardened by heat treating the metal.

10. The method of claim 9, wherein the heat treating comprises through hardening, case hardening, or cryogenic treatment.

11. The method of claim 1, further comprising providing an external layer of material onto the opposing bearing surface.

12. The method of claim 11, wherein providing the external layer of material comprises plating or coating the external layer of material onto the opposing bearing surface.

13. The method of claim 12, wherein providing the external layer of material comprises the plating, wherein the plating comprises chromium plating a layer of chromium onto the opposing bearing surface.

14. The method of claim 11, wherein providing the external layer of material comprises phosphating the opposing bearing surface to form a metal-phosphate layer on the opposing bearing surface.

15. The method of claim 11, wherein providing the external layer of material comprises depositing the external layer onto the opposing bearing surface via vapor deposition.

16. The method of claim 11, wherein providing the external layer of material comprises cladding the opposing bearing surface.

17. The method of claim 11, wherein providing the external layer of material comprises anodizing the opposing bearing surface.

18. The method of claim 1, further comprising providing a sacrificial layer of carbon on the opposing bearing surface.

19. The method of claim 1, wherein the opposing bearing surface is hardened after engaging the bearing surface with the opposing bearing surface.

20. A method of using a bearing, the method comprising:
providing a bearing assembly, the bearing assembly including a bearing surface slidingly engaged with an opposing bearing surface, wherein the bearing surface comprising polycrystalline diamond, wherein the opposing bearing surface comprises a diamond reactive material; and
deploying the bearing assembly into a downhole environment, wherein the opposing bearing surface is burnished prior to deploying the bearing assembly.

21. An apparatus, the apparatus comprising:
a bearing surface comprising polished polycrystalline diamond;
an opposing bearing surface comprising a diamond reactive material, wherein the diamond reactive material is hardened; and
wherein the bearing surface and the opposing bearing surface are movably engaged.

22. The apparatus of claim 21, wherein the opposing bearing surface has a surface finish of 16 µin or less.

23. The apparatus of claim 21, wherein the opposing bearing surface is work hardened or heat treated.

24. The apparatus of claim 23, wherein the opposing bearing surface is burnished, shot-peened, through hardened, case hardened, or cryogenically treated.

25. The apparatus of claim 21, further comprising an external layer of material on the opposing bearing surface.

26. The apparatus of claim 25, wherein the external layer of material comprises plating, a coating, a metal-phosphate layer, a vapor deposition layer, or cladding, an anodized layer, or a sacrificial layer of carbon.

27. The apparatus of claim 21, wherein the apparatus comprises a bearing assembly that includes the bearing surface and the opposing bearing surface, wherein the bearing assembly is a cam assembly, a radial bearing assembly, or a thrust bearing assembly.

28. An apparatus, the apparatus comprising:
a bearing surface comprising polycrystalline diamond;
an opposing bearing surface, wherein the opposing bearing surface comprises a diamond reactive material;
wherein the opposing bearing surface is hardened; and
wherein the bearing surface and the opposing bearing surface are slidingly engaged.

29. The apparatus of claim 28, wherein the opposing bearing surface is work hardened.

30. The apparatus of claim 28, wherein the opposing bearing surface is heat treated.

31. The apparatus of claim 28, wherein the opposing bearing surface is burnished.

32. The apparatus of claim 28, wherein the opposing bearing surface shot-peened.

33. The apparatus of claim 28, wherein the opposing bearing surface is through hardened.

34. The apparatus of claim 28, wherein the opposing bearing surface is case hardened.

35. The apparatus of claim 28, wherein the opposing bearing surface is cryogenically treated.

36. The apparatus of claim 28, further comprising an external layer of material on the opposing bearing surface.

37. The apparatus of claim 36, wherein the external layer of material comprises plating, a coating, a vapor deposition layer, or cladding.

38. The apparatus of claim 36, wherein the external layer of material comprises a metal-phosphate layer.

39. The apparatus of claim 28, wherein the diamond reactive material comprises iron, titanium, cobalt, nickel, ruthenium, rhodium, palladium, chromium, manganese, copper, tantalum, or an alloy thereof.

40. The apparatus of claim 28, wherein the diamond reactive material comprises iron, titanium, or an alloy thereof.

* * * * *